United States Patent
Harb

(10) Patent No.: US 9,940,632 B2
(45) Date of Patent: Apr. 10, 2018

(54) REAL-TIME BROADCAST CONTENT SYNCHRONIZATION DATABASE SYSTEM

(71) Applicant: Joseph Harb, Woodinville, WA (US)

(72) Inventor: Joseph Harb, Woodinville, WA (US)

( * ) Notice: Subject to any disclaimer, the term of this patent is extended or adjusted under 35 U.S.C. 154(b) by 341 days.

(21) Appl. No.: 14/597,055

(22) Filed: Jan. 14, 2015

(65) Prior Publication Data
US 2015/0193516 A1 Jul. 9, 2015

Related U.S. Application Data

(63) Continuation-in-part of application No. 13/853,511, filed on Mar. 29, 2013, and a continuation-in-part of application No. 13/544,932, filed on Jul. 9, 2012, now Pat. No. 8,918,333.

(60) Provisional application No. 61/927,425, filed on Jan. 14, 2014.

(51) Int. Cl.
*G06F 17/30* (2006.01)
*G06Q 30/02* (2012.01)

(52) U.S. Cl.
CPC ......... *G06Q 30/02* (2013.01); *G06F 17/3074* (2013.01); *G06Q 30/0207* (2013.01); *G06Q 30/0251* (2013.01)

(58) Field of Classification Search
CPC .................................................. G06F 17/3074
See application file for complete search history.

(56) References Cited

U.S. PATENT DOCUMENTS

| | | | | |
|---|---|---|---|---|
| 9,674,239 | B2 * | 6/2017 | Wong | H04L 65/403 |
| 2005/0197906 | A1 * | 9/2005 | Kindig | G06Q 30/02 705/15 |
| 2007/0078709 | A1 * | 4/2007 | Rajaram | G06Q 30/02 705/14.71 |
| 2007/0149114 | A1 * | 6/2007 | Danilenko | H04H 20/31 455/3.06 |
| 2008/0293393 | A1 * | 11/2008 | Hartmaier | G06Q 30/02 455/414.3 |
| 2011/0138411 | A1 * | 6/2011 | Koontz, III | H04H 20/18 725/32 |
| 2011/0202270 | A1 * | 8/2011 | Sharma | G06Q 30/02 701/533 |
| 2012/0232990 | A1 * | 9/2012 | Park | G06Q 30/02 705/14.55 |

(Continued)

*Primary Examiner* — Mohammad S Rostami
(74) *Attorney, Agent, or Firm* — FisherBroyles LLP; Micah D. Stolowitz

(57) ABSTRACT

In response to a track playing on a broadcast radio station, the corresponding artist name is used as a key to access a database of artist messages, news and events information associated with that artist, that may be automatically distributed and geo-targeted while the track is playing. Distribution of the supplemental artist-related content extends to the radio broadcast—via RDS and HD, to the Internet, social media and various mobile devices. The supplement content may comprise messages pre-programmed by the artist, agents, or music labels. The supplemental content may be geo-targeted to include local tour dates, media appearances, related news, album releases and other data tied to the artist's song that is playing on the radio or on a streaming application. Further, the system may feed messages directly from the artist's existing social platforms, to provide further engagement of listeners while the track is playing.

16 Claims, 41 Drawing Sheets

(56) References Cited

U.S. PATENT DOCUMENTS

2013/0060873 A1* 3/2013 Gautam ............... G06Q 10/107
709/206
2013/0097190 A1* 4/2013 Shah ................ G06F 17/30029
707/754

* cited by examiner

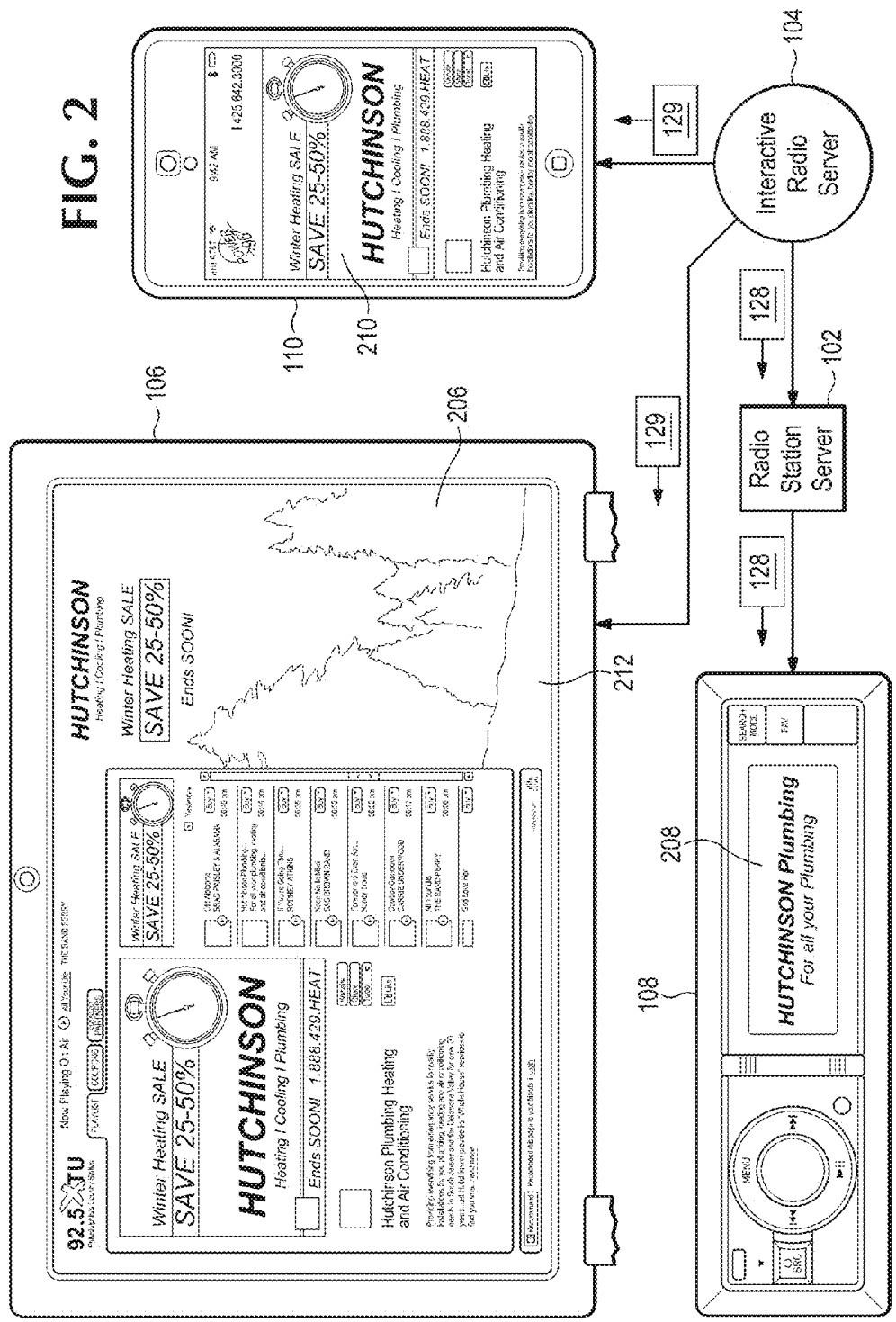

FIG. 8

Ad Now Playing Information displayed on the car stereo console with different options available to select from HD Radio with Artist Experience Advertiser Text and Advertiser Experience

REAL-TIME BROADCAST CONTENT SYNCHRONIZATION DATABASE SYSTEM

This application is a non-provisional of U.S. Provisional Patent Application No. 61/927,425 filed Jan. 14, 2014 incorporated herein by this reference. This application also is a continuation-in-part of U.S. patent application Ser. No. 13/853,511 filed Mar. 29, 2013 which in turn claims priority to U.S. Provisional Patent Application No. 61/617,549, filed Mar. 29, 2012, and is a continuation-in-part of U.S. patent application Ser. No. 13/544,932, filed Jul. 9, 2012, now U.S. Pat. No. 8,918,333 all of which are incorporated herein by reference in their entireties.

COPYRIGHT NOTICE

© 2012-2015 QUU INC. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

Methods and systems for real-time broadcast content synchronization database system.

BACKGROUND OF THE INVENTION

Traditional radio lacks a visual/tactile component. As the consuming public increases dependence on immediate access to content, products and services via personal electronic devices such as smart phones, laptops, notepads and etc., it is becoming increasingly difficult for radio stations to engage listeners and to incentivize them to take action based on information that is being broadcast whether the information being broadcast is advertising, polling, and/or other types of programming. Since its inception, the radio has evolved in terms of technology and quality of sound, but not in terms of becoming interactive. The need remains to improve engagement with radio listeners.

SUMMARY OF THE DISCLOSURE

The following is a summary of the present disclosure in order to provide a basic understanding of some aspects and features of the invention. This summary is not intended to identify key/critical elements of the invention or to delineate the scope of the invention. Its sole purpose is to present some concepts of the invention in a simplified form as a prelude to the more detailed description that is presented later.

Various embodiments of this disclosure can be used in connection with broadcast radio stations, station web sites, on-line music services, as well as music player devices, including car stereos, which may be standalone or integrated in portable devices, vehicle head units, etc. In some embodiments, the disclosed methods and systems provide supplemental content for display on user devices, especially radio listener devices, supplemental content including artist-related messages or other content that is associated to a specific song or artist while that song or artist is playing.

When a song spins, the disclosed system displays optionally customized and geo-targeted artist-related messages and other digital content that may be provided directly from the artist or the label, in the car, on the web and on mobile devices. The display messages or other supplemental content may be pre-programmed by the music label, with geo-targeted information, for example, on local tour dates, media appearances, breaking news, album releases, point-of-sale information and more, all tied to an artist's song as it is playing on the radio or on a streaming application. Preferably, the messages or other supplemental content may be collected in a database system. A synchronization server manages providing the appropriate supplemental content to one or more recipients in near-real time.

Some embodiments also include the capability to feed messages directly from the artist's existing social platforms, including Twitter, giving fans a new way to hear from or about their favorite artists as they are listening to them, in their cars and through participating radio station websites and mobile applications.

To illustrate, assume a Carrie Underwood song is playing. The present systems enables messages linked to that artist or that song to be displayed simultaneously in at least the following assets:

In the car: Message rotates with artist and title on the car stereo display. In newer displays, images may be displayed as well.

On the web: Playlist or Listen Live webpage may be skinned with the message

On mobile apps: Mobile background may be skinned with artist related messages

In some embodiments, 3rd party Mobile or web-based services such as Pandora or others can connect to our servers check if any artist related message is available during a song play, and display that message instead of regular ads they usually display.

In some embodiments, Integration with 3rd party hardware such as Sony car stereos, is provided. 3rd party hardware can integrate with Quu and request information to display when a given song or artist are playing. In this case, the source of the music may be radio or streaming application or a Bluetooth player such as an iPod. Knowing the artist and title, the car stereo connects with the Quu servers to request related information to display. This can also be achieved via an application that can be installed on car stereos.

In an embodiment, the connection between the car stereo and the servers is achieved via a data connection either directly from the device in case it is connected, or via mobile phone. In some embodiments, the displayed messages may be "clickable" for user action when an action can be taken, such as on a mobile phone or a more advanced car stereo. Action can be taken with any mean that the device allows such as click, touch or speak.

BRIEF DESCRIPTION OF THE DRAWINGS

FIG. 2 depicts an example of an integrated and interactive radio advertising campaign.

FIG. 8 depicts an interactive radio programming user interface.

DESCRIPTION OF EXAMPLE EMBODIMENTS

Overview

Figure 1A:
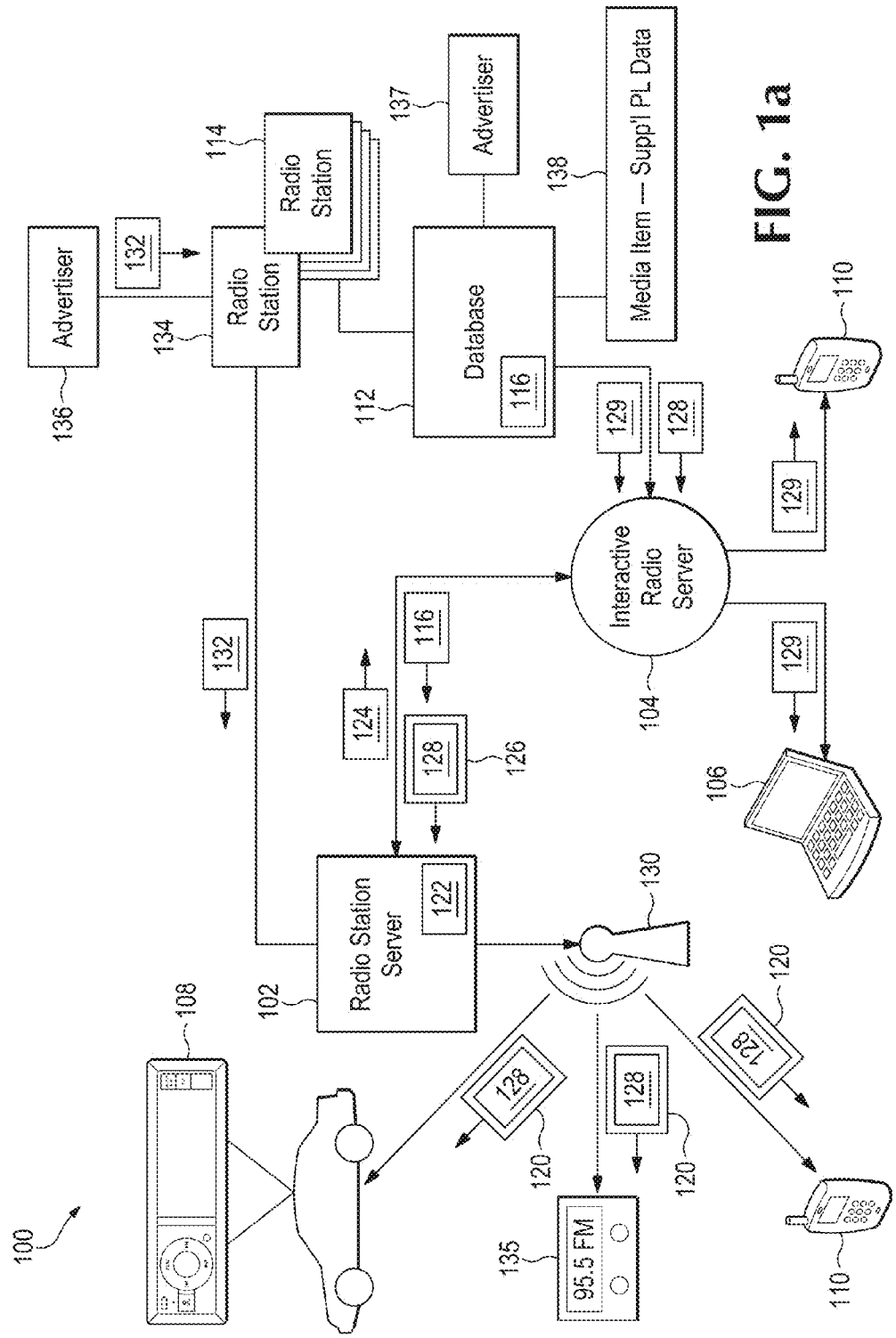
FIG. 1a depicts a system for interactive radio advertising.

In an example, Interactive Radio Server 104 enables listeners to interact with broadcast radio at multiple levels rendering it a clickable interactive and measurable media enabling sales of advertised consumer goods or services at the click of a button. interactive radio server 104 may be configured to provide one or more of the following: interactive advertising, interactive programming, radio on-demand, interactive music, and/or mobile marketing. Interactive radio server 104 may provide an avenue to listeners to connect and engage with radio programming and advertising. For example, listeners may hear an advertisement for a product on the radio, see the brand name and slogan of the product on a car stereo display, see a coupon code number associated with the product on the car stereo display, access a coupon for a discount on the product via a website associated with the radio station, access the website associated with the radio station where a video of the advertisement may be accessed from a station playlist posted on the website or may be streaming in real-time while the advertisement airs and/or may select the advertisement from the radio station playlist to access a coupon or static advertisement (e.g., background skin or panel advertisement). Thus, interactive radio server 104 may coordinate an interactive and multi-platform advertising campaign.

In an example, broadcast radio listeners may react to radio content via rating and voting as well as requesting alerts for specific content. interactive radio server 104 may monitor voting and requests giving broadcasters data to enhance programming to improve advertiser targeting. interactive radio server 104 may monitor linking to advertiser coupons, advertisements, media items in a playlist and/or other content via a radio station website served by interactive radio server 104. interactive radio server 104 may compile statistics based on the monitoring. Radio content and advertising may also be shared through social networks via links to the advertiser coupons and/or other content via a radio station website served by interactive radio server 104 and/or radio station server 102.

In an example, user activity associated with the several different applications described below may be logged. interactive radio server 104 may produce reports associating media items and various recorded user behaviors such as clicking on songs, clicking on advertisements, SMS messaging responsive to supplemental data 128 display on user devices. The report may correlate monitored user behavior with respect to time of day, from which communication device was supplemental data 129 or 128 accessed, what songs played before or after, what playlist ordering achieved the best results, and etc.

Several examples of the present application will now be described with reference to the accompanying drawings. Various other examples of the disclosed technology are also possible and practical. This application may be exemplified in many different forms and should not be construed as being limited to the examples set forth herein. The figures listed above illustrate various examples of the application and the operation of such examples. In the figures, the size of the boxes is not intended to represent the size of the various physical components. Only those parts of the various units are shown and described which are necessary to convey an understanding of the examples to those skilled in the art.

Additional aspects and advantages will be apparent from the following detailed description of example embodiments. The illustrated example embodiments and features are offered by way of example and not limitation. Furthermore, the described features, structures, or characteristics may be combined in any suitable manner in one or more example embodiments.

In the following description, certain specific details of programming, software modules, user selections, network transactions, database queries, database structures, etc., are provided for a thorough understanding of the example embodiments of the disclosed technology. However, those skilled in the art will recognize that the disclosed technology can be practiced without one or more of the specific details, or with other methods, components, materials, etc.

FIG. 1*a* depicts an example of a system 100 for providing coordinated and interactive radio advertising services to subscriber radio stations and/or advertisers on one or more of a variety of media platforms. In an example, interactive radio server 104 may comprise a service platform and advertising ecosystem to enable radio with on-demand features and interactive capabilities. Radio station 134 may be a subscriber radio station subscribed to interactive radio advertising services provided by interactive radio server 104.

In an example, radio station server 102 may be associated with a radio station 134. Radio station server 102 may identify broadcast programming in real-time in one or more messages 124. Radio station server 102 may send messages 124 to interactive radio station server 102 to identify media items playing in real-time. Interactive radio server 104 may compile a playlist 116 based on messages 124. In another example, radio station server 102 and may send playlist 116 to interactive radio server 104 in advance of broadcasting one or more media items 132.

In one example, each of several media items broadcast by radio station server 102 may each be identified in separate messages 124. The one or more message 124 may comprise an event ID or other data identifying media items 132 as they are broadcast. Media item 132 may comprise entertainment programming, advertising, news, traffic and/or any category of radio programming that may be broadcast.

Playlist 116 may comprise a listing of one or more media items 132 broadcast by the radio station over AM radio, FM radio, RDS, and/or HD Radio. AM radio broadcasting is the process of radio broadcasting using amplitude modulation. FM broadcasting is a broadcasting technology using frequency modulation (FM) to provide high-fidelity sound over broadcast radio. Radio Data System (RDS) is a communications protocol standard for embedding small amounts of digital information (e.g., time, station identification and program information) in conventional FM radio broadcasts. Radio Broadcast Data System (RBDS) is the official name used for the U.S. version of RDS. The two standards are slightly different. HD Radio, (originally "Hybrid Digital Radio"), is the trademark name for iBiquity's in-band on-channel (IBOC) digital radio technology used by AM and FM radio stations to transmit audio and data via a digital signal in conjunction with their analog signals. HD is a digital audio broadcasting method used in the United States. HD Radio allows for an all-digital mode, this system currently is used by some AM and FM radio stations to simulcast both digital and analog audio within the same channel (a hybridized digital-analog signal) as well as to add new FM channels and text information.

In an example, interactive radio server 104 may store playlist 116 in database 112. Playlist 116 data may be stored for any reasonable time period, for example seven days. Playlist 116 may include all or a sub-set of media items 132 broadcast by radio station server 102 during a specified time period. Radio station server 102 may identify which media items 132 are to be identified in playlist 116. For example, some advertisers may not be identified based on an advertising package purchased from radio station 134.

In an example, interactive radio server 104 may store playlist 116 in database 112 and may associate supplemental data 128 and/or supplemental data 129 with corresponding media items identified and/or included in playlist 116. For example, interactive radio server 104 may identify supplemental data 128 and/or supplemental data 129 corresponding to a song identified in playlist 116 and may associate the supplemental data 128 and/or supplemental data 129 with the song in database 112. Database 112 may comprise a single database or a plurality of databases and may be stored in interactive radio server 104 and/or in a different device and claimed subject matter is not limited in this regards.

In an example, the supplemental data 128 may comprise a variety of data types or categories, including: audio data, video data, image data, text data, metadata, song title, lyrics, album, album art, biographical information related to the artist performing the song, advertising data, coupons, coupon code, upcoming local concert dates for the artist, recent news related to the artist and/or a music video related to the song and claimed subject matter is not limited in this regard. In one example, supplemental data 128 may comprise RDS data, RDBS data, and/or HD data. Alternatively, supplemental data 128 may comprise data that is configured to be converted to RDS data, RDBS data, and/or HD data. Supplemental data 129 may comprise: audio data, video data, image data, text data, a song title, lyrics, an album title, album art, metadata, biographical information related to the artist performing the song, advertising data (e.g., image, audio, video, text, etc.), a coupon, coupon code, upcoming local concert dates for the artist, recent news related to the artist and/or a music video and claimed subject matter is not limited in this regard. In one example, supplemental data 129 may comprise data formatted for transmission via the Internet and/or for transmission in a mobile Internet format. Supplemental data 128 and/or 129 may be broadcast via RDS, RBDS and/or HD (in-band on-channel) and/or any of a variety of other broadcasting technologies known to those of skill in the art and claimed subject matter is not limited in this regard.

Interactive radio server 104 may obtain the supplemental data 128 and/or supplemental data 129 from any source, for example, from radio station 134, any of radio stations 114, a third party vendor, any available source via the Internet and/or a database 112.

In an example, one or more media items identified in playlist 116 may be identified with a unique identifier (UID). The identifier may be an International Standard Recording Code. The International Standard Recording Code (ISRC) is an international standard code for uniquely identifying sound recordings and music video recordings. An ISRC code identifies a particular recording, not the work (composition and lyrical content) itself. Therefore, different recordings, edits, and remixes of the same work should each have their own ISRC code. In another example, interactive radio server 104 may look-up one or more media item UIDs in a table or other data structure based on information in message 124 and/or playlist 116. Playlist 116 may identify one or more media items broadcast over any reasonable time period, such as for example one hour, one day, one week and/or one month.

In an example, radio station server 102 may comprise a station automation system 122 configured to monitor radio station server 102 broadcasting to determine which media item is playing in real-time. Station automation system 122 may send message 124 to interactive radio server 104, identifying the particular media item playing in real-time. In another example, message 124 may identify other real-time broadcast events such as when radio station server 102 is broadcasting DJ chat, a live sporting event, live music, a live interview, a traffic report, a news report, and/or station identification.

In an example, interactive radio server 104 may send supplemental data message 126 to radio station server 102. Supplemental data message 126 may identify and/or comprise supplemental data 128 and/or supplemental data 129 to be broadcast while one or more media items identified in message 124 are being broadcast. Interactive radio server 104 may send supplemental data message 126 to radio station server 102 responsive to receiving message 124 identifying the particular media item playing in real-time. Supplemental data 128 or 129 identified in supplemental data message 126 may be broadcast by radio station server 102 with the particular media item identified in message 124. Supplemental data 128 may be identified in supplemental data message 126 by a UID.

In an example, radio station server 102 may be in communication with transmitter 130. Transmitter 130 may broadcast one or more media items 312 and supplemental data 128 in radio broadcast portion 120. In an example, radio broadcast portion 120 may be transmitted using any of a variety of broadcasting technologies including, for example, AM Radio, FM Radio, RDS, RDBS, and/or HD Radio (in-band on-channel).

In an example, transmitter 130 may send (or transmit) supplemental data 128 in response to receiving supplemental data message 126. Supplemental data 128 and media item 132 may be transmitted together by transmitter 130 to a variety of radio receivers, such as, a radio 135, a car stereo 108 and/or another mobile device such as a radio receiver in a mobile telephone 110.

Substantially simultaneously with broadcasting supplemental data 128, interactive radio server 104 may make accessible the supplemental data 129 for one or more user devices, for example, a laptop computer 106 and/or a mobile telephone 110. Interactive radio server 104 may make accessible the supplemental data 129 responsive to receiving message 124, according to a schedule set-up by a user, and/or responsive to playlist 116. In another example, interactive radio server 104 may store media items 132 including advertising identified on playlist 116 and may play the one or more media items 132 out of order and/or on-demand responsive to a request from a user device, such as laptop 106 and/or mobile telephone 110. In an example, interactive radio server 104 may transmit the one or more media items 132 identified on playlist 116 via a variety of communication networks, such as; a telecommunication network, the Internet, a private network, or any combination thereof.

In an example, interactive radio server 104 may be coupled to database 112. Database 112 may store data identifying a plurality of subscriber radio stations 114. In an example, subscriber radio stations may access interactive radio services via interactive radio server 104. Radio station 134 may be included in the plurality of subscriber radio stations 114.

In one example, an advertiser 136 may be interested in advertising a product or service on radio utilizing interactive radio advertising. Advertiser 136 may subscribe to radio station 134 advertising services directly. Advertiser 136 may provide or identify media item 132, (such as, a radio advertising media) to radio station 134. Radio advertising media provided to radio station 134 may comprise audio, video, image, and/or text data in a variety of formats configured for display on a radio station website, sending via SMS, as well as for broadcasting over the air in AM, FM, RDS, RDBS and/or HD. Such radio advertising media may be included in playlist 116 and may be broadcast by radio station transmitter 130 according to an agreement between advertiser 136 and radio station 134. An identity of the media item 132 comprising the radio advertising media may be disclosed to interactive radio server 104 in message 124 and may be added to playlist 116 by interactive radio server 104.

As described above, interactive radio server 104 may look-up media item 132 in data structure 138 to determine if there is supplemental data 128 and/or supplemental data 129 associated with media item 132. If there is supplemental data 128 and/or 129 identified in data structure 138, interactive radio server 104 may retrieve the supplemental data 128 and/or supplemental data 129. Interactive radio server 104 may send supplemental data 128 to radio station server 102 to be broadcast (e.g., in RDS, RDBS and/or HD) while the media item 132 is being broadcast. If there is supplemental data 129 identified in data structure 138, interactive radio server 104 may post the supplemental data 129 in the appropriate platform (e.g., on a website associated with radio station 134 and/or sending out alerts, text messages, coupons, and the like).

In another example, advertiser 137 may subscribe to interactive radio advertising services provided by interactive radio server 104 directly. Advertiser 137 may provide or identify media item 132 comprising radio advertising media. Media item 132 may comprise audio, video, image, and/or text data in a variety of formats configured for display on a website associated with radio station 134, communicating via a telecommunications network, sending via short message service (SMS) and/or for broadcasting over the air in AM, FM, RDS, RDBS and/or HD.

In one example, interactive radio server 104 may store media item 132 identifier or the media item itself in data structure 138 and associate supplemental data 128 and/or supplemental data 129 with media item 132. If media item 132 is identified in message 124 and/or playlist 116, interactive radio server 104 may send supplemental data 128 to radio station server 102 to be broadcast while media item 132 is being broadcast over the air by transmitter 130. Interactive radio server 104 may display, link and/or play out media item 132 on a website associated with radio station 134. Interactive radio server 104 may display, link and/or play out supplemental data 129 associated with media item 132 on a website associated with radio station 134. In one example, laptop 106 and/or mobile telephone 110 may access media item 132 and/or supplemental data 129 via interactive radio server 104. Interactive radio server 104 may push media item 132 and/or supplemental data 128 to one or more of radio stations 114. One or more radio stations 114 may broadcast media item 132 and/or supplemental data 128.

In one example, supplemental data 128 may not be associated with media item 132. Advertiser 137 may directly subscribe to interactive radio services provided by interactive radio server 104. Interactive radio server 104 may provide supplemental data 128 to radio station server 102 to broadcast that is not related to the content of a media item currently being broadcast over-the-air. For example, responsive to a request by advertiser 137, interactive radio server 104 may send radio station server 102 supplemental data 128 related to an advertisement for food to be broadcast while a particular song is being broadcast by transmitter 130. When the song is being broadcast by radio station server 102, supplemental data 128 comprising text to display the name of the song and the performer may be displayed on a radio 135 display for a set time period (e.g., 60 seconds) then play a different supplemental data 128 comprising the advertisement for food requested by advertiser 137 may be displayed on a radio 135 display for a set time period (e.g., 30 seconds). The supplemental data 128 may be broadcast by individual radio station 134, or pushed by interactive radio server 104 to one or more of radio stations 114.

In an example, the timing may be coordinated by station automation system 122. However, radio station advertiser 136 or advertisers 137 may log into interactive radio server 104 and access special software (coined "Advertiser Experience") to schedule supplemental data 128 and/or media item 132 to be broadcast and/or displayed at certain times of day. For example, if advertiser 136 or 137 selects advertising for a Burger Joint, advertiser 136 or 137 may schedule supplemental data 128 text and/or graphics to be broadcast, for example "Get an Egg Sandwich" displaying a picture of a breakfast sandwich between 6 am and 12 pm, then switch to a "Get a Big Burger and a Salad" later in the day and display a graphic showing the burger and salad. Advertiser 136 and/or 137 may select different messages at different times and days of the week or in conjunction with other media items being broadcast by radio 134.

Figure 1B:
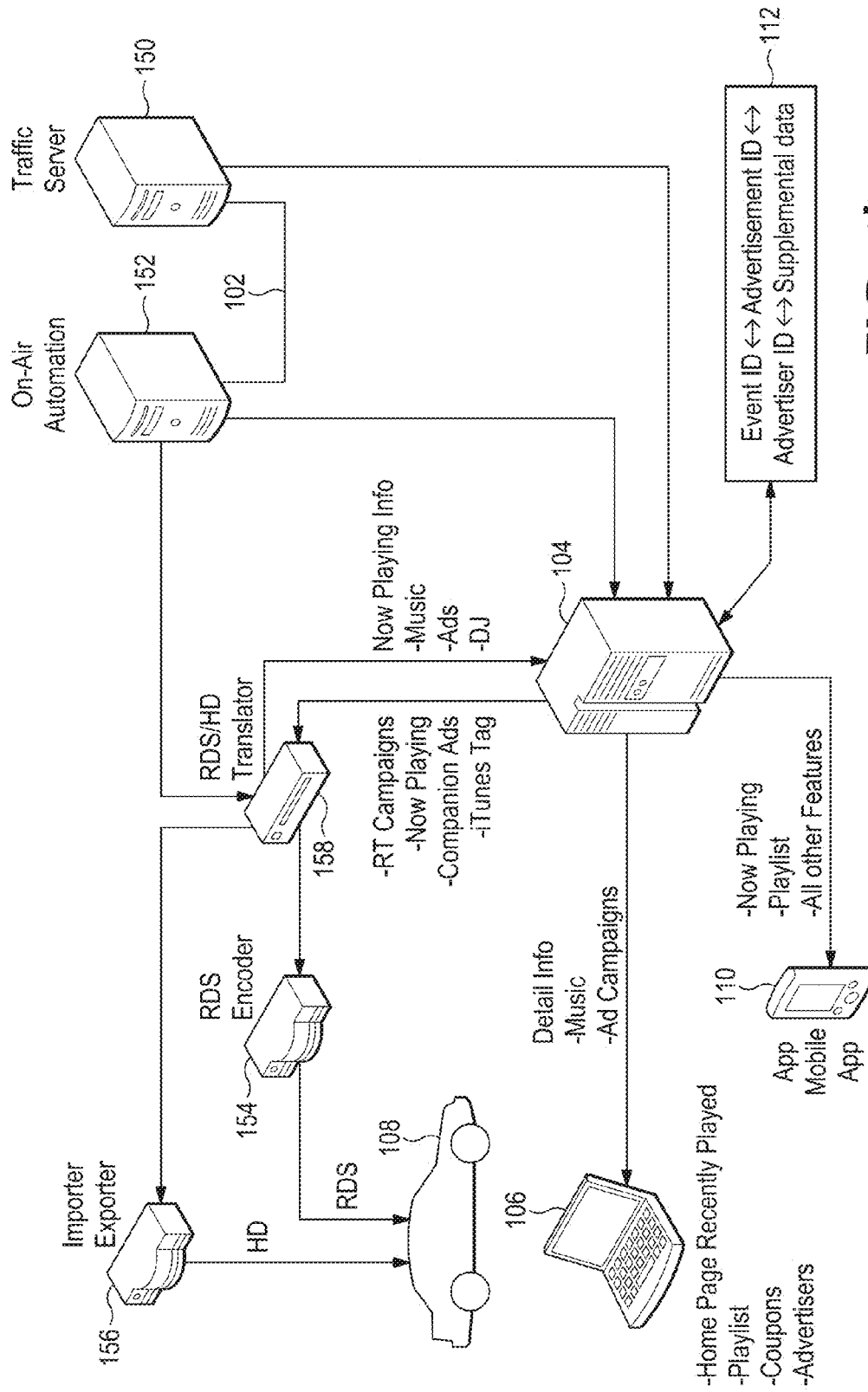
FIG. 1b depicts a system for interactive radio advertising.

FIG. 1b is a block diagram illustrating a system for providing coordinated and interactive radio advertising services to one or more subscriber radio stations and/or advertisers on one or more of a variety of media platforms.

In an example, a radio station server 102 may comprise two servers, an automation system server 152 and a traffic system server 150. Automation system server 152 may send information to interactive radio server 104 about what is currently being broadcast by the radio station. The current broadcast information may be communicated in message 124 (see FIG. 1). Message 124 may comprise various data types, for example, identification numbers to identify artists and song titles, generic information about an advertisement, identify a DJ talking, and/or identify other programming. In an example, each time a broadcasting event occurs (e.g., playing a song, advertisement and/or when a DJ talks), a new "EVENT" is generated by the automation system server 152. Details regarding the EVENT may be sent in message 124 (e.g., artist and title for a song, generic name for an advertisement etc.) to interactive radio server 104. Each event may be associated with an event ID in interactive radio server 104.

In an example, traffic system server 150 may control trafficking (i.e., timing, scheduling, editing, ordering and/or billing) of advertisements for radio station 134. Radio sales personnel may enter sales orders in the traffic system server 150 and may include information such as the advertiser name (e.g., McDonald's®) the advertisement title, billing details, and/or the approximate times they wish for the advertisement to play. As happens, sales personnel may schedule an advertisement to play at 12:10 pm EST, but in fact the advertisement will probably play at 12:20 pm EST. Each advertisement may be associated with an advertisement ID. The advertisement ID may be the same ID used by the automation system server 152 as the event ID which may be a unique identifier. The unique identifier (event ID) may change on a daily basis.

In an example, sales personnel may enter the information in the traffic system server 150 and request an air time. A program director may review the advertisements for the day and may change the schedule to optimize programming. For example, ads may be scheduled to play certain advertisements after particular songs or other advertisements, or also to avoid playing two competitor's advertisements in consecutive order and/or for additional reasons. When the programming list is refined, it may be transmitted to an automation technician who may schedule the advertisements to play as per the program director instructions. The advertisements may be entered in a database associated with automation system server 152. A different description of the advertisement may be entered into the automation system server 152.

In an example, interactive radio server 104 may receive trafficking data from traffic server 150 comprising a daily listing of advertisers and advertisements to be played for the day, the listing may include advertisement IDs and/or advertiser IDs and/or timing information. In another example, the trafficking data may be a bare listing of advertisement and advertiser IDs with no timing information. interactive radio server 104 may store the trafficking data in database 112 (see FIG. 1a). As advertisements are broadcast by radio station server 102, interactive radio server 104 may receive automation data from automation system server 152, for example in message 124. interactive radio server 104 may compare the trafficking data to the automation data as it comes in real time. An advertisement ID may be the same ID used by the automation system server 152 as the event ID. Thus, based on an advertisement ID received in the trafficking data, interactive radio server 104 may associate an advertisement playing over the air identified with a particular event ID with the advertiser identified in the trafficking data. interactive radio server may access database 112 where an advertiser may be associated with supplemental data 128 (FIG. 1a) that is configured or may be configured to be played and/or displayed in a variety of formats including, for example, RDS, HD, RDBS, SMS, and/or data and graphic formats for display on an Internet website or mobile device. In an example, supplemental data 128 to be transmitted to a car stereo may be formatted to RDS and/or HD by RDS/HD translator 158 and RDS encoder 154 or importer/exporter 156.

In an example, interactive radio server 104 may permit users to create items, containing supplemental data 128 or 129 to be displayed on a radio's assets (e.g., car stereo, Internet website, and mobile website). An item created by the user may be associated to an advertiser identified in the trafficking data. Therefore when an advertisement plays over the air, interactive radio server 104 may receive an event ID that can be associated to the advertiser as described above and the interactive radio server 104 may look up in database 112 what supplemental data 128 needs to be displayed on the car stereo, on the Internet and/or on the mobile platform and may send the supplemental data 128 to the pertinent outlet (e.g., laptop 106, mobile phone 110 and/or radio station server 102 (for RDS/HD)). Supplemental data 128 may be time/day/date/station specific. For example when a McDonald's® advertisement plays in the morning, and Egg McMuffin may be displayed, changing it at noon to a Big Mac.

Radio station server may transmit for display the name of the advertiser may not necessarily be the name identified by the automation system server 152 along with a supplemental data 128 such as a call to action or a coupon combining the audio with the visual increasing advertising branding and efficiency. Users may access additional information about the supplemental data 128 displayed by sending a text message to an identified number in the call to action including keywords associated with the supplemental data 128. When users interact they receive additional details on their cell phone including mobile coupons.

Radio station server 102 may send specialized messages to used devices corresponding to the supplemental data 128 to display specialized messages when the DJ is talking and/or when music or other programming is playing.

Messages may be sponsored by advertisers (e.g., "Geico® Save 50% today") and may be filtered many different ways:
a. Date
b. Day of the week
c. Time specific (multiple times a day)
d. Duration
e. Day part HD radio messages may also display the advertiser's logo when the advertisement airs or when the sponsorship is displayed. During radio programming such as when music is playing advertising messages may alternate with programming information (e.g. music title/artist name).

In an example, a media item 132 may be associated with a coupon, either in a daily deal format or in a standalone coupon format that may be accessible in a variety of forms, for example: in bar code form, in an email, over the internet, in a code provided in a text message, in a link to a printable copy of the coupon, in a mobile application and/or directly within the radio station website. Coupons may be offered in a separate website 900 (see FIG. 9a) or integrated in Interactive Panel 300. Mobile users may register and receive daily deals using the station coupons mobile app. User may also, register and receive daily deals via text messaging. In an example, radio DJs may promote the daily deals and drive users to register using any of the three methods above (see FIG. 9b).

FIG. 2 depicts an example of an integrated and interactive radio advertising campaign coordinated by interactive radio server 104 for Hutchinson Plumbing. Display screens for each of mobile telephone 110, laptop 106 and car stereo 108 are shown displaying advertising for Hutchinson Plumbing. Display of such advertising may be coordinated by interactive radio server 104 and may be shown at substantially the same time of day, responsive to receiving messages 124 and/or in association with a playlist 116. Timing for transmission of supplemental data 128 may be associated with receipt of message 124. In an example, interactive radio server 104 may also associate display of advertising data related to Hutchinson Plumbing in a website associated the radio station 134 with broadcasting of an audio advertisement by radio station server 102.

In an example, Hutchinson Plumbing may be an advertiser 137 and/or advertiser 136 as described with respect to FIG. 1. Display screen 208 on car stereo 108 may display supplemental data 128 comprising text data for advertising "Hutchinson Plumbing" including the slogan, "For all Your Plumbing" via RDS, RDBS and/or HD data. The text data may be displayed while radio station server 102 is broadcasting an audio advertisement for Hutchinson Plumbing. The supplemental data 128 may be communicated to radio station server 102 from interactive radio server 104 and may identify an association with the Hutchinson audio advertisement (a media items 132) identified as currently being broadcast in message 124. Radio station server 102 may broadcast media item 132 and supplemental data 128 together.

In an example, laptop 106 may access interactive radio server 104 to display website 212. Website 212 may be associated with radio station 134 and may be configured to display a variety of media items related to radio station 134 broadcast activities. For example, website 212 may display a playlist and advertising. Website 212 may display supplemental data 129 comprising one or more advertisements for Hutchinson Plumbing when radio station server 102 is broadcasting supplemental data 128. Website 212 may comprise Interactive Playlist Panel 300 discussed in great detail with respect to FIG. 3. Display screen 210 on mobile telephone 110 displays a user interface for mobile Internet comprising supplemental data 129 as well.

Mobile Device Tagging

In an example, a user may tag radio advertisements using SMS text messaging. In an example, when a user hears an advertisement the user may send a text message to a radio station using a specific keyword to receive information back in a text message. The information may include a link to a webpage generated automatically based on the selection and may be hosted by interactive radio server 104. The webpage may be specific to the advertisement containing the interactive information and/or a mobile coupon.

Email Marketing

In an example, a user may access email marketing features including an easy and powerful interface allowing radio stations to create and distribute marketing material to user databases via interactive radio server 104.

Ad Play Validation

In an example, an advertiser may login to interactive radio server 104 to check advertisement playtimes on select stations giving them a third party validation to the true times their advertisements aired. This information may be compiled based on playlist 116. This feature addresses a major issue in radio where the scheduled advertisements provided to advertisers and the real time the advertisements aired are not the same. Currently advertisers subscribe with providers such as Media Guide to provide them with this data.

Third Party Applications

Interactive radio server 104 may communicate advertising data with third party applications or phone applications or SMS providers so that radio stations using those applications may take full advantage of coupons capabilities without changing their providers.

Interactive Playlist Panel (IPP)

Figure 3:
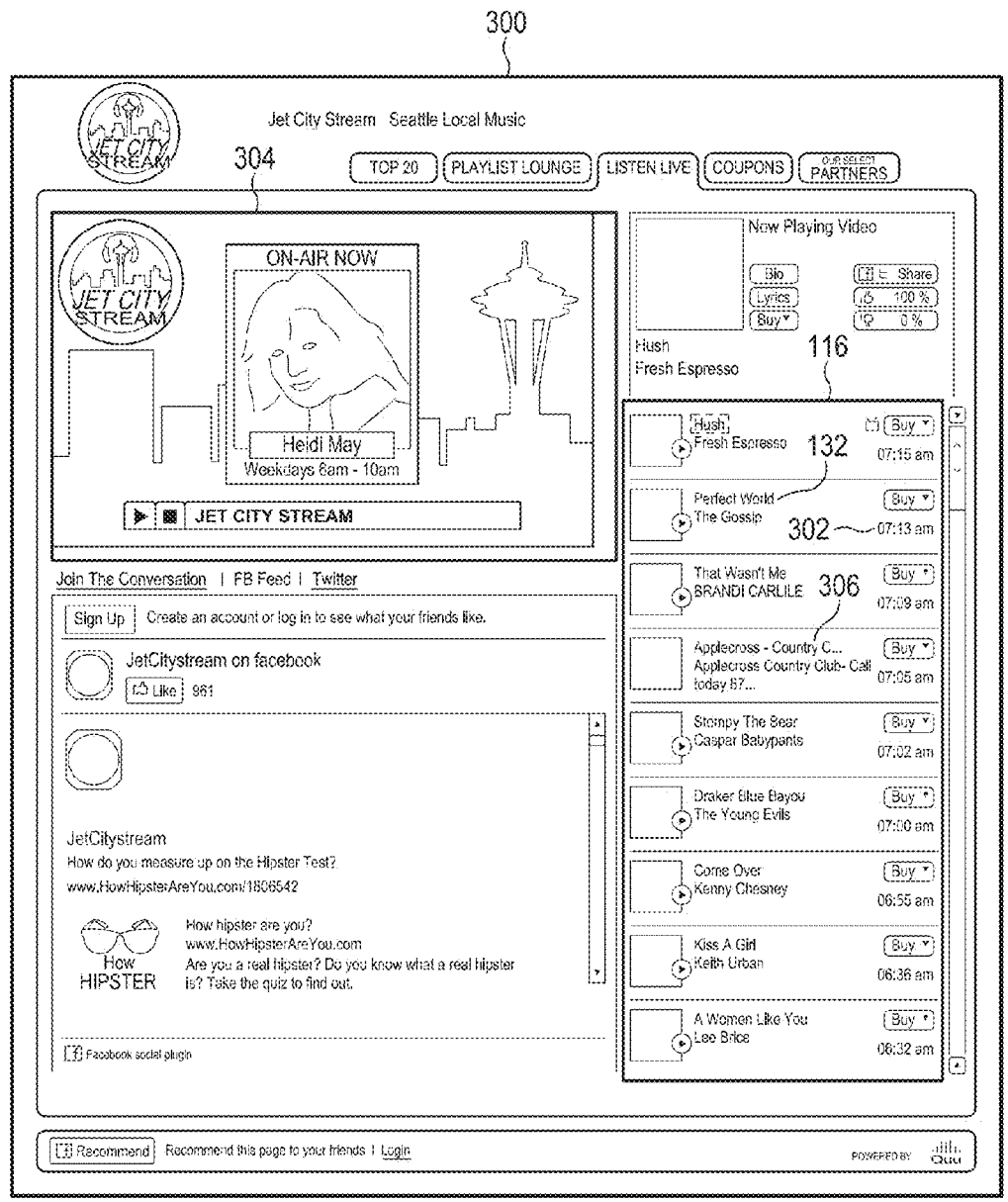
FIG. 3 illustrates an example of a user interface comprising an interactive panel.

FIG. 3 illustrates an example of a user interface comprising an interactive panel 300. Interactive panel 300 displays playlist 116. Playlist 116 may be compiled by interactive radio server 104 based on one or more messages 124 identifying media item 132 as it is being broadcast by transmitter 130 substantially in real-time. Playlist 116 may include a listing of radio station 134 programming including advertising, music, DJ talk, interviews and/or other programming for any reasonable period of time, for example, seven days. interactive radio server 104 may display a version of playlist 116 in interactive panel 300. Playlist 116 as displayed in panel 300 may be configured to include at least one of the following: media item 132 identifier (e.g., a name of song, an advertiser name, a name of on-air personality corresponding to programming included in playlist 116, or combinations thereof), a time stamp 302 indicating when media item 132 was broadcast by radio station 134, a link 304 to a video that may be embedded and associated with media item 132 and a trigger to change a background skin. Such a trigger 306 may be associated with a link to access a particular media item.

Figure 4:
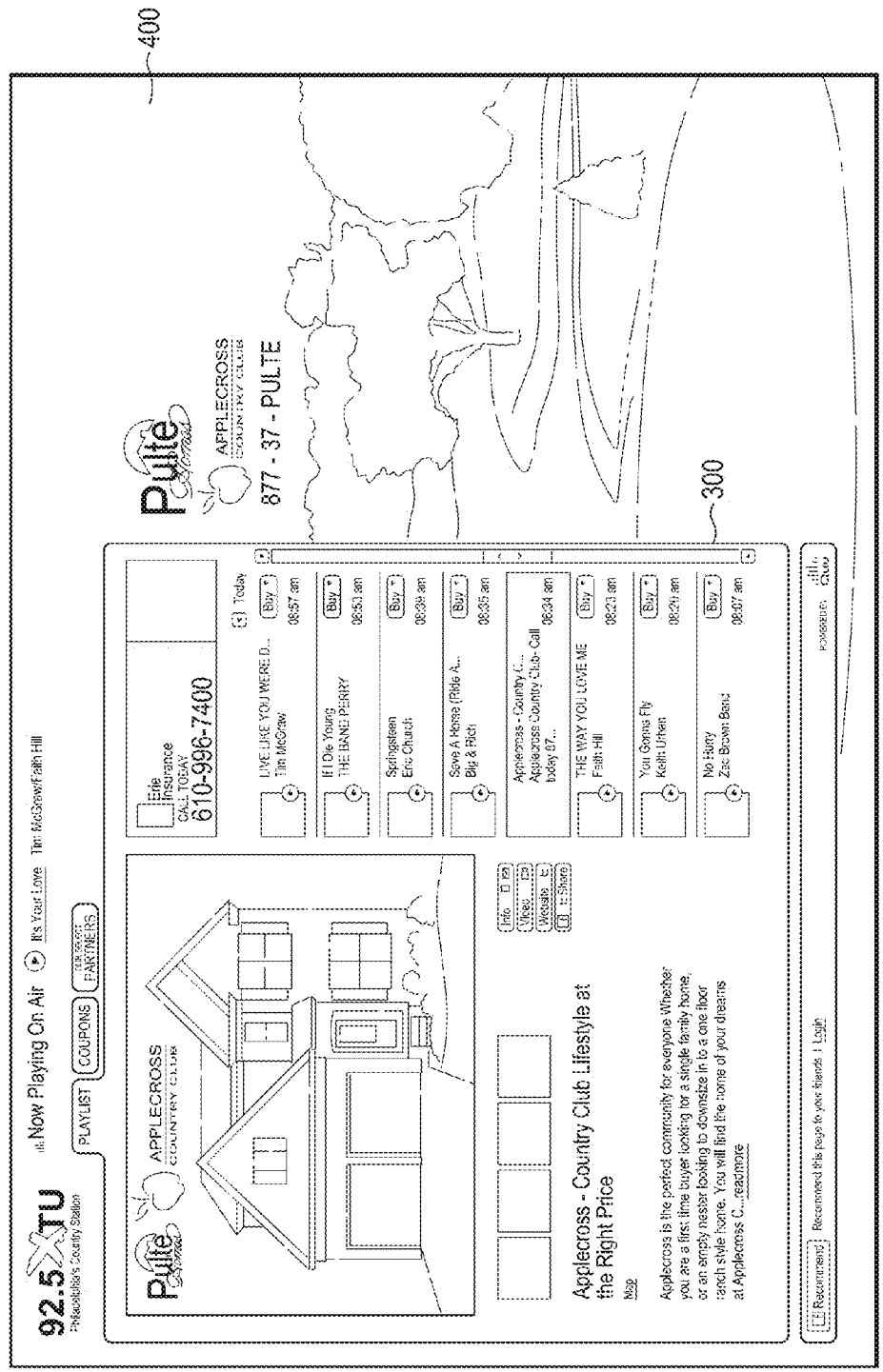
FIG. 4 illustrates an example of a user interface comprising an interactive panel.

In an example, panel 300 may be associated with a website provided by interactive radio server 104 and may be a central portal for one or more other websites integrated by interactive radio server 104 in panel 300. Panel 300 may be invoked from within a separate website hosted by radio station server 102 (or another server associated with radio station 134). In one example, a panel 300 website may be accessed through a Now Playing widget on a different website. Panel 300 may also include the following: detailed information on music, detailed information on advertisements, links: to coupons, featured products, events, daily deals, Watch Radio On-Demand, and/or search capability for music and advertisements. In an example, an advertiser may sponsor the playlist 116 and/or background skin 400 (see FIG. 4).

When users click (select with a mouse) on a song they may be direct to another website to purchase the identified media item 132, download a ringtone associated with the media item 132, view artist biographical information and lyrics, add media item 132 to a preference list, and/or set mobile alerts when the media item 132 plays the radio or when an associated artist plays on the radio, or combinations thereof.

When users click on a media item 132 that is an advertisement they may request more information from the advertiser by filling a request form, listen to the audio from an associated Radio advertisement or infomercial, watch a video related to the media item 132 (e.g., television advertisement or infomercial), download mobile or printable coupons, receive daily deals, read the detailed description, link to the advertiser coupons website and map, and/or share information about the advertisement through a social network, or any combination thereof.

Pop-Ups

Figure 5:
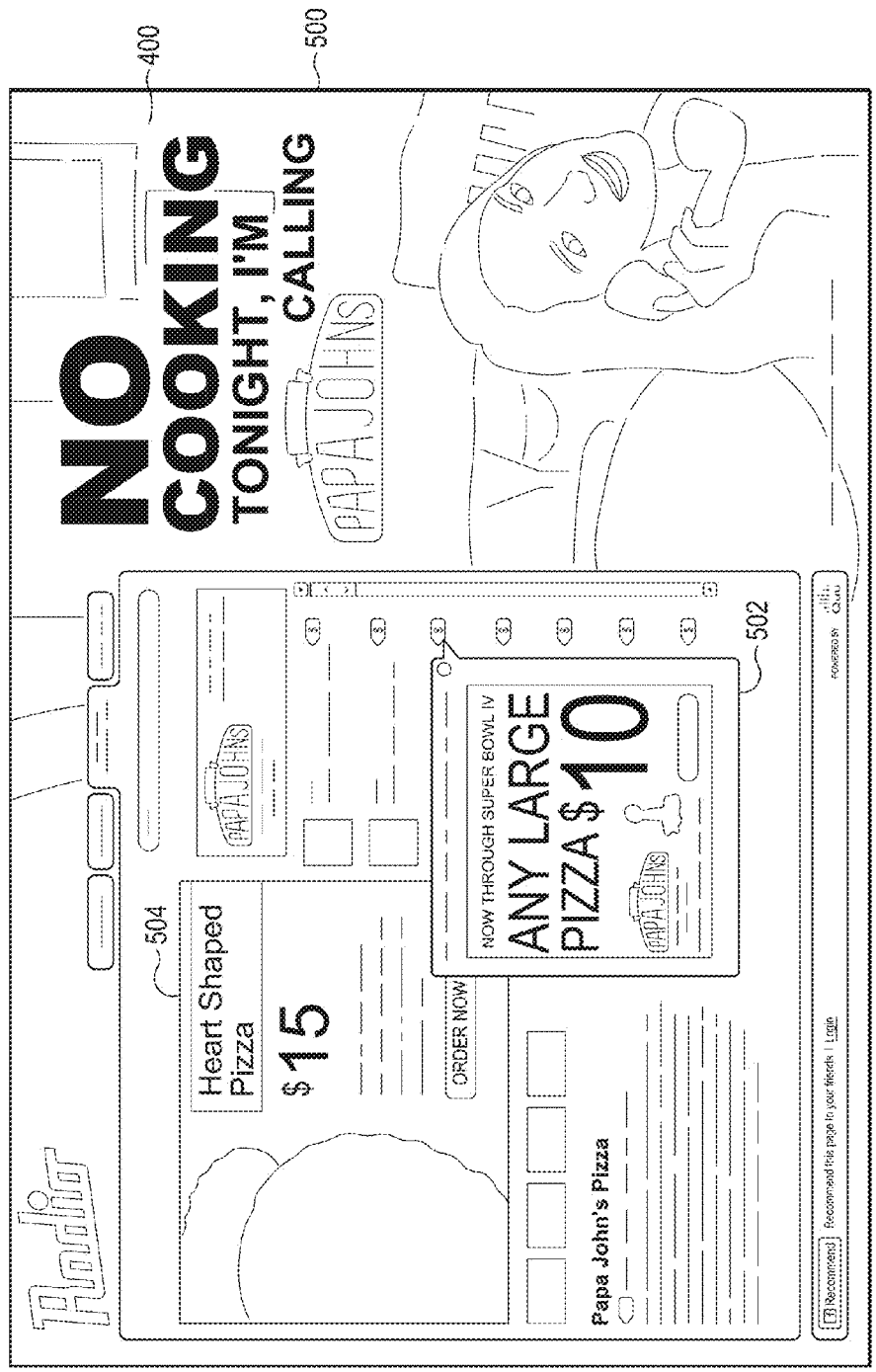
FIG. 5 illustrates an example of a user interface comprising an interactive panel for use in connection with some embodiments of the present disclosure.

FIG. 5 illustrates an example of a user interface comprising an interactive panel 500. From the display of playlist 116 in interactive panel 500, a pop-up window 502 may be activated when a user selects a corresponding media item 132 in playlist 116. Selecting the media item may activate interactive radio server 104 to change a background skin and/or to embed a coupon 504 in interactive panel 500 associated with the media item 132.

Alerts

Figure 6:
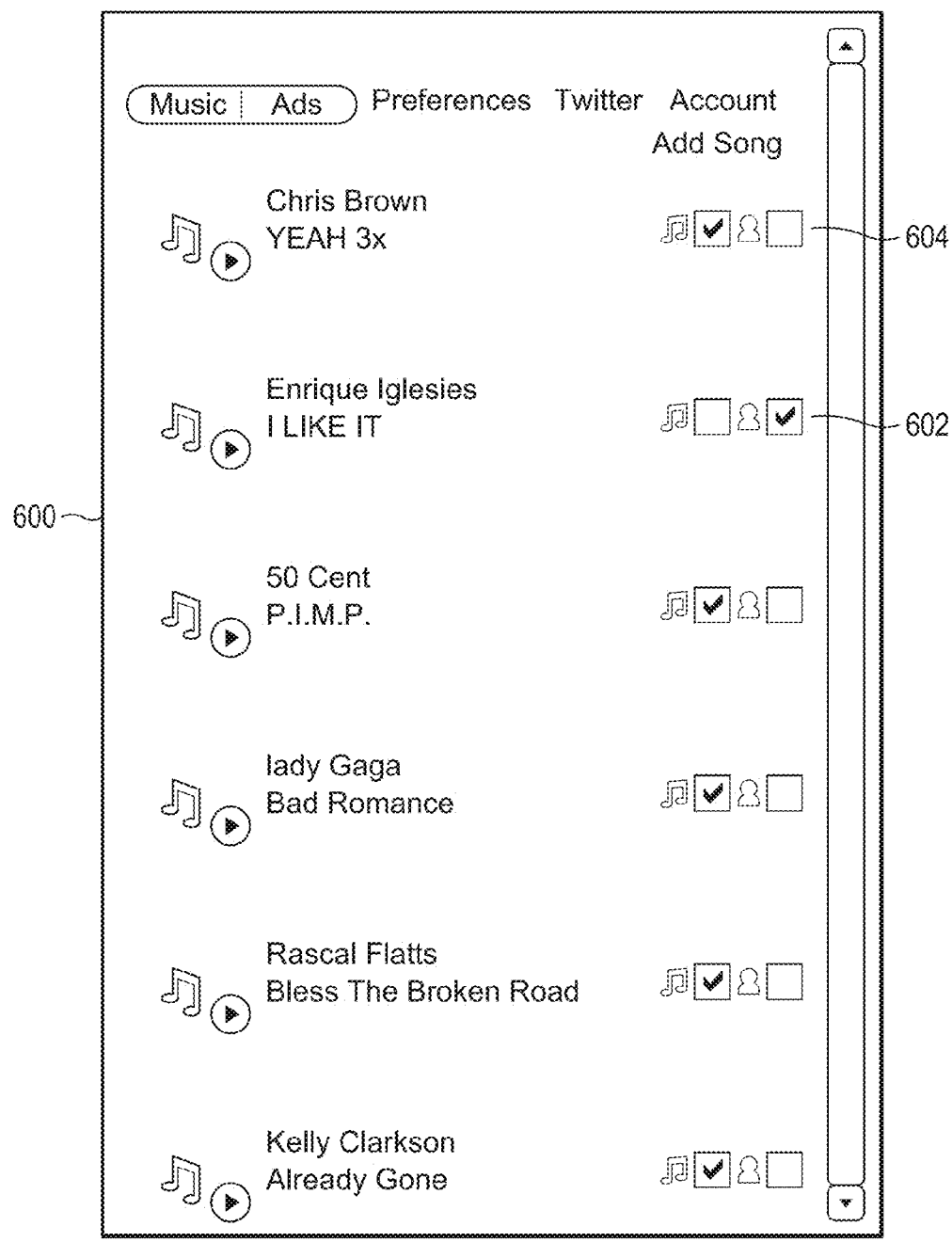
FIG. 6 depicts an interactive radio programming mobile interface for an alert application.

FIG. 6 depicts an interactive radio programming mobile interface 600 for an alert application that may run on interactive radio server 104 or any other appropriate device. A user may access the application via a variety of devices including: a mobile device such as a cell phone, a computer, a laptop, and/or a notepad. The alert application may be used to create mobile alerts to notify a user that a selected media item 132 in playing on the radio. Alerts may be sent to the user device based on message 124. Alerts may be created in from the radio station website hosted by radio station server 102 and/or users may register via an interactive radio server 104 hosted website. To register a user merely identifies a media item of interest and a device to which an alert is to be sent. The alert application may search for the identified media and send an alert to an identified device. Alerts may be based on an associated radio station 134 playlist 116. Users may indicate whether the alert should be based on a particular media item 602 or an artist 604 who may be associated with several media items in a playlist. In an example, their cell phones using text messaging listeners may register and search for music directly from their phones. From their cell phones accessing interactive radio server 104 or radio station server 102 listeners may create alerts using the alert application and receive alerts either via the application via the Internet, mobile Internet or a text message. A listener may set their preferences to how often to receive alerts as well as turn off the alerts during the night.

Mobile Device Tagging

Listeners may tag music or advertisements using simple text messaging. When a user hears an advertisement he/she may simply text a station keyword to a phone number identified in the broadcast. In response, listeners may receive a text message containing the more information about products, services, name of the song and/or the artist.

Business Interface

Figure 7:
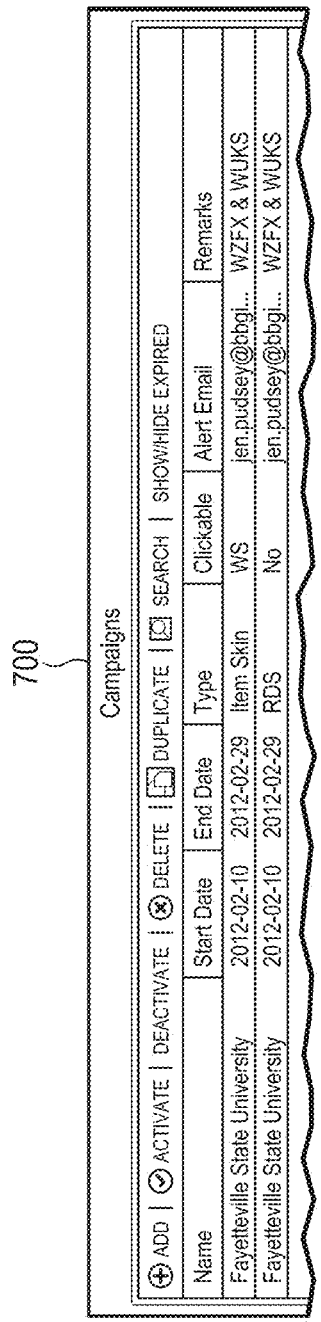
FIG. 7 depicts an example of an interactive radio programming user interface 700 for a backend customer service and upload (BCSU) application.

FIG. 7 depicts an example of an interactive radio programming user interface 700 for a backend customer service and upload (BCSU) application that may run on interactive radio server 104 or any other appropriate device. The BCSU application may facilitate communication between interactive radio server 104 and an advertiser 136 or 137 and/or a radio station 132. The BCSU application may be web based and designed for radio advertising sales departments. The BCSU application may allow radio station or advertising personnel to upload media rich information such as pictures video description etc. and attach the uploaded media to an advertisement identified in the playlist 116. In an example, a user may request that the advertisement be made interactive by selecting one or more campaign types, including, for example: on-air, online, background skin, supplemental data RBDS, supplemental data RDS, supplemental data HD, SMSI mobile coupon, and/or print coupon, any combinations thereof. Campaign types may include other categories and claimed subject matter is not limited in this regard.

Interactive Programming

Figure 8:
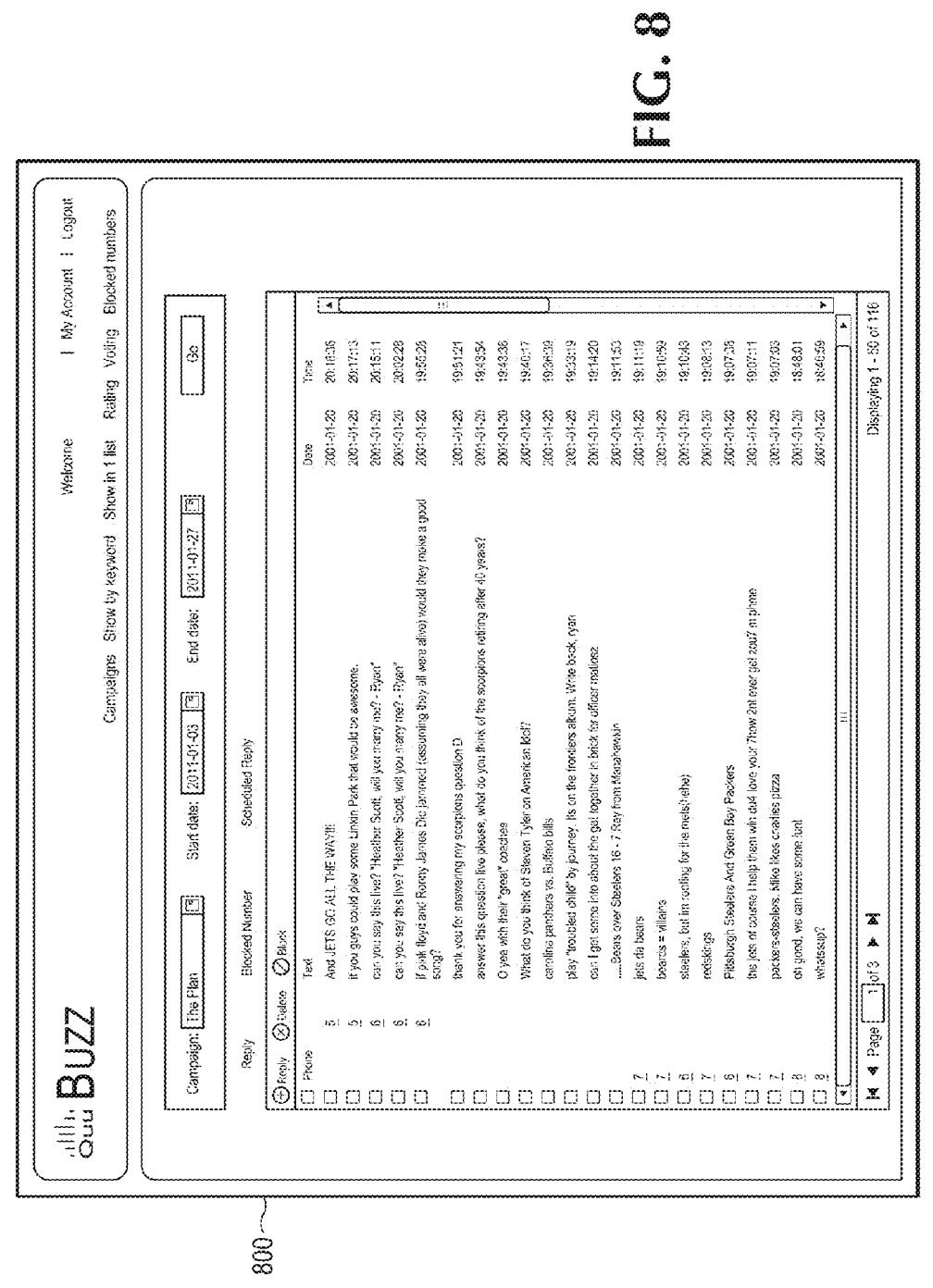

FIG. 8 depicts an interactive radio programming user interface 800 for an interactive radio programming (interactive radio) application that may run on interactive radio server 104 or any other appropriate device. The interactive radio application may facilitate communication between users and radio station personnel such as Disc Jockeys (DJs), on-air talent and/or with each other. Users may send a response to votes solicited by radio station DJ during programming. Users may also opt-in via the radio station website to receive updates on different subjects such as emergencies or news. A DJ may control interaction from a single control panel and may respond to one or more users at the same time. The interaction may take place through multiple outlets.

In an example, short message system (SMS) users may send text messages to correspond with the DJ and may receive replies from the DJ through the user interface 800. Users may also receive text message alerts or reminders on subjects or shows they are interested in via other user devices such as laptop 106 and/or mobile phone 110.

In an example, through an interactive panel chat room users may interact with the DJ as well as each other. The DJ may receive the comments in the same panel where he/she views the sms messages combining online and offline users. Messages, comments, votes and/or other interactions with users may be displayed in user interface 800.

In another example, a user may send a text message to a radio station telephone to request the name of a song, to get alerts when their favorite music is playing, send comments to the station, vote and/or rate and receive updates on subjects of interest or mobile coupons. The radio station may respond with requested information as well as supplemental data 128 including coupons or other advertising vehicles.

Daily Deals and Coupons

Figure 9A:
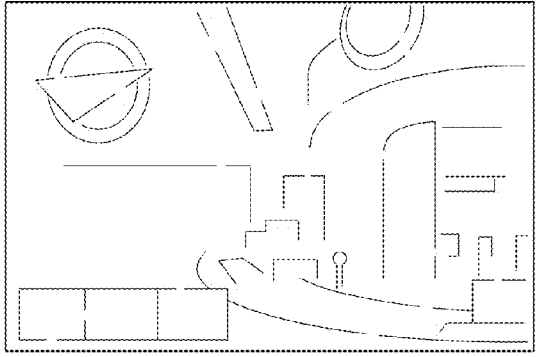
FIG. 9a depicts interactive radio programming interface for coupon distribution.
Figure 9B:
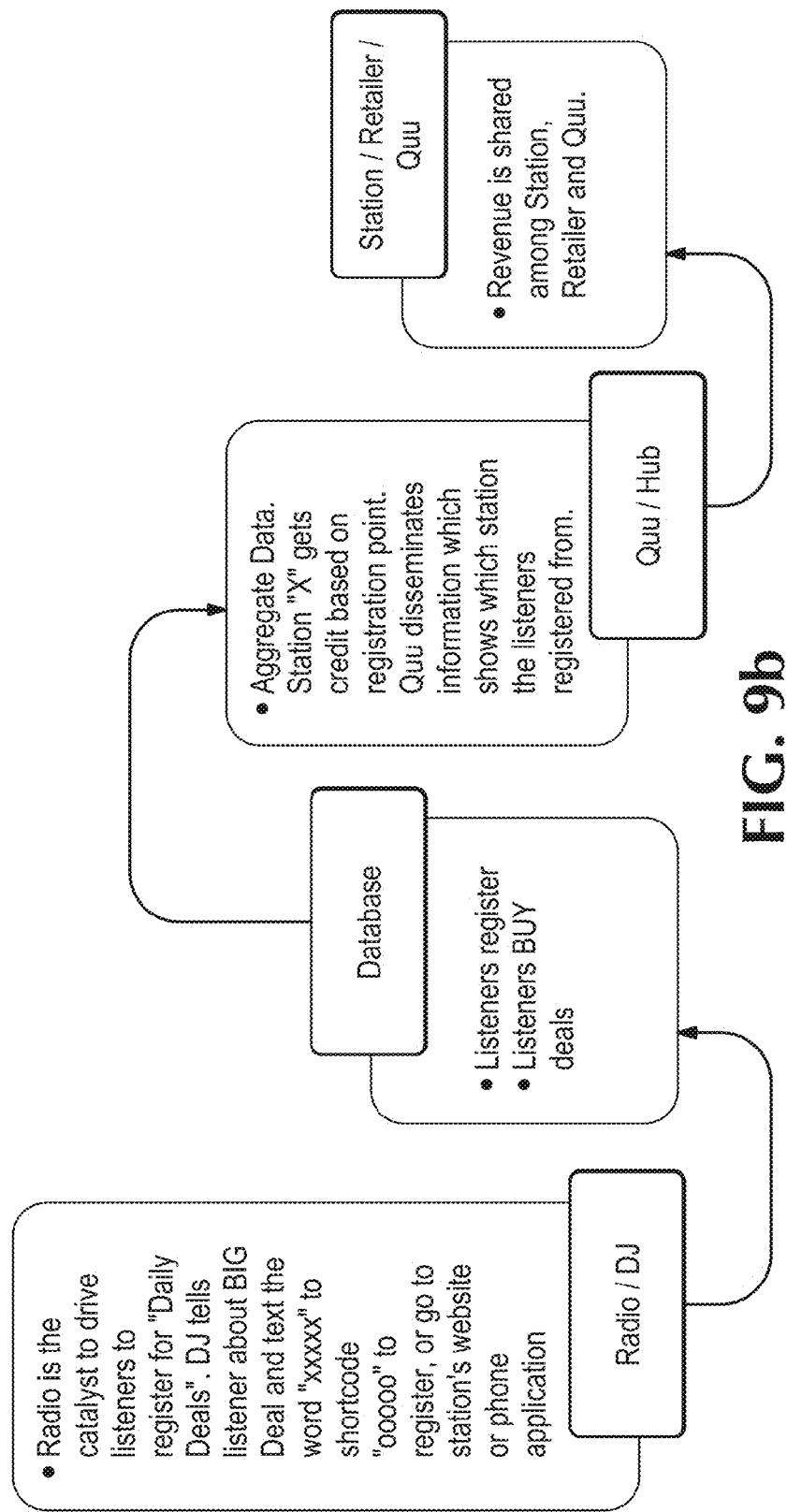
FIG. 9b depicts a flow diagram related to coupon distribution in an interactive radio programming system.

In an example, coupons associated with media items 132 may be available via a website hosted by radio station server 102 or via Interactive Panel 300. In an embodiment, users may register and receive daily deals via a radio station website or via interactive panel 300. In another example, coupons may be available from a separate daily deal website 900 as shown in FIG. 9*a*.

In another example, consumers may register and receive daily deals via text messaging. For example, radio DJs may promote the daily deals and drive listeners to register using any of the methods discussed above. Hence coupons engage listeners increase station website traffic and boost revenue (see FIG. 9*b*).

Watch Radio On-Demand (WROD)

Figure 10:
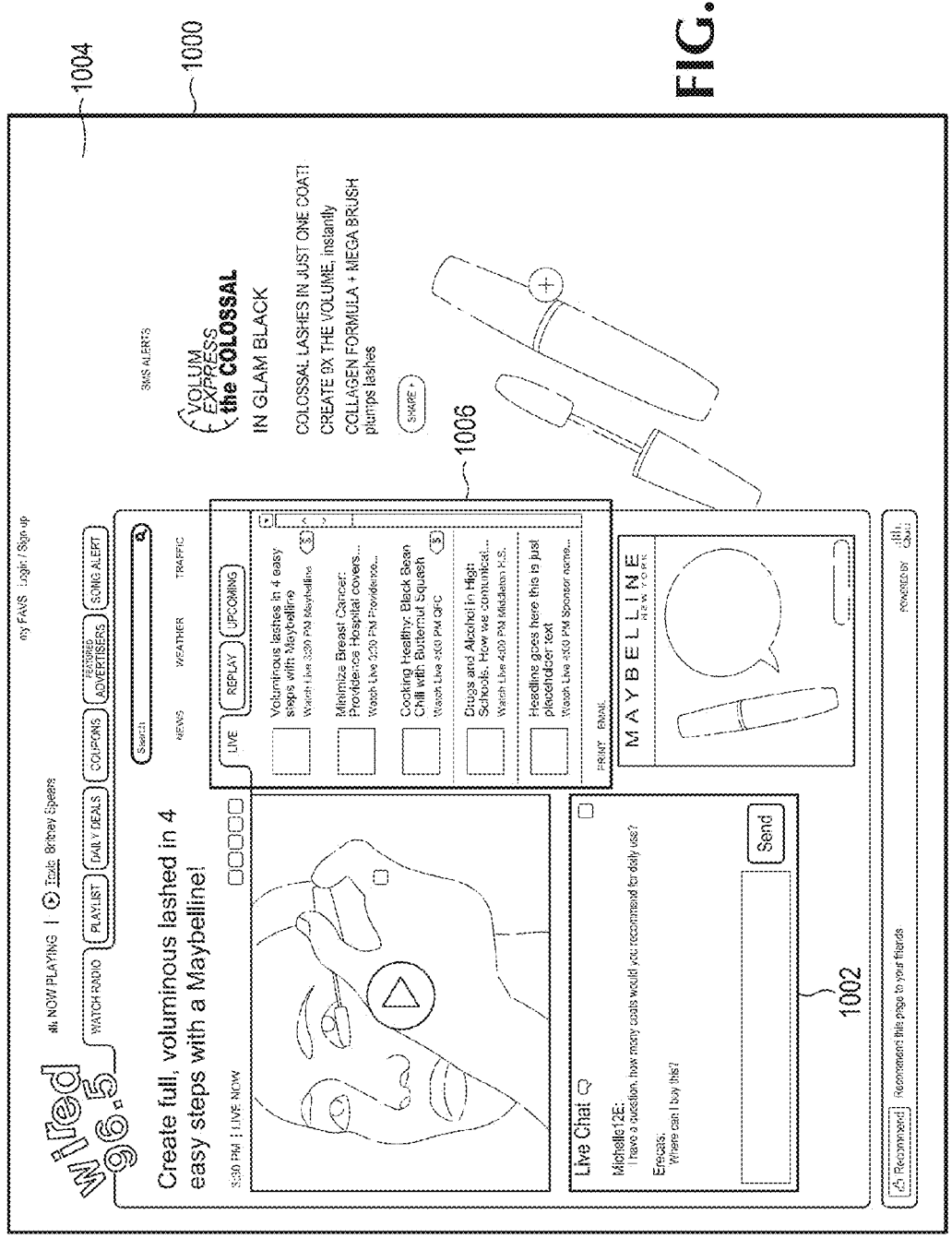
FIG. 10 depicts an interactive radio programming user interface.

FIG. 10 depicts a user interface 1000 for an application to facilitate video display during a corresponding radio broadcast (coined WatchRadio On-Demand). The video display application may be accessed by a user via interactive radio server 104 or another appropriate device. WROD displays a live or prerecorded stream of video content that may be streamed to a radio station website by interactive radio server 104 (or another device) while a radio broadcast associated with the streaming video content is being broadcast by radio station server 102. In an example, a user may chat with a presenter featured in the streaming video while the programming is being performed and broadcast live. Similarly, a user may chat with other users during the live broadcast. Live chat may be displayed in panel 1002. A background skin 1004 may be configured to advertise a product featured in the video.

In another example, user interface 1000 provide a link or an panel featuring a coupon for the product featured in the streaming video or may offer a different unrelated product. The type of videos available may be catered to the station demographic audience. In an example, radio station server 102 may broadcast live video from within the radio station 134 studio letting listeners watch the DJ and chat with him/her as well as amongst each other. When a radio advertisement plays the video of the advertisement if available and may automatically start playing. Videos may be archived and made available via user interface 1000, for example, in panel 1006. The product offers many features such as but not limited to: preshow video, advertising, pay-per-view, user registration, consumer feedback and etc. In an example, video may be provided by a third party vendor and presented in an iframe within a website associated with radio station 134 and may be server by interactive radio server 104.

Mobile Marketing

Interactive radio server 104 may coordinate a mobile marketing campaign making detailed information about a traditional advertisement (e.g., radio, TV, billboard etc.) available to consumers via a texting campaign. In an example, a keyword consumers may text to request more information may be associated with media items 132, supplemental data 128 and/or supplemental data 129. When consumers send the keyword in a text message to the identified number, the interactive content is sent to their cell phones along with coupons when available.

Now Playing (NP)

Figure 11:
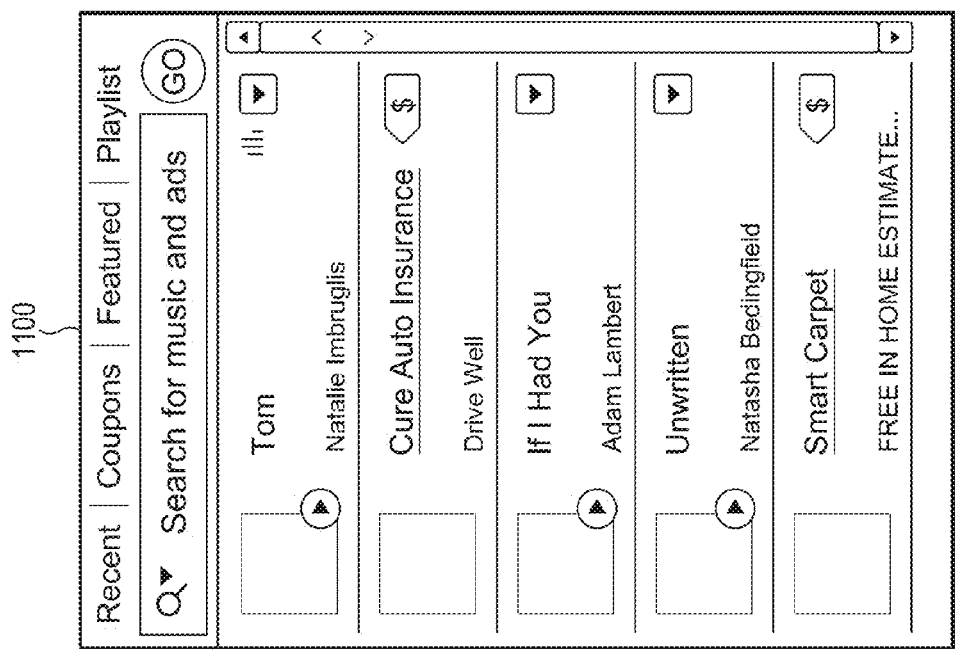
FIG. 11 depicts a Now Playing widget 1100 that may be web based and integrated in the home page of a radio station website hosted by radio station server 102.

FIG. 11 depicts a Now Playing widget 1100 that may be web based and integrated in the home page of a radio station website hosted by radio station server 102. The features of the NP include:

a. It features the most recent songs and advertisements played on the air. Both are clickable. One or both may be based on playlist 116 received from interactive radio server 104.

b. Quick links to coupons and featured products or events.

c. Quick Search for advertisements and music.

d. The widget may be sponsored by one or more advertisers.

e. Appearance and size are configurable to match radio branding.

In an example, a user may access Interactive Panel 300 from the radio station website. In one example, Interactive Panel 300 may be accessed when a user selects a feature of the Now Playing widget. In an example, a user may insert advertising in the Now Playing widget in four different ways:

a. In the playlist in between songs both in NP and QIP.

b. As a background skin in the QIP.

c. As a large advertisement in the QIP prior to displaying any song details when the user opens the page.

When a user clicks on a song or an advertisement it opens an Interactive Panel 300 which displays the details pertaining to the song or advertisement they clicked on. Listeners may purchase songs from iTunes® or Amazon® to download the ringtone examine the lyrics and artist bio or add the song to their favorites list or alerts (described above).

If users share the song or the advertisement through Facebook®, Twitter® and other social networks, the shared link may open the Interactive Panel 300 of the originating radio station. Hence the station benefits in increased website traffic.

Figure 12:
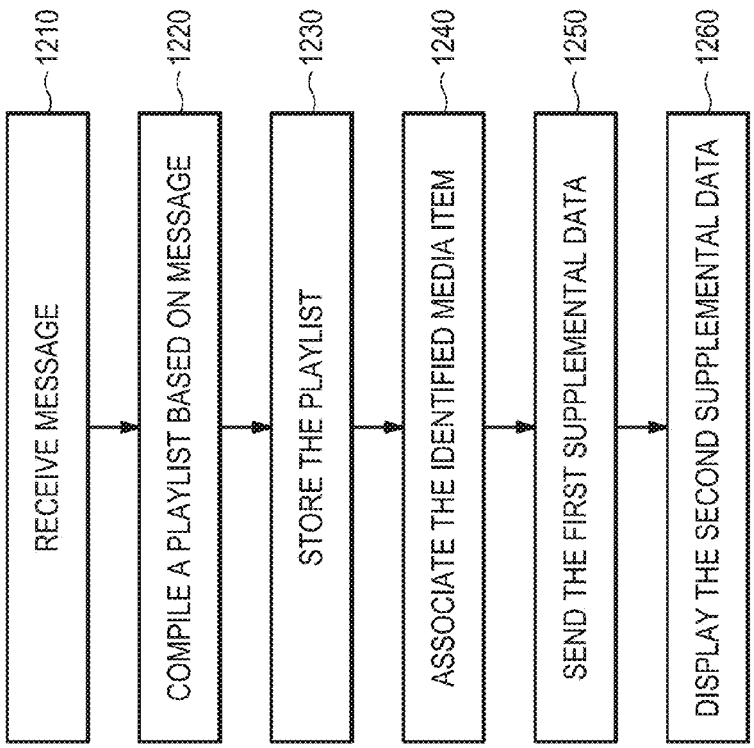
FIG. 12 depicts a process for providing interactive radio service.

FIG. 12 depicts a process 1200 for providing interactive radio service. In operation 1210 an interactive radio server receives a message identifying a media item comprising a song or an advertisement, or a combination thereof. In operation 1220, the interactive radio server compiles a playlist based on the message, wherein the playlist identifies a plurality of media items comprising at least one advertisement and at least one song. In operation 1230, the interactive radio server stores the playlist in a database. In operation 1240, the interactive radio server associates the identified media item with a first supplemental data and a second supplemental data. In operation 1250, the interactive radio server sends the first supplemental data to a radio station server to be broadcast substantially simultaneously with the associated media item. In operation 1260, the interactive radio server displays the second supplemental data on a website, wherein the website is configured to be accessed by a computer and a mobile device.

Figure 13:
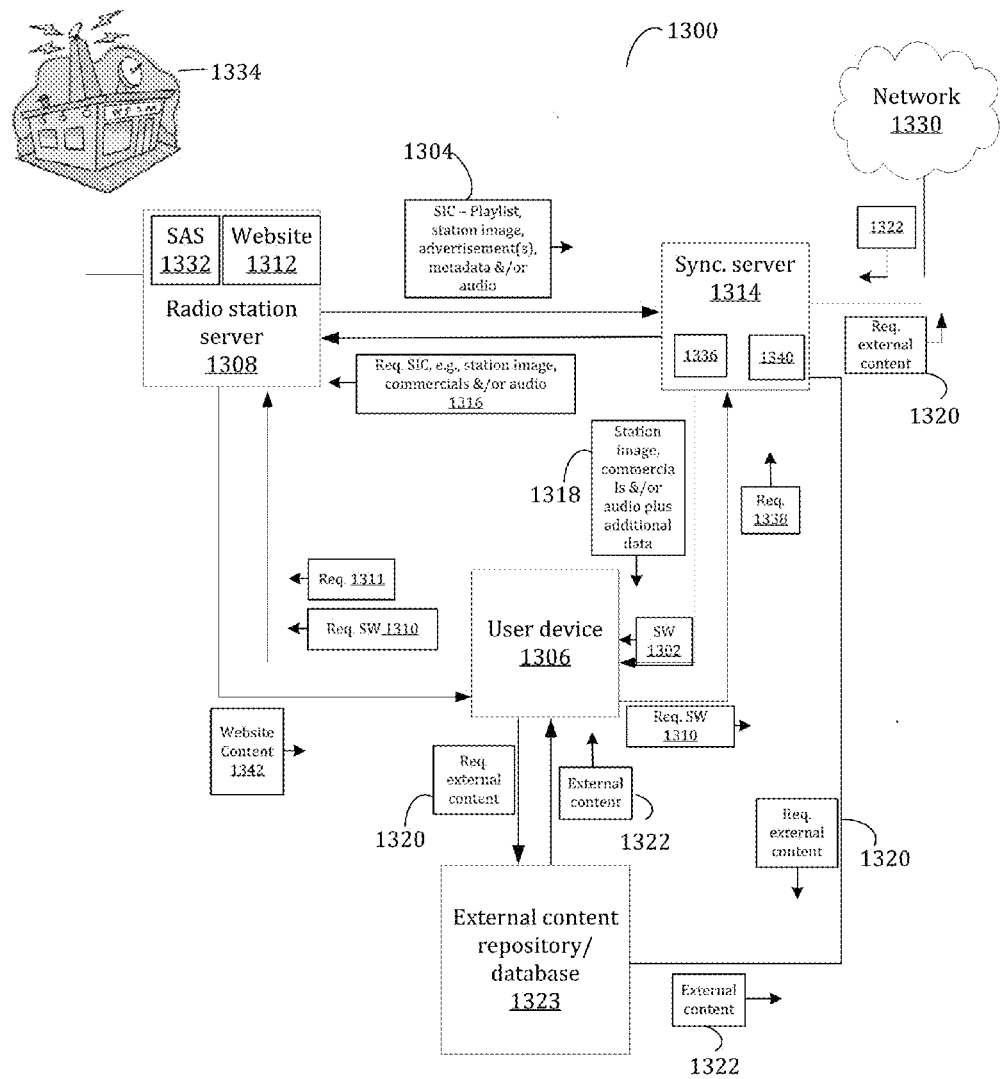
FIG. 13 depicts an example of a system for synchronizing radio content and external content.

FIG. 13 depicts an example of a system 1300 for external content integration, synchronization and cross-platform advertising synchronization in third-party devices. In an example, radio station 1334 may generate content which may be identified in station identified content (SIC) 1304 generated by Station Automation System (SAS) 1332 and may include any radio station intellectual property such as:

a playlist of songs and/or other radio station content, commercials, station imaging and/or any media content provided by the radio station via any transmission method. In an example, system 1300 may present SIC 1304 in a format synchronized to the actual over-the-air broadcast of a radio station—virtually in 'real-time' or in random order. SIC may include metadata for example an identifier of a song or other media item.

In an embodiment, a user device 1306 may access station identified content and/or synchronization content 1318. In another embodiment, application software 1302 sent from synchronization server 1314 may enable user device 1306 to access music station identified content (SIC) 1304 and/or synchronized content 1318. In an example, user device 1306 may comprise a computer, a tablet, a billboard, electronic sign, in-car radio equipped with RDS or HD, a mobile telecommunication device and/or the like.

In an example, when a user accesses radio station website 1312 from radio station server 1308, synchronization server 1314 may be accessed and may provide a video presentation experience like that of a television or cable TV channel, effectively presenting a radio station as a video channel via player 1340. In an embodiment, player 1340 may provide user device 1306 with synchronized content via synchronization server 1314.

In an embodiment, user device 1306 may send a request 1310 for synchronization application software 1302 to synchronization server 1314. Server 1314 may send application software 1302 to user device 1306 for downloading to user device 1306.

In an alternative embodiment the software 1302 may be sent to user device 1306 by radio station server 1308. Upon accessing radio station website 1312, user device 1306 may send a request 1338 for SIC 1304 and/or synchronized content 1318 to synchronization server 1314. In one example, request 1338 may be sent by user device 1306 responsive to downloading application software 1302. A request 1338 for SIC 1304 and/or synchronized content 1318 may comprise a request to access any synchronized content including any of: radio station content such as a playlist, images, live stream, audio, external content associated with SIC and the like. In response to request 1338, synchronization server 1314 may send a request 1316 for SIC 1304 to radio station server 1308. In response, radio station server 1308 may send SIC 1304 to synchronization server 1314. In an example, synchronization server 1314 may then forward synchronized content 1318 including requested SIC content 1304 along with synchronized external content 1322 to user device 1306. The external content 1322 included in synchronized content 1318 may comprise ay additional data that is associated with the SIC 1304 such as: artist biography, lyrics, the Uniform Resource Locator (URL) for a matching video publicly available by a service provider such as YouTube or VEVO, advertising, public service announcements, merchant data, social media links and/or the like.

Figure 15:
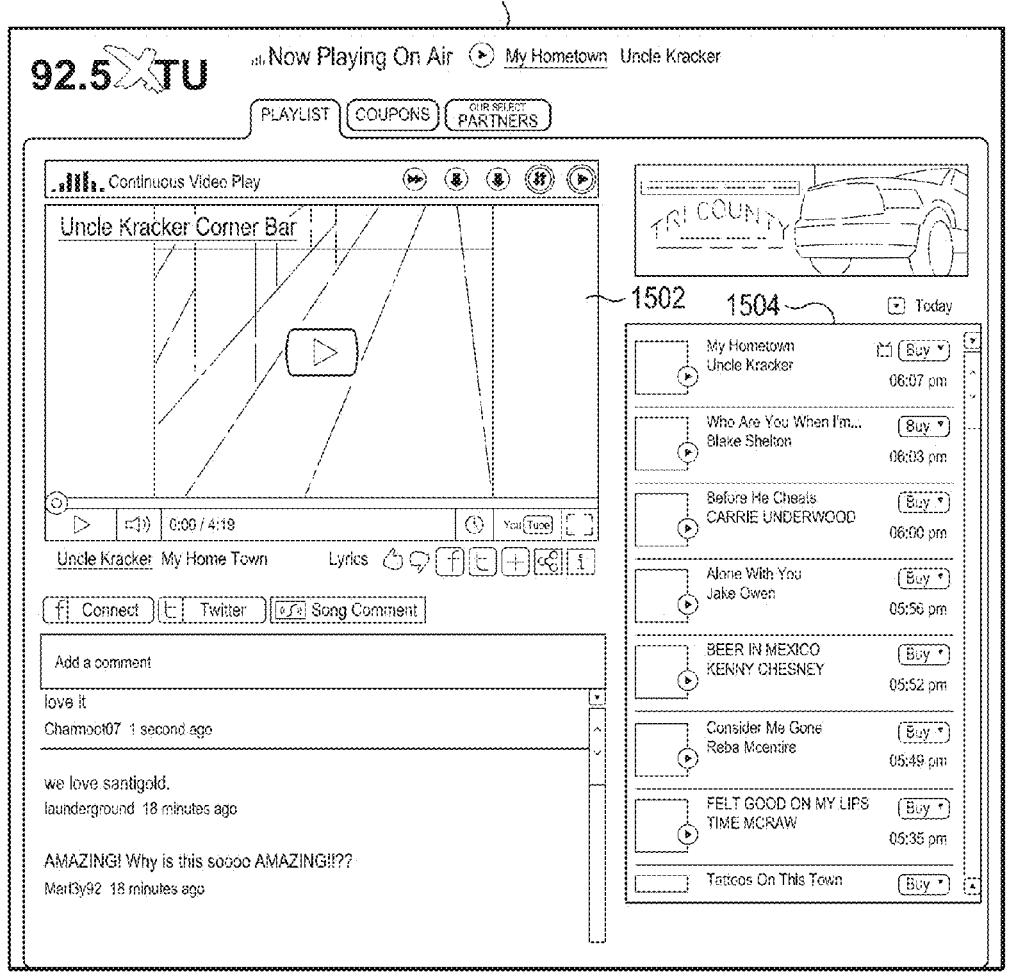
FIG. 15 depicts an example of a GUI for a player for a system for synchronizing radio content and external content.

In an example, user device 1306 upon accessing or receiving synchronization content from synchronization server 1314 may receive a link to access additional data such as a video from an external content repository 1323 to play within frame of player 1340 (see FIG. 15 element 1502). In another embodiment, application software 1302 may automatically send a request 1320 for external content 1322 associated with the available video URL received in synchronized content 1318 directly from user device 1306 to an external content repository/database 1323. Responsive to the request 1320, external content repository/database 1323 may send external content 1322 to user device 1306. User device 1306, responsive to application software 1302 instructions may embed external content 1322 such as an associated video within player 1340 and/or website content 1342.

In one embodiment, synchronization server 1314, may be separate from the station server 1308 and may generate synchronized content 1318 by mixing one or more of the following: radio station intellectual property, video, audio, publicly available video on the Internet 1330 (or other network), station imaging (e.g., logos, or pictures of DJs of the radio station), or internal videos, etc. and/or video and/or audio commercials available on the synchronization server 1314 between music videos available from a variety of sources. The radio station server 1308 may comprise a station automation system (SAS) 1332. SAS 1332 may generate and send metadata identifying radio station content such as what songs are playing, artist/title, advertisements, disc jockey talking, and the like with SIC content 1304 to synchronization server 1314. The metadata may identify an order that SIC content 1304 is transmitted from radio station 1334 (e.g., when ads/interviews/songs are playing or the DJ is talking). Music metadata may be assembled using one or more content databases available via Internet 1330 such as YouTube for videos, Lyricfind for lyrics, and/or the like. Advertisement information may be stored on synchronization server 1314 and served directly from synchronization server 1314. The advertisement information may be uploaded to synchronization server 1314 by radio station 1334 or by a user using an application which allows the user to upload all the pertinent information such as description, location, phone number, pictures, video and audio, and assembles this into an automatically generated panel that is viewed in the playlist page or the mobile application when the user clicks on the advertisement.

Content associated with SIC 1304 identifiers may be stored on synchronization server 1314 and/or may be stored in a variety of other locations. For example, content associated with SIC 1304 identifiers may be available on external content repository or database 1423, available on a remote server accessible via the Internet 1330 and/or available from the radio station server 1308.

In one example embodiment, synchronization server 1314 may assemble all the synchronized content 1318 and send it to user device 1306 to be displayed in a playlist format on user device 1306. In one embodiment synchronized content 1318 may be displayed as a playlist in a frame displaying within a radio station website on user device 1306. Regarding the video, synchronization server 1314 may send only the URL to that video, therefore, when the user clicks on the song, or when the player automatically selects a song, the URL is invoked by the player, and is called from the user device 1306. In this way the video may display on user device 1306 without requiring the video content to route through the synchronization server or the radio station server 1308.

In another example embodiment, synchronization server 1314 may host and/or serve the radio station website content 1312 with the radio station content (like skins) and frame for music videos. The synchronization server 1314 may or may not host all the material like the music videos.

In one example embodiment, to generate synchronized content 1318, synchronization server 1314 appends additional data to the SIC content 1304 in the following way: if a playlist in SIC content 1304 received from radio station server 1308 identifies a song playing over-the-air on the radio station 1334, the synchronization server 1314 may locate a publicly available video version of the song to add to synchronized content 1318 such that the video version may be made available to play in a frame of the radio station website as displayed on a user device 1306. The synchronization server 1314 may obtain the video and/or URL from a database 1336 on synchronization server 1314 or via Internet 1330. Synchronization server 1314 may add the video content or an URL associated with the video content to synchronized content 1318 to be sent to user device 1306. Synchronization server 1314 may append additional information such as the lyrics, biography, purchase links, and/or the like to synchronized content 1318.

In an example, if SIC content 1304 calls for an advertisement, application software 1302 and/or synchronization server 1314 may integrate a video version of the advertisement with SIC content 1304. In one embodiment, when an advertisement plays on-the-air, the synchronization server 1314 may detect that an advertisement played based on metadata received from the station server 130 in SIC 1304. The video version of the advertisement may be hosted on an external content repository/database 1323, such as YouTube® or some other database server available as a host or may be hosted on the synchronization server 1314. In one embodiment, in a synchronization server backend, the station server 1308 may upload the pertinent audio, video or other materials that correspond to the advertisement. If the SIC content 1304 calls for station imaging synchronization server 1314 may have stored or may retrieve station imaging from another source, for example a remote server available over the Internet. Synchronization server 1314 may integrate the station imaging where indicated in SIC 1304 into the presentation of synchronized content 1318 on a display of user device 1306. Station images may be accessible and hosted on YouTube and/or another database server available as a host.

In an example, external content 1322 identified by SIC 1304 may be embedded in the radio station website 1312 from a third party provider comprising an external content repository/database such as YouTube, Bing Music, Yahoo Music or any available server hosting a music video, commercial, station imaging, and/or other intellectual property that may be called by the synchronization player 1340 (FIG. 15, element 1500) as directed by SIC content 1304 from SAS 1332. In an example embodiment, material may be embedded from the synchronization server 1314 automatically via application programming interface(s) (API(s)) and/or via synchronization player 1340.

Synchronization server 1314 may identify when advertisements are playing or the DJ is talking based on content identifiers in SIC 1304 coming from SAS 1332. When synchronization server 1314 and/or application software 1302 is operating in a real-time time mode approximating the over-the-air broadcast of SIC content 1304 as a virtual video presentation, application software 1302 and/or synchronization server 1314 may integrate a live audio or a video stream coming from a source provided by the station server 1308 with SIC content 1304 and stream the integrated content to user device 1306. In another example, a third party provider (for example, that services the station with a "live stream" functionality, see FIG. 21) may provide the live audio and/or video. In one example, the audio may be provided by the station, and the third party server provides the video or vice versa.

Synchronization player 1340 may also feature a social media section, where users may chat, tweet, comment, etc. about the station programming in general or about each song specifically and/or other topics. The social media area features tabs where listeners may select their mode of interaction: Facebook, Twitter, Music, and Comments, for example.

In an example, users may customize the user experience associated with accessing synchronized content 1318 via player 1340 by optionally selecting, via a button or other user input interface associate with player 1340, to access synchronized content 1318 in a synchronized or 'virtual live' mode where the synchronized content 1318 is presented in substantially real-time. Alternatively, a user may select to skip certain synchronized content 1318, randomizing the station SIC 1304, using SIC content 1304 from a prior day, or requesting older or newer SIC content all of which may be presented via in player 1340 or in another format such as a library format via radio station server 1308 and/or synchronization server 1314. In an example, when the user device 1306 accesses radio station website 1312, the user device 1306 may access a video library associated with synchronization server 1314. Synchronization server 1314 may generate a video library by automatically matching the SIC content 1304 to publicly available source video on the Internet 1330 while also mixing in station imaging such as logos, or pictures of DJs of the stations, or internal videos, etc. and both video and/or audio commercials available on synchronization server 1314 between music videos.

Advertising Campaign

Figure 14:
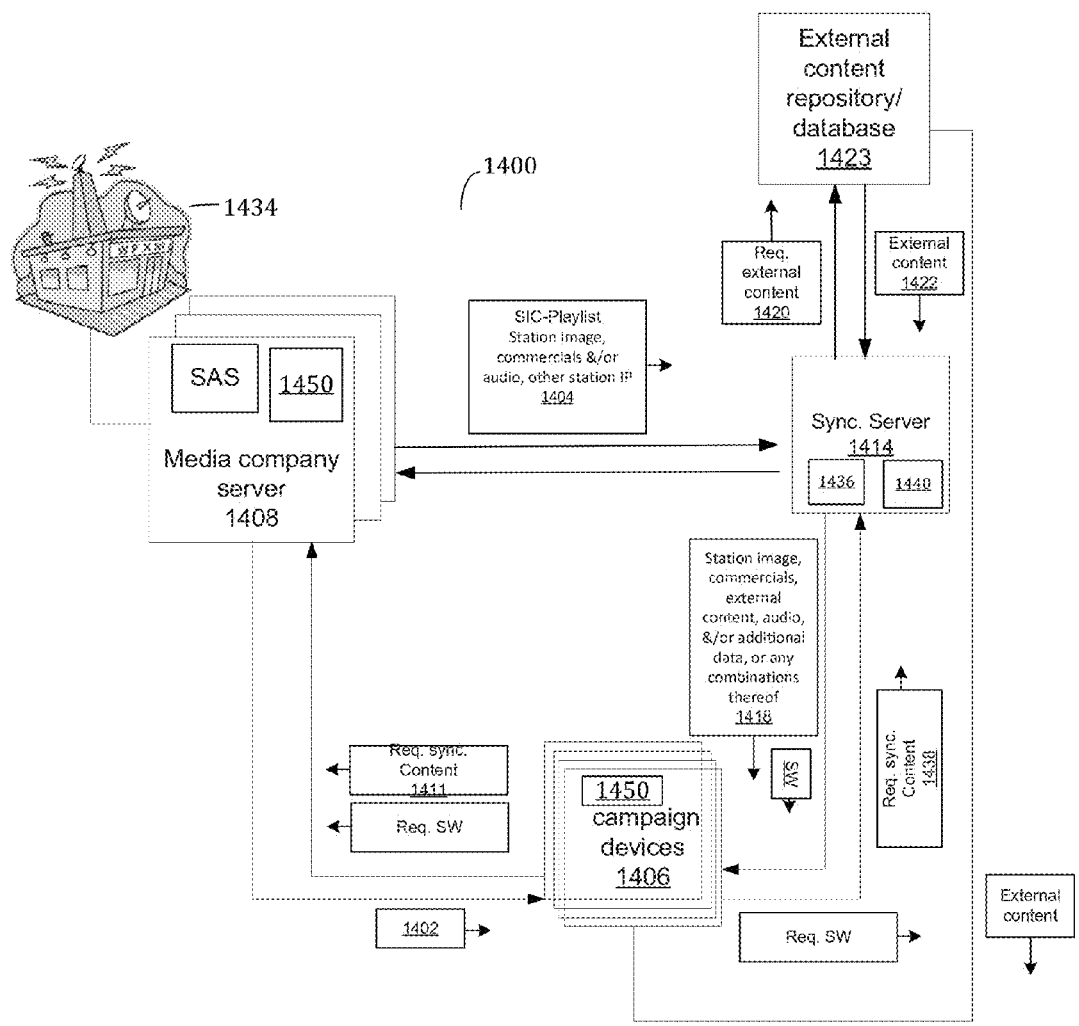
FIG. 14 depicts an example of a system for synchronizing radio content and external content.

FIG. 14 depicts an example of a system 1400 for external content integration, synchronization and cross-platform advertising synchronization in a plurality of third-party devices. In an example, a variety of different user devices may access synchronization server 1414 and/or may run application software 1402 in conjunction with an advertising campaign. Synchronization server 1414 may coordinate display of content identified in SIC 1404 that is received from one or more media company servers 1408. The content display may be coordinated between one or more campaign devices 1406 or content distribution systems maintained by one company and/or across multiple independent or jointly owned companies to present content identified in SIC 1404 in a variety of campaign devices 1406. Campaign devices may comprise user devices and/or commercial devices such as: radio receivers (e.g., radio receivers enabled with HD radio or radio data system (RDS) technology), websites, electronic billboards (whether in stadiums, along freeways, in elevators, etc.), cable systems, satellite radio receivers, mobile devices, or cable systems. Presentation of content identified in SIC 1404 may be synchronized with external content associated with SIC identified content received from external content sources via an external content database 1423 or network such as the Internet in order to present a coordinated or synchronized advertising campaign. For example, when a song or an advertisement plays, metadata may be sent to the synchronization server 1414 in SIC content 1404. Synchronization server 1414 may make the same information available across variety of different device types in a coordinated distribution, for example to the web, in a car, on a mobile device, and/or any other possible electronic outlet.

In an example embodiment, a large media company may choose to display a certain message on substantially all car radio displays (that are equipped with RDS or HD Radio technology) tuned to several of the companies' radio stations in the same market or several markets. The message may contain any data such as emergency information intended to display only on one or multiple station(s) in a given city or multiple cities, the message could be an advertising message, and/or the message could be a contest related message like displaying a special call-in number. The message can be coordinated to display in conjunction with other content, such as a certain song.

Synchronization software 1450 may allow a user to also direct the messaging described above to display in a synchronized manner or simply a coordinated manner on other devices controlled or accessible by media company: listener mobile phones, company web pages, video billboards targeted again by station, by city, by region, by format, by demographic, etc.

In an example, Company A may own video billboards in New York's Times Square. Company B may own a country radio station in New York City. Synchronization software 1450 may reside on server(s) 1408 and/or devices 1406 and may enable synchronization or coordination to occur between the video billboard and the radio station so that content (advertising or otherwise) may play on the video billboard at the same time it plays on the radio station. Such coordination may be controlled via sync server 1414. In an example, if a cable company, TV company, video billboard company, radio company, Internet company or other media company employs synchronization software, an advertiser or content provider may be able to implement a cross-company, cross-media, synchronized or coordinated content campaign (advertising or otherwise). In one embodiment, an electronic billboard (one of the campaign devices 1406) may be configured to display certain advertising content while the corresponding advertising is broadcasting from radio station 1434 so that listeners tuned to the radio station in view of the billboard will see the product advertised on the billboard as well as hear about the product advertised on the radio.

An advertising client in the past may have found it necessary to purchase advertisement campaigns from multiple companies in order to create a national campaign. Each company would independently schedule those campaigns by station and by device. Whereas, system 1400 enables a national advertiser to purchase directly from a sync server provider and target an audience by station, by market/city, by video display, by platform (RDS only, HD radio only, satellite radio display only, web only, mobile only, etc.) across multiple companies, or limited by company, (as long as they employ software 1450 and/or synchronization server 1414) and software 1450 and/or synchronization server 1414 may coordinate to deploy that advertising as scheduled within its interface to all selected locations substantially without further human intervention and provide affidavits.

In one example embodiment, the Synchronization server 1414 serves information to multiple stations. The advertising engine is therefore connected to all the outlets (mobile, web, in-car) of these stations. From a central interface, the user can select an advertisement to appear on specific stations, at specific times, in between specific days, and/or when a specific event takes place such as when an artist like Justin Beiber plays. Thus, the advertisement can be directly linked to that artist.

A cable television company could ultimately require their content providers to adhere to a fixed advertisement break schedule for all channels targeting men aged 18-34. Typically, that organization would find it necessary to create an advertisement playlist for each separate channel. With software 1450 and/or synchronization server 1414, the cable system could create one slate of commercials to air on all channels targeting men aged 18-34 and the software 1450 and/or synchronization server 1414 may enable the cable system to create one advertisement playlist and the software 1450 and/or synchronization server 1414 could syndicate those commercials across all channels targeting men aged 18-34 and coordinate that campaign with all radio stations selected by an advertiser targeting men aged 18-34.

FIG. 15 depicts an example of a screenshot of a display of a synchronization player 1340, which may be generated by a web browser or the like. The player may be accessible from a radio station website 1308 and/or available from a synchronization server 1314. In an example, a user experience accessing synchronized content 1318 may mimic a music-video channel framed within the synchronization player 1340, wherein the shuffle of information to enable this experience exists entirely on the user's computer. The player may comprise a frame 1502 for showing a video coordinated with SIC material 1304 and a playlist 1504 displaying selectable identifiers associated with SIC 1304 content. The display may be utilized in any suitable user device.

Figure 16:
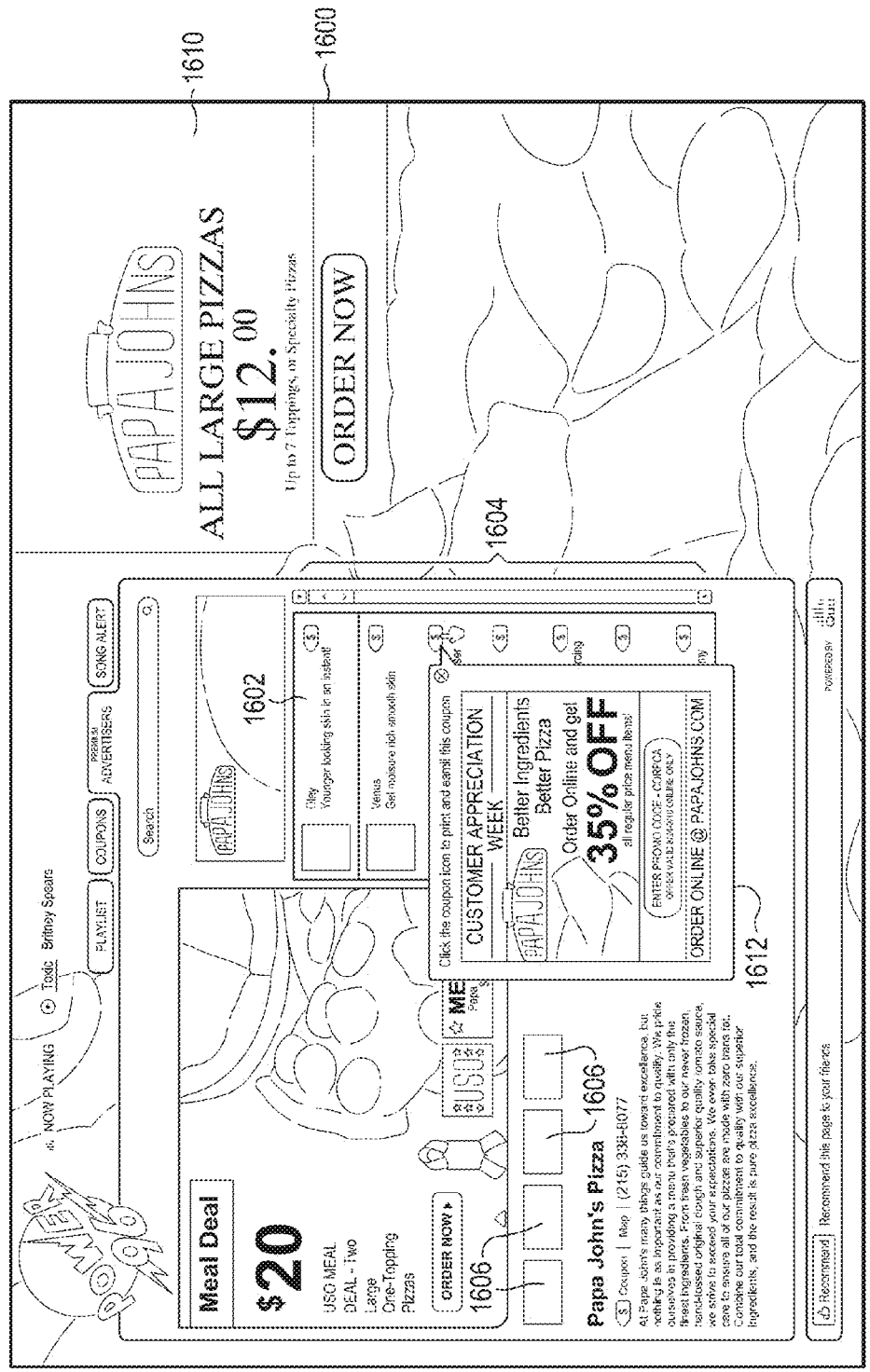
FIG. 16 depicts an example of a display for synchronizing radio content and external content.

FIG. 16 depicts an example of graphical user interface (GUI) 1600 as may be displayed on user device 1306. GUI 1600 may be associated with player 1340 and/or a radio station website 1312. In an example, advertising campaigns may be associated to on-air advertisements in a synchronization server 1308. As advertisements play on the air, identifiers 1602 associated with the advertisement may appear in the advertisement playlist 1604 tab of GUI 1600 and in a full programming playlist at substantially the same time. Advertisements feature pictures 1606, video 1608, audio (not pictured), skin 1610 (i.e., a background image on website GUI 1600), request for more information, coupon 1612, description, phone number and map amongst other information. The user device may comprise a smart phone, tablet, PC, etc. It may comprise a vehicle "head unit" or the like.

Figure 17:
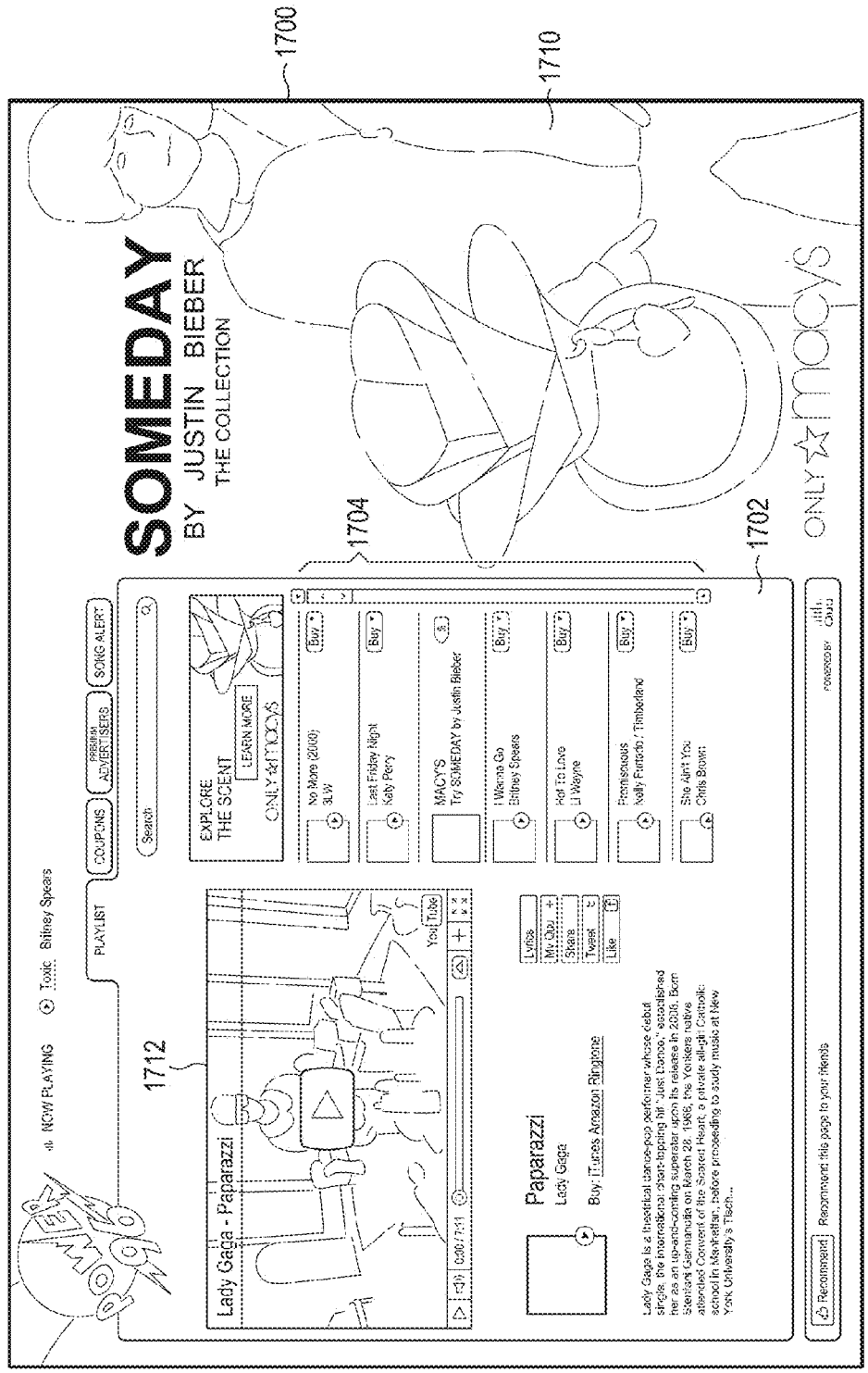
FIG. 17 depicts an example of a display for synchronizing radio content and external content.

FIG. 17 depicts an example of a graphical user interface (GUI) 1700. GUI 1700 may be associated with player 1340 and/or a radio station website 1312. Advertisements and/or other content may be presented to coordinate with a specific artist or song. For example, if Lady Gaga's "Poker Face" plays in the video player 1712, the surrounding skin 1710, radio receiver displays, mobile displays, and other station assets (e.g., music radio station intellectual property) can be linked to present additional information related to that song (e.g., upcoming concert information, advertiser tie-in/sponsorship, etc.) The station assets may feature more information about the artist or an advertiser that is sponsoring the artist such as Macy's.

Figure 18:
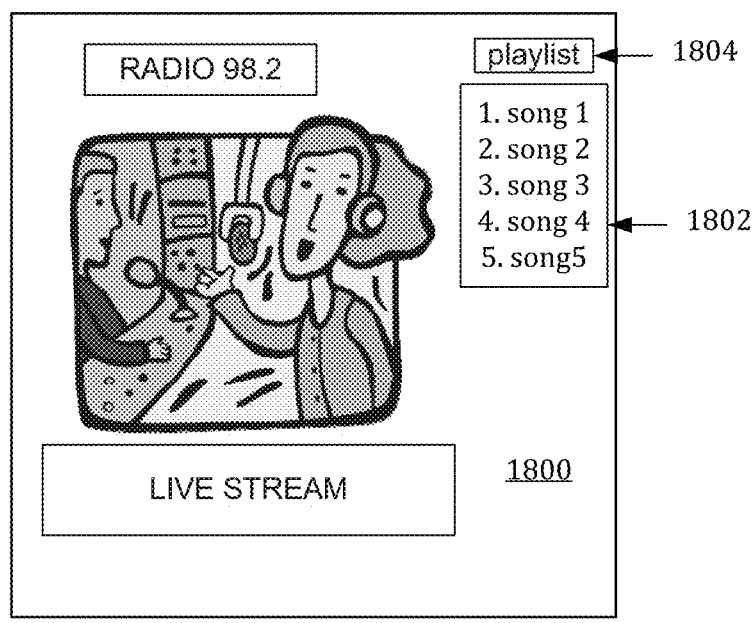
FIG. 18 depicts an example of a display for synchronizing radio content and external content.

FIG. 18 depicts an example of a radio station website 1800. In one embodiment, a user may access station website content via player 1340 by selecting playlist 1804 and/or an identifier in the playlist 1802. Playlist 1802 shows a number of songs last played on that station. If the user clicks on any of these songs or on the playlist button 1804 also located in the radio station homepage, it opens the playlist page described herein.

Figure 19:
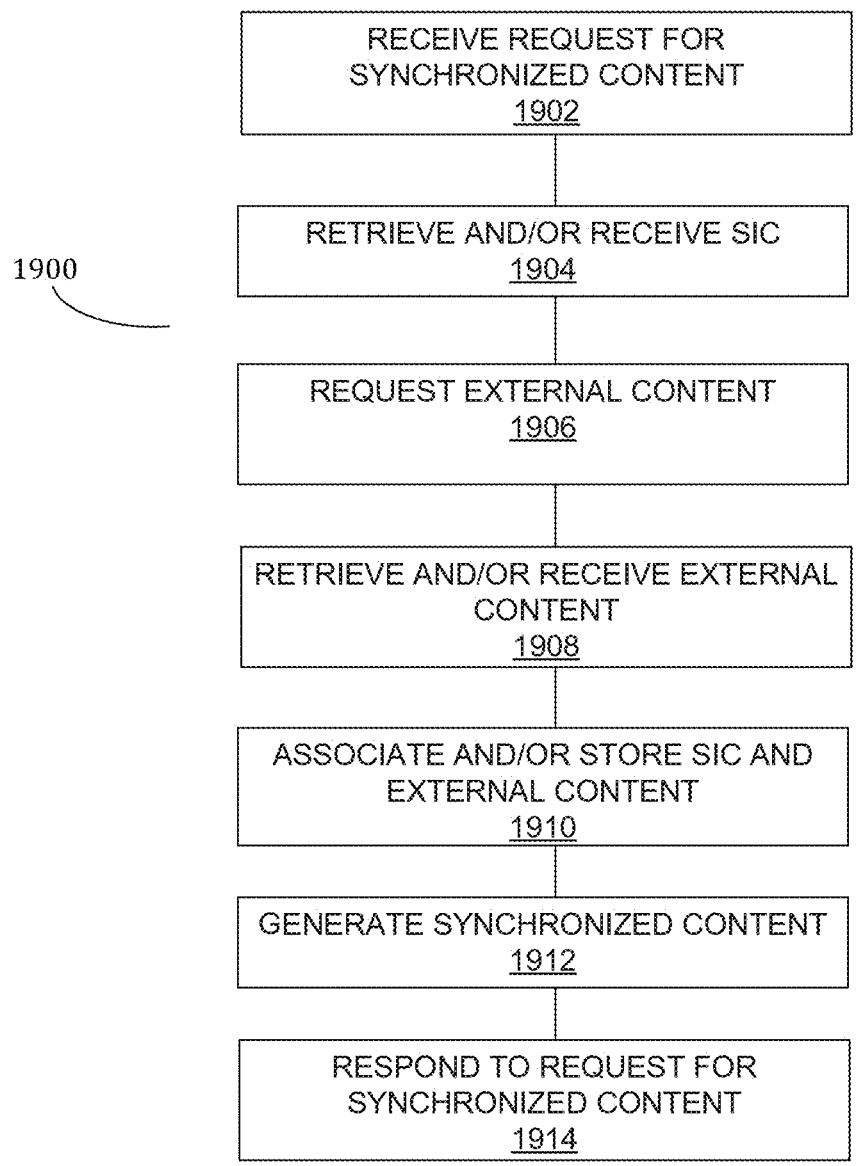
FIG. 19 depicts an example of a process for synchronizing radio content and external content.

FIG. 19 illustrates an example of a process 1900 for synchronizing SIC data and supplemental data. Process 1900 will be described with references to FIG. 13.

In an example, at operation 1902, synchronization server 1314 may receive a request 1311 and/or request 1338 for synchronized content 1318. The request 1311 may be received from radio station server 1308 forwarding a request for the synchronized content 1318 from a user device 1306. Request 1338 for synchronized content 1318 may be received directly from a user device 1306.

In an example, at operation 1904, responsive to the request 1311 and/or request 1338, synchronization server 1314 may request SIC 1304 from SAS 1332 and/or radio station server 1308. In another embodiment, SAS 1332 may send SIC 1304 to synchronization server 1314 without a request, for example on a periodic basis or other basis.

In an example, at operation 1906, synchronization server 1314 may send a request 1320 for external content 1322 associated with the SIC 1304 to a source on network 1330 (e.g., the Internet or other network) and/or to external content repository/database 1323. External content 1322 may comprise content associated with content identified in SIC 1304 such as: music videos, advertisements, lyrics, interview audio, contests, URLs, social media, merchant website links and/or artist bios associated with a song that is broadcasting over-the-air.

In an example, at operation 1908, synchronization server 1314 may receive and/or retrieve external content 1322. In an example, at operation 1910, synchronization server 1314 may associate SIC data 1304 with one or more items of external content 1322 in database 1336. Synchronization server 1314 may store SIC 1304 and/or associate external content in a database 1336

In an example, at operation 1912, synchronization server 1314 may generate synchronized content 1318. Synchronized content 1318 may comprise SIC 1304 incorporating external content 1322 obtained by synchronization server 1314.

In an example, at operation 1914, synchronization server 1314 may respond to request 1311 and/or request 1338 to provide user device 1306 access to synchronized content 1318, for example via player 1340. In an example synchronization server 1314 may send synchronized content 1318 to one or more user devices 1306 (or campaign devices 1406, see FIG. 14). In one example, application software associated with player 1340 may sent from synchronization server 1314 to a user device 1306 to facilitate running player 1340 on user device 1306. In another embodiment, synchronization server 1314 may make synchronized content 1318 available to a plurality of user devices 1406 (see FIG. 14) on a variety of platforms.

Figure 20:
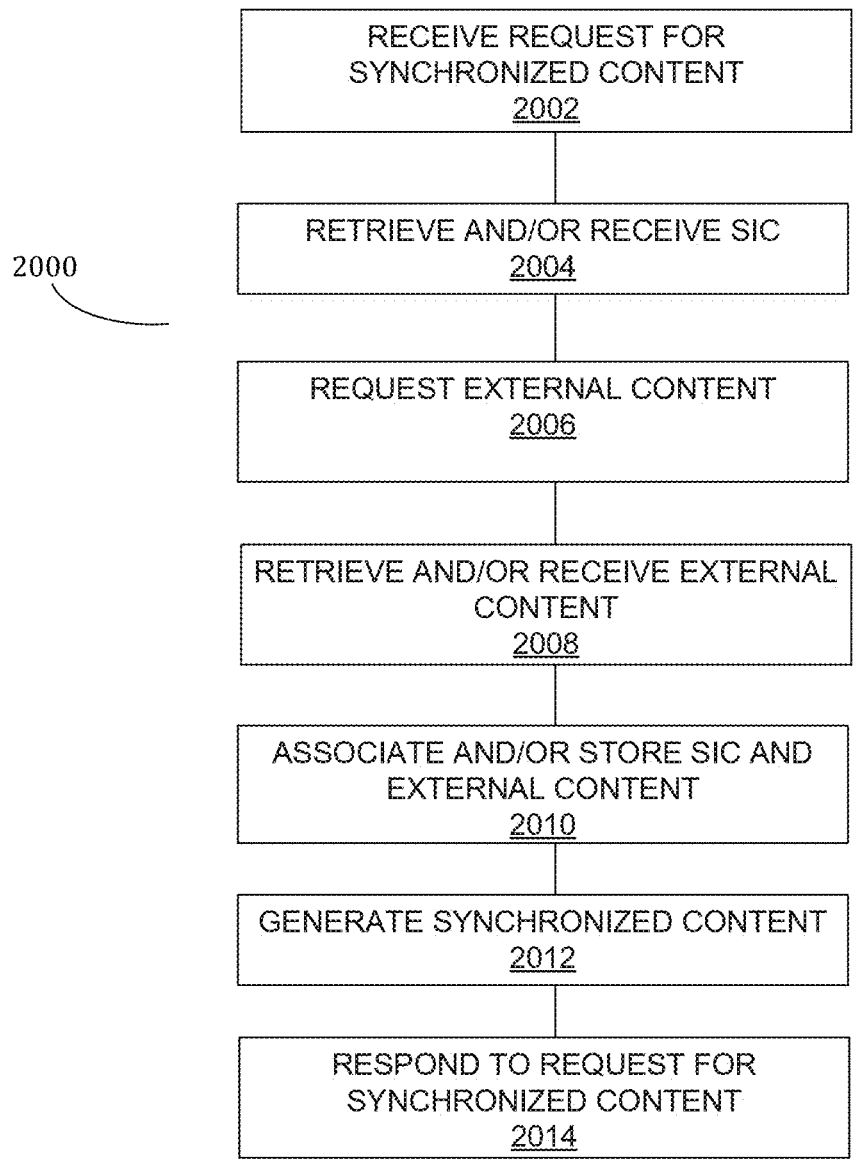
FIG. 20 depicts an example of a process for synchronizing radio content and external content.

FIG. 20 illustrates an example of a process 2000 for synchronizing SIC data and supplemental data. Process 2000 will be described with references to FIG. 14. At operation 2002, synchronization server 1414 may receive a request for synchronized content 1418. The request 1411 may be received from media company server(s) 1408 forwarding a request for the synchronized content 1418 from one or more campaign devices 1406. Request 1438 for synchronized content 1418 may be received directly from one or more campaign devices 1406.

At operation 2004, responsive to the request 1411 and/or request 1438, synchronization server 1414 may request SIC 1404 from SAS 1432 and/or media company server(s) 1408. In another embodiment, SAS 1432 may send SIC 1404 to synchronization server 1414 without a request, for example on a periodic basis or other basis.

At operation 2006, synchronization server 1414 may send a request 1420 for external content 1422 associated with the SIC 1404 to a source on network 1430 (e.g., the Internet or other network) and/or to external content repository/database 1423. External content 1422 may comprise content associated with content identified in SIC 1404 such as: music videos, advertisements, lyrics, interview audio, contests, URLs, social media, merchant website links and/or artist bios associated with a song that is broadcasting over-the-air.

At operation 1908, synchronization server 1314 may receive and/or retrieve external content 1322. All of these operations are merely illustrative and not limiting. At operation 2010, synchronization server 1414 may associate SIC data 1404 with one or more items of external content 1422 in database 1423. Synchronization server 1414 may store SIC 1404 and/or associate external content in a database 1436

At operation 2012, synchronization server 1414 may generate synchronized content 1418. Synchronized content 1418 may comprise SIC 1404 incorporating external content 1422 obtained by synchronization server 1414.

At operation 2014, synchronization server 1414 may respond to request 1411 and/or request 1438 to provide one or more campaign devices 1406 access to synchronized content 1418, for example via player 1440. In an example, synchronization server 1414 may send synchronized content 1418 to a plurality of campaign devices 1406 during a coordinated advertising campaign or for another campaign coordinating radio advertising and device displays associated with the radio advertising of external content. In one example, application software associated with player 1440 may sent from synchronization server 1414 to a plurality of campaign devices 1406 to facilitate running player 1440 on a plurality of campaign devices 1406 and to coordinate an advertising campaign. In another embodiment, synchronization server 1414 may make synchronized content 1418 available to a plurality of user devices 1406 (see FIG. 14) on a variety of platforms.

Figure 21:
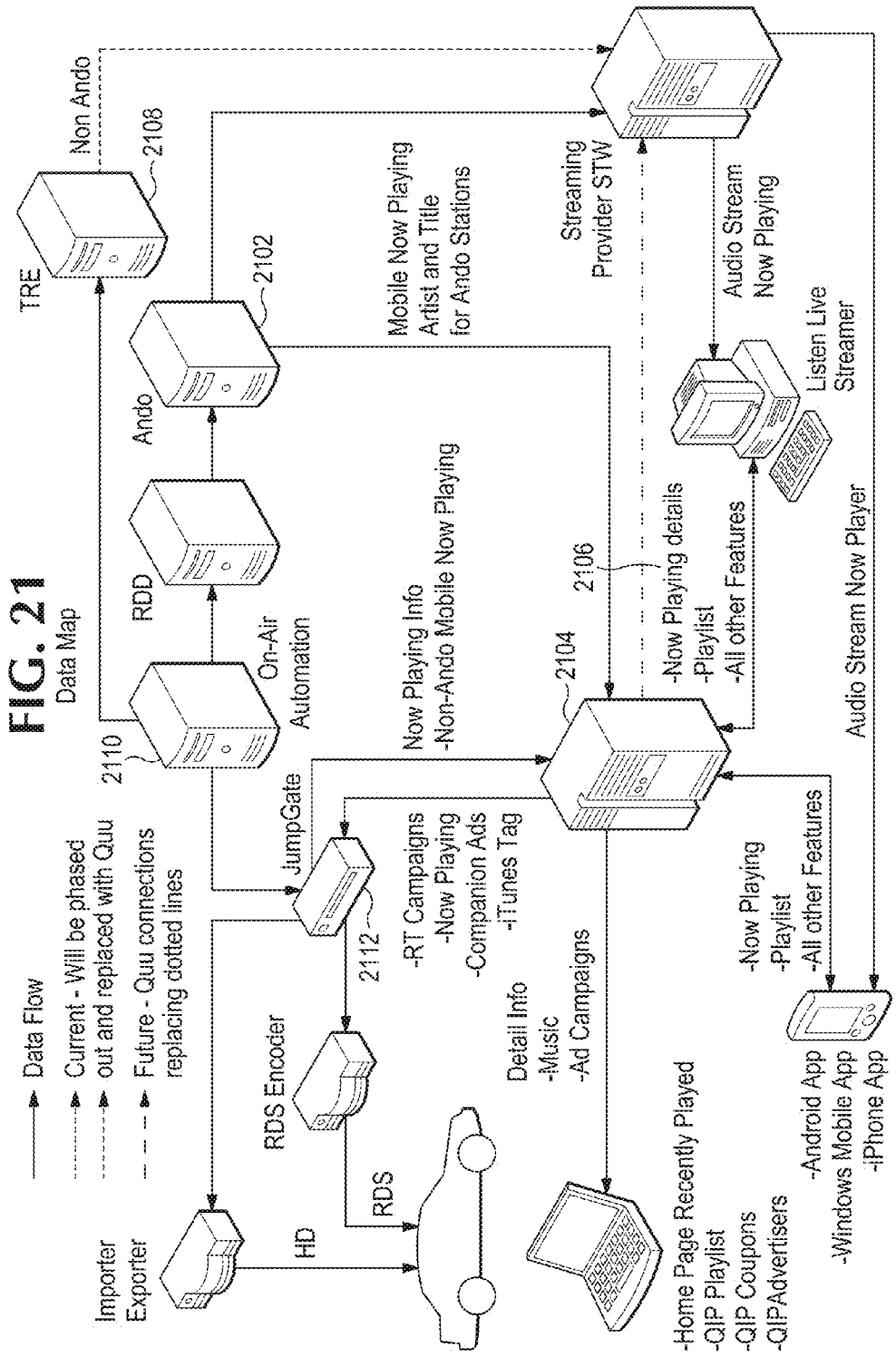
FIG. 21 depicts an example of a system for synchronizing radio content and external content.

FIG. 21 depicts an example of a system for synchronizing SIC data and supplemental data. Ando 2102 is a streaming server for streaming radio. This way sync server 2104 can provide the Now playing information 2106 (such as artist and title). Streaming is when you listen to the radio on an internet-based device such as a smart phone. The stream runs parallel to the over-the-air radio, but not exactly at the same time, as over-the-air advertising may not necessarily be streamed for right purposes such as the talent voice. Therefore the streaming server such as Ando 2102 may replace the over the air ads with new ads meant for streaming. As ads are not the same, the streaming server manages to delay the music accordingly when the length of the ads is not the same. Ando is one such service among many available on the market.

TRE (The Radio Experience) 2108 is a server/software/service that takes the data from the automation system 2110 and formats it for the RDS as well as sends the data to other 3rd party products such as Ando 2102. It is functionally equivalent to the JumpGate 2112. TRE 2108 has been replaced in some places. In another embodiment, Sync server 2104 could work with TRE 2108 as a software component instead of the JG 2112.

Advertising campaigns in some cases can be linked to the artist. When a given artist is playing, an RDS Manager such as the JG 2112 or TRE 2108 or others can query Quu when a song is playing. For example, RDS managers query server 2104 when the automation system 2110 indicates a new song started. They send the song to server 2104, server 2104 assembles the data to display in the player 1340, and sends back to the RDS Manager what to display in the car—same thing happens during ads or jock talk). The Artist based campaigns gets server 2104 to link what to display to the name of the artist, and sends additional information where the name of the song and the artist are linked with additional text. For example if Artist Rihanna is playing we could display the name of the song and the artist for 90 sec (configurable) then the text from the campaign such as Rihanna Live in Seattle, or follow me @rihanna, etc.

Interactive Hybrid Car Stereo Applications

Interactive hybrid car radio applications enable listeners to get the best out of radio with full 2-way interactivity. For example, while a listener is tuned to terrestrial radio via a standard FM reception, an interactive application will allow listeners to receive rich content about what they're listening to via a data connection, for example, via their cell phone connected to the car stereo (via Bluetooth, cable, or other mechanism), or via a data connection embedded within the car or the car stereo or "head unit." For example, a vehicle may have an embedded wireless telecommunication capability, which may be operable for voice and/or data communications. User actions or requests may be input by any suitable interface, such as, for example, soft keys on a screen display. In a preferred embodiment, an application is voice-enabled to provide hands-free operation to the user. Below we describe voice-enabled applications although this interface is not required.

Interactive features may be integrated with broadcast radio (satellite or terrestrial) in several ways. Three examples are described below. Other variations should be considered equivalents.

Example 1

Figure 22:
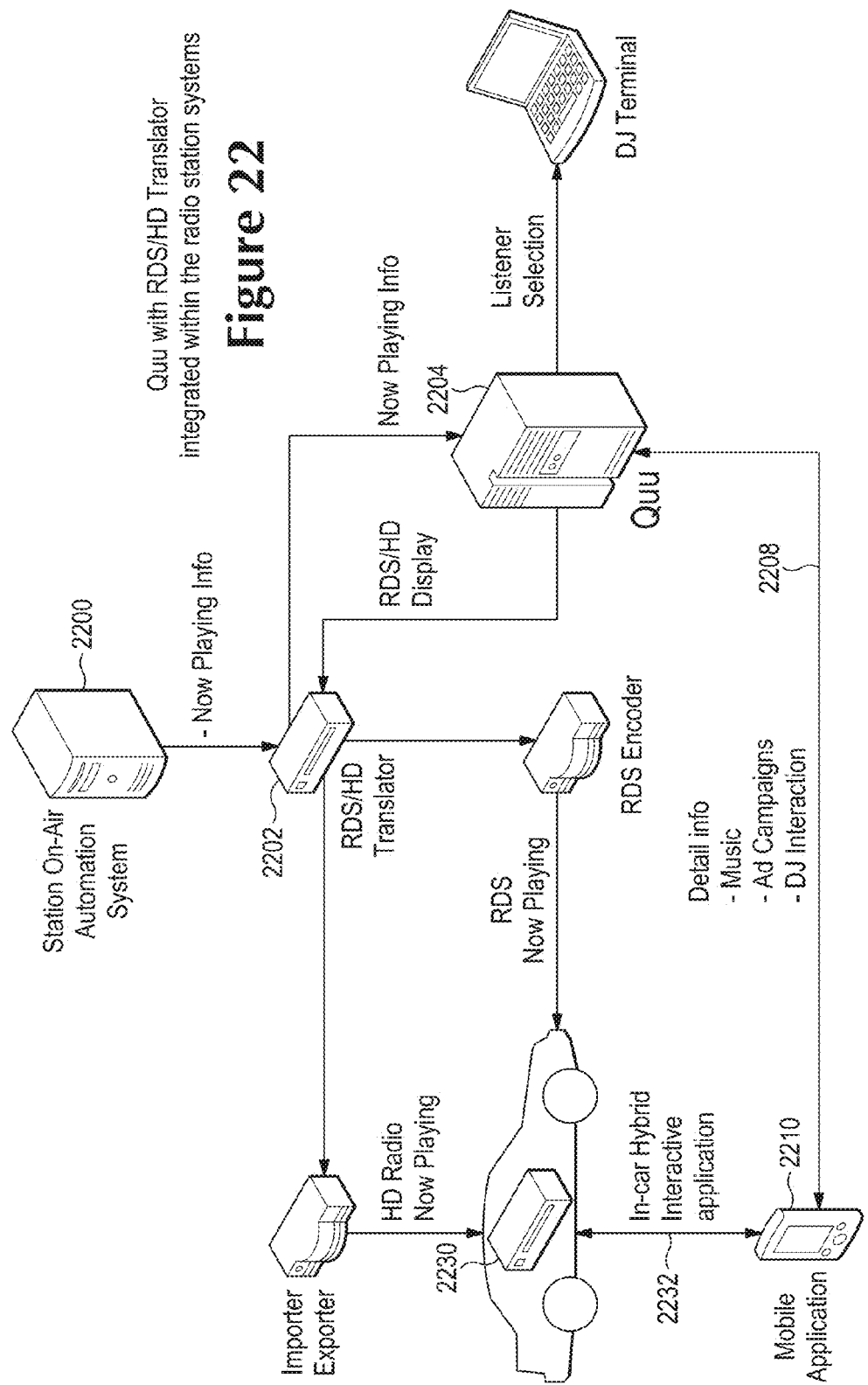
FIG. 22 is a simplified data flow diagram of an example of an interactive hybrid car stereo system.

An interactive radio RDS/HD translator may be integrated within the radio station systems. Referring for example to FIG. 22, it illustrates such an integrated system. In operation, a radio station on-air automation system, for example, comprising a server 2200, provides "now playing" data to a modified RDS/HD translator 2202. The translator 2202 is configured to forward the "now playing" data to a server 2204 (in addition to sending it for RDS encoding, etc.) Server 2204 software compiles information related to the Now Playing information. For example, if the now playing data identifies a song, the server 2204 may assemble information such as corresponding lyrics, artist biography, pictures, concert information, etc. In the case that the now playing data identifies an advertisement, the system may assemble related coupons, pictures, product or service description, directions, etc. In the case that the now playing data indicates a DJ talking, the server may assemble related questions, choices, contest information, etc. In general, the server 2204 then transmits the assembled information to a suitable in-car application via a data connection 2208. The data connection may be realized, for example, using a wireless telecommunications system. The data connection may utilize a data service, e.g. broadband, or a lower bandwidth connection such as in-band signaling over a voice channel. These types of assembled information are merely illustrative and not limiting.

Referring again to FIG. 22, the assembled information may be transmitted to a portable user device such as a smart phone 2210. A suitable application program executable on the smart phone may be utilized to display and enable user interaction with the assembled information as further described below. As noted, the application preferably is voice enabled to allow listeners to safely interact with radio content such as music, over-the-air advertising, display advertising, contests or other types of content. The mobile application may be used independently of the car stereo, except that the music or other radio broadcast content is being played on the car stereo.

In another embodiment, the smart phone 2210 may be coupled to a vehicle "stereo" or head unit 2230, by means of a connection 2232. This connection may be wired or wireless, for example, a Bluetooth® connection. The connection preferably is effective to utilize the head unit display to supplement, or in lieu of, the smart phone display, in operation of the interactive radio application on the smart phone.

In another embodiment, an interactive radio application is executable on the head unit itself, as further described below. In this case, the smart phone or other mobile unit may be used to provide interactive data (for example, the "assembled information" described above) to the head unit, utilizing the data channel 2208 and connection 2232 to the head unit.

In another embodiment, the interactive radio application executable on the head unit may receive interactive data (for example, the "assembled information" described above) via mobile telephony. Mobile telephony is the provision of telephone services to phones which may move around freely rather than stay fixed in one location. Mobile phones connect to a terrestrial cellular network of base stations (cell sites), whereas satellite phones connect to orbiting satellites. Both networks are interconnected to the public switched telephone network (PSTN) to allow any phone in the world to be dialed. An noted, a mobile "channel" may provide data, voice, SMS or other services.

Example 2

Figure 23:
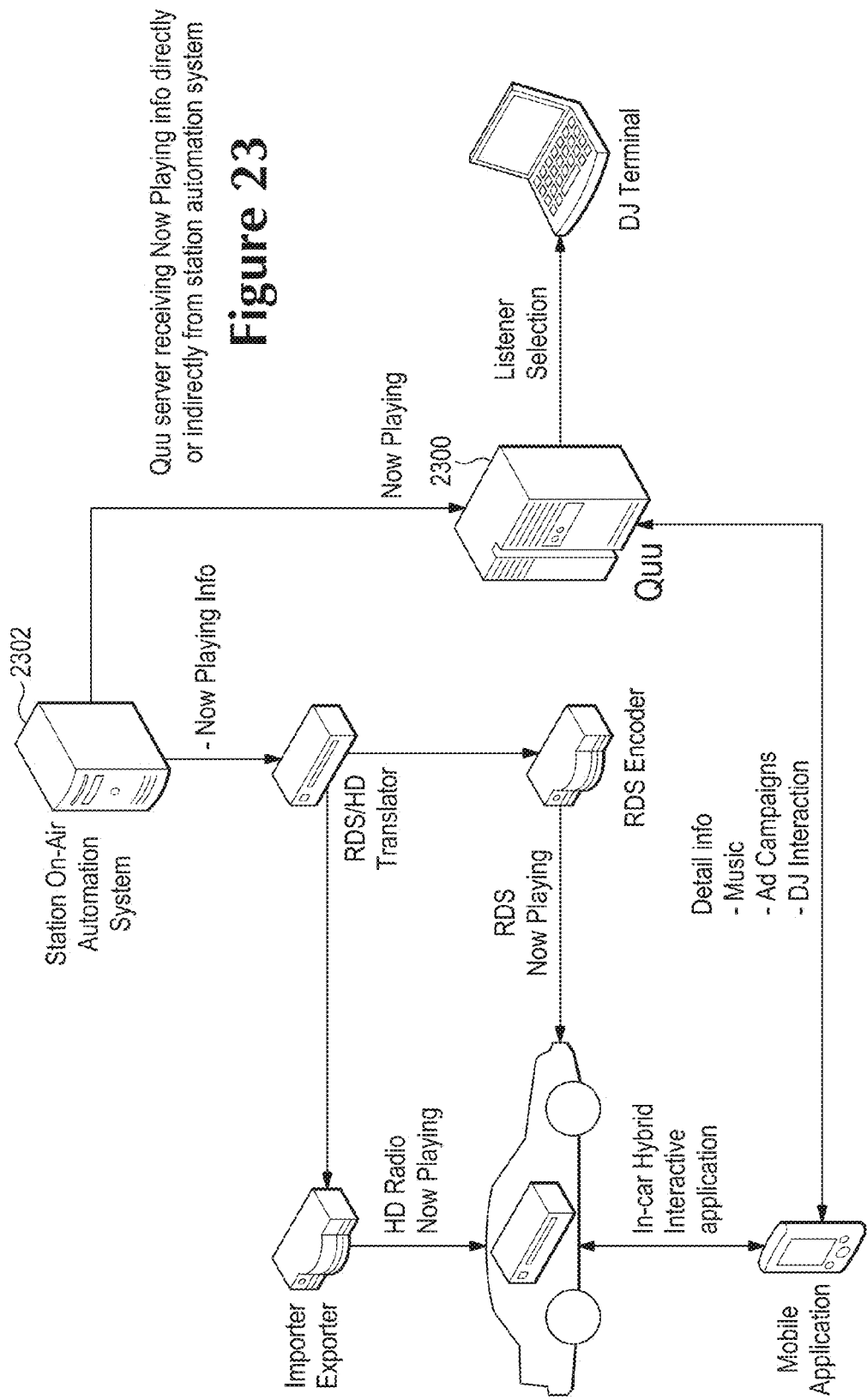
FIG. 23 is a simplified data flow diagram of another example of an interactive hybrid car stereo system.

In a second example, no translator need be integrated within the radio station systems to implement interactive radio. Referring to FIG. 23, by way of example, a radio station may send the "Now Playing" information to the interactive radio ("Quu") servers 2300 directly or indirectly from its Automation system 2302. Server 2300 compiles the information related to the Now Playing information as discussed above, and transmits it to listeners as also discussed above.

Example 3

Figure 24:
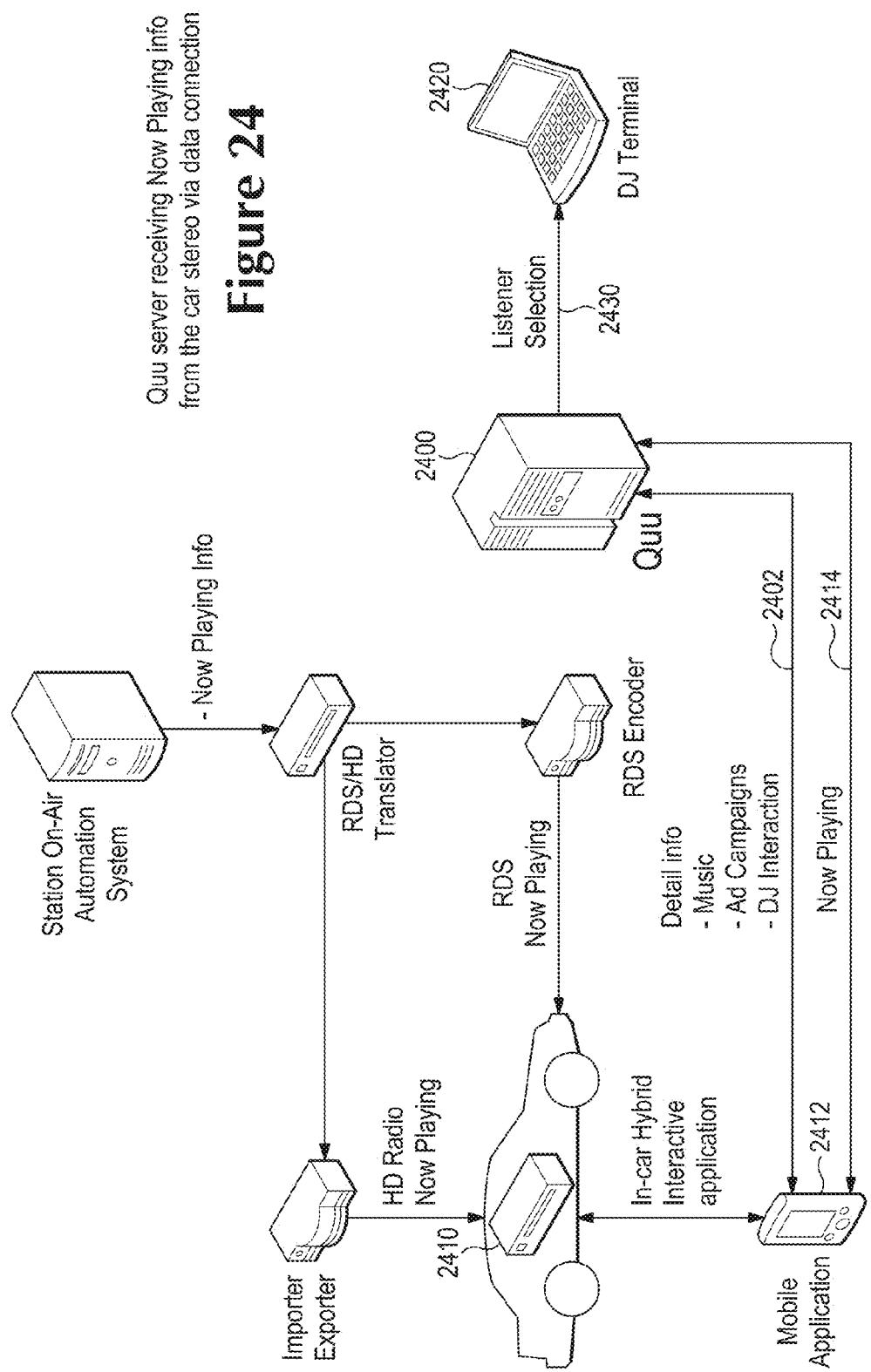
FIG. 24 is a simplified data flow diagram of another example of an interactive hybrid car stereo system.

In a third example, no integration takes place directly with the radio station. Referring to FIG. 24, by way of example, interactive radio ("Quu") server 2400 acquires the Now Playing info 2402 from the RDS or HD text decoded in a car radio 2410. The server 2400 returns interactive data (for example, the "assembled information" described above) via path 2414. In particular, an in-car interactive radio application may acquire the now playing information, and forward it to the server 2400 in various ways. In one example, the head unit may be coupled to a mobile device, such as a smart phone 2412, as explained above. That coupling may provide bi-directional data communication from the user interface of the smart phone and/or the head unit. In another embodiment, the head unit and interactive radio application may communicate directly with the server 2400 via telephony (not shown). The server 2400 preferably is arranged to provide listener input or selections from an interactive radio application (mobile or head unit) to the radio station DJ 2420, via a connection 2430. The connection 2430 may comprise a web interface for example, or any data transfer means or protocol.

In various systems of the types illustrated in the foregoing examples, listener "input" (which may be a request, feedback, a vote, any data, location, etc.) preferably is received at a user interface of a mobile device or vehicle head unit running an interactive radio application program. The user input may be communicated back to the interactive radio server (2204, 2300) over the various communication links described above. In turn, that information may be passed on to the radio station or DJ terminal, as show in FIGS. 22-24.

Figure 25:
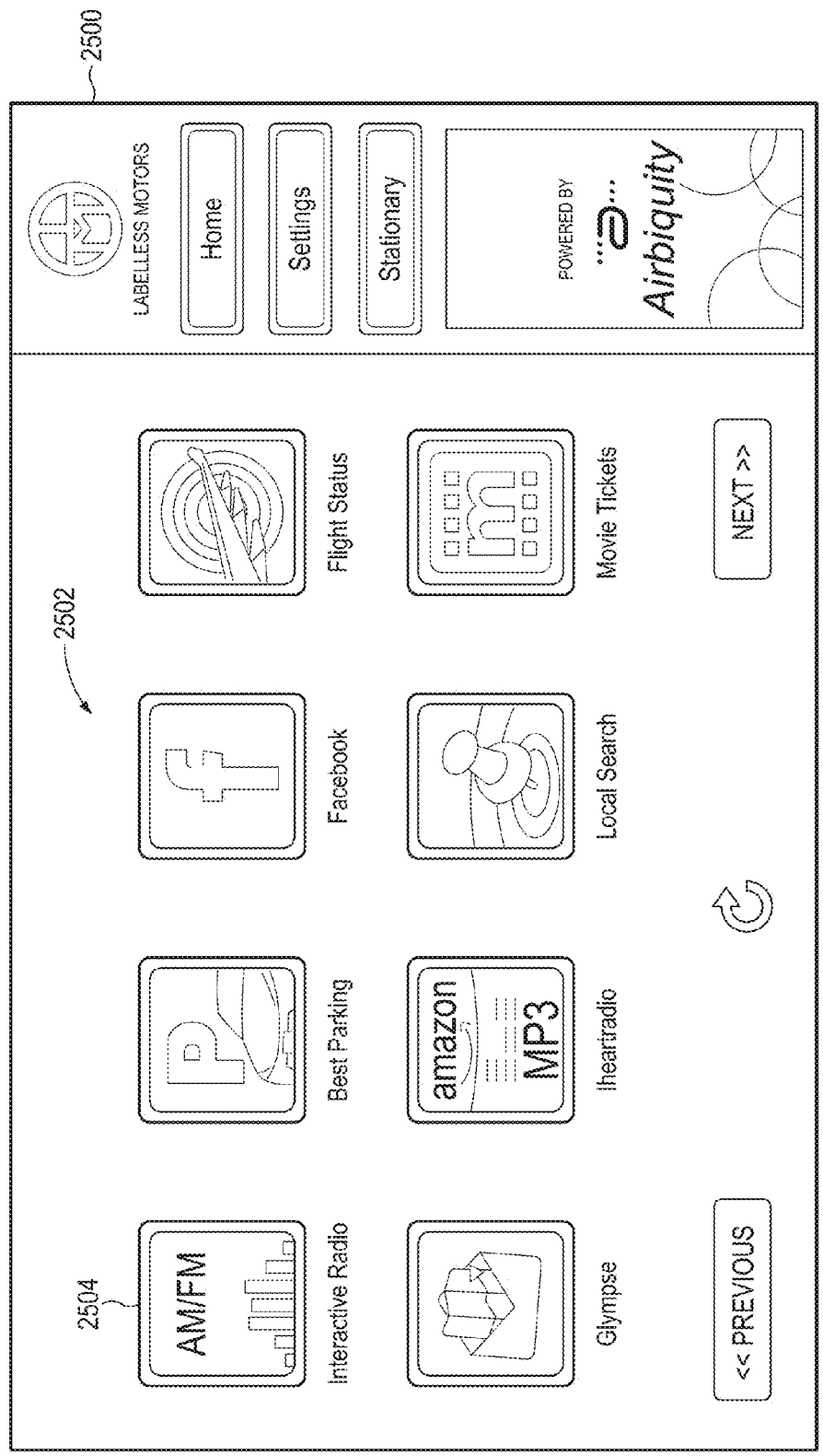
FIG. 25 is an example of a graphical user interface showing icons for user selection of application programs.

FIG. 25 is an example of a graphical user interface 2500, showing icons 2502 for user selection of application programs, one of which is an interactive radio application, icon 2504. This display is shown on a car radio or head unit. A similar display may appear on a smart phone or other mobile device. (Although a vehicle literally is "mobile," we use mobile more in the sense or portable or hand-held.) The user can select (launch) the interactive radio application by touch screen press or other suitable selection means such as a physical or virtual joystick.

Figure 26:
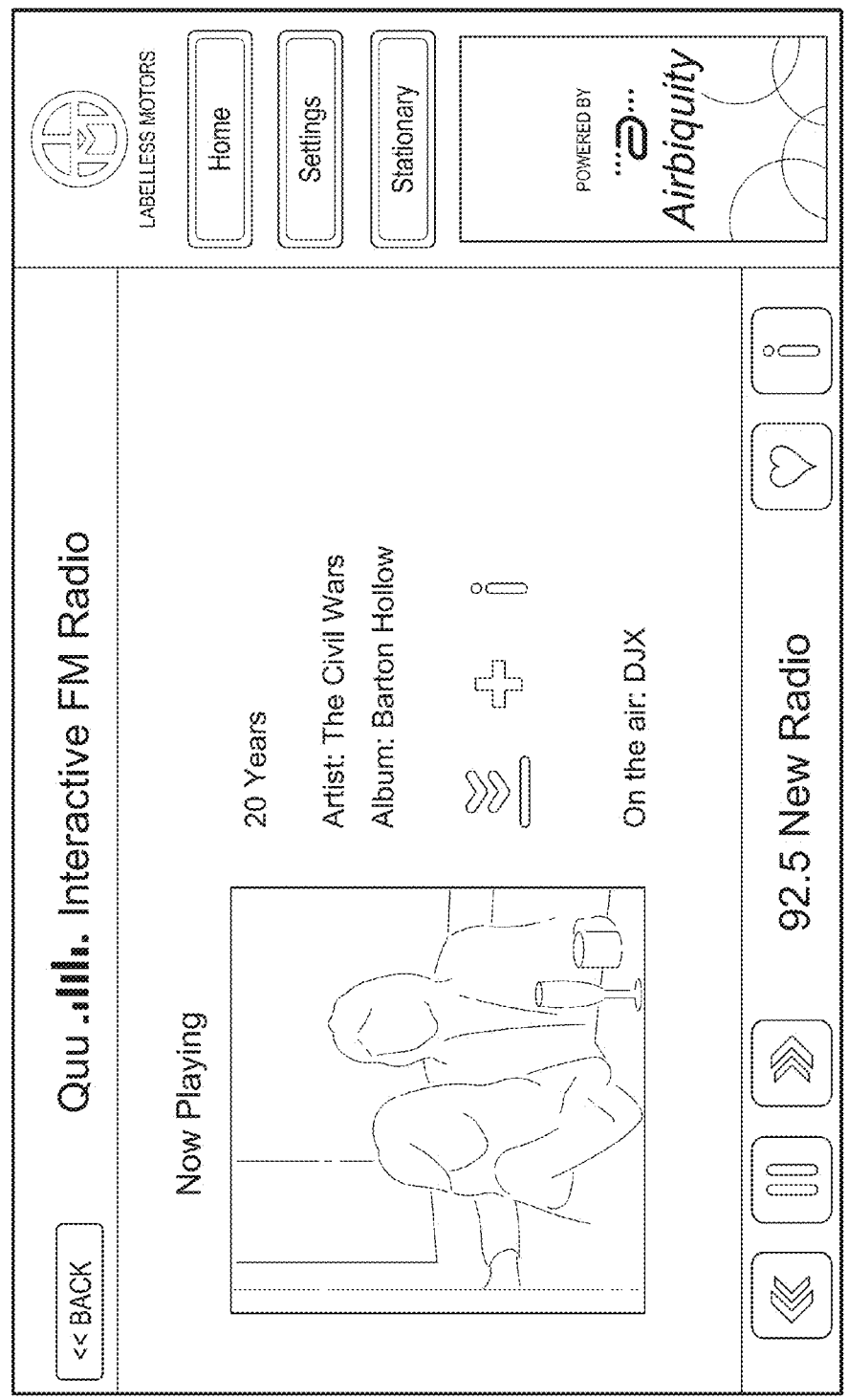
FIG. 26 is an example of a graphical user interface of an interactive radio application program.

FIG. 26 is an example of a graphical user interface 2600 of an interactive radio application program. This interface 2600 is shown in the context of a vehicle head unit. The application, nonetheless, may be executable in the head unit itself, or may be executable in a mobile device that is coupled to the head unit to use the HU interface features. In the display, it shows the music now playing on the radio, for example, showing the song title, artist and album. In this example it also identifies the current DJ. Further, a picture, which may be for example, the album cover, is displayed on the screen. Some or all of this information may be provided from an interactive radio server as described above. The user interface may provide options to display more or less information. If a selected option calls for more information, not already provided, a request may be returned to the interactive radio server utilizing any of the various data connections described above.

Figure 27:
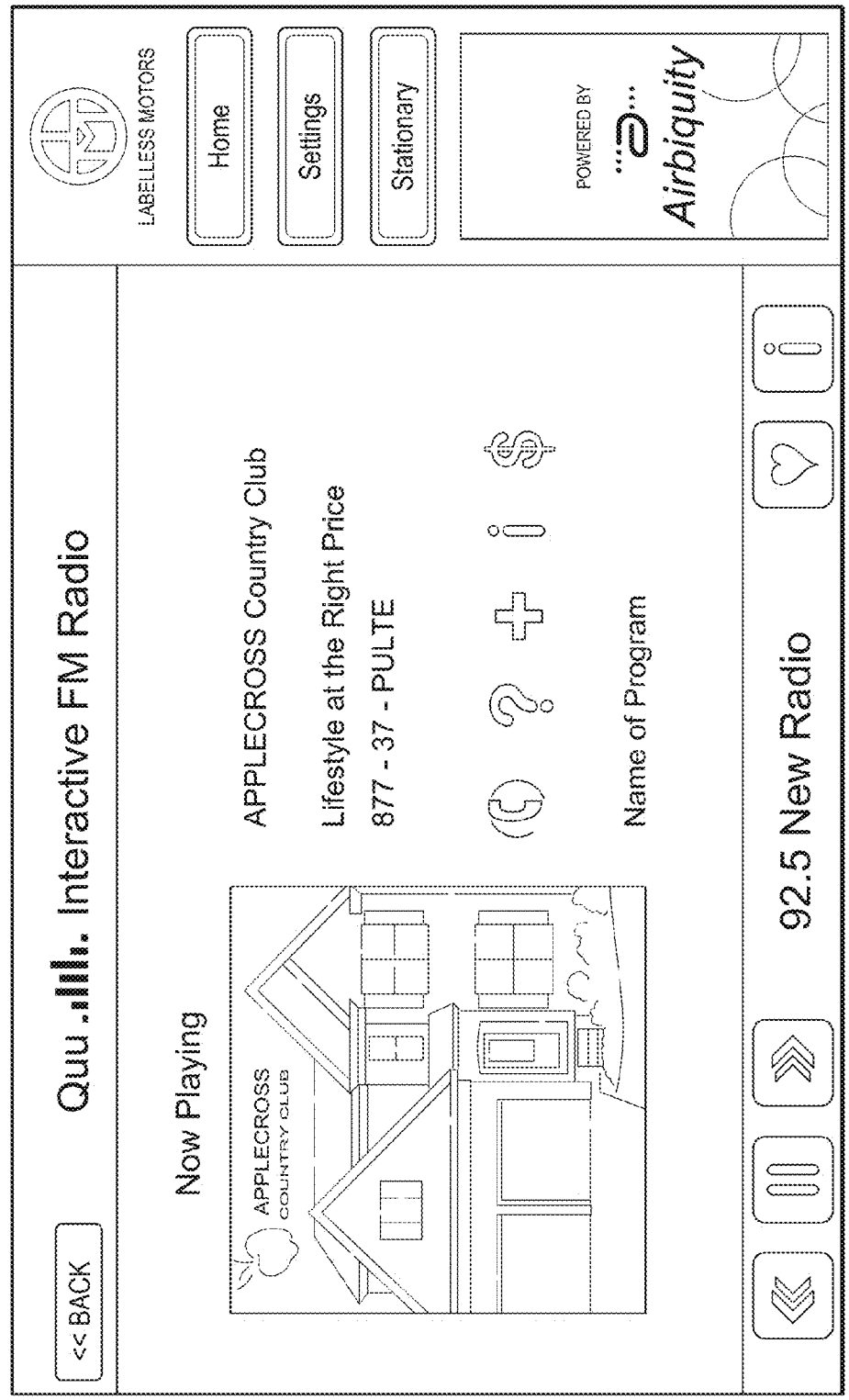
FIG. 27 is an example of a graphical user interface display including interactive radio advertising features.

FIG. 27 is an example of a graphical user interface display of an interactive radio application, the display including supplemental information synchronized to a real estate advertisement playing on the radio. The information may comprise a picture of a property, text description, video tour, etc. Notice icons or "buttons" 2704 are provided, for example, to request a phone call from the advertiser, ask a question, or request additional information such as selling price. The interactive display may be enabled by an interactive radio system of the type described above.

Figure 28:
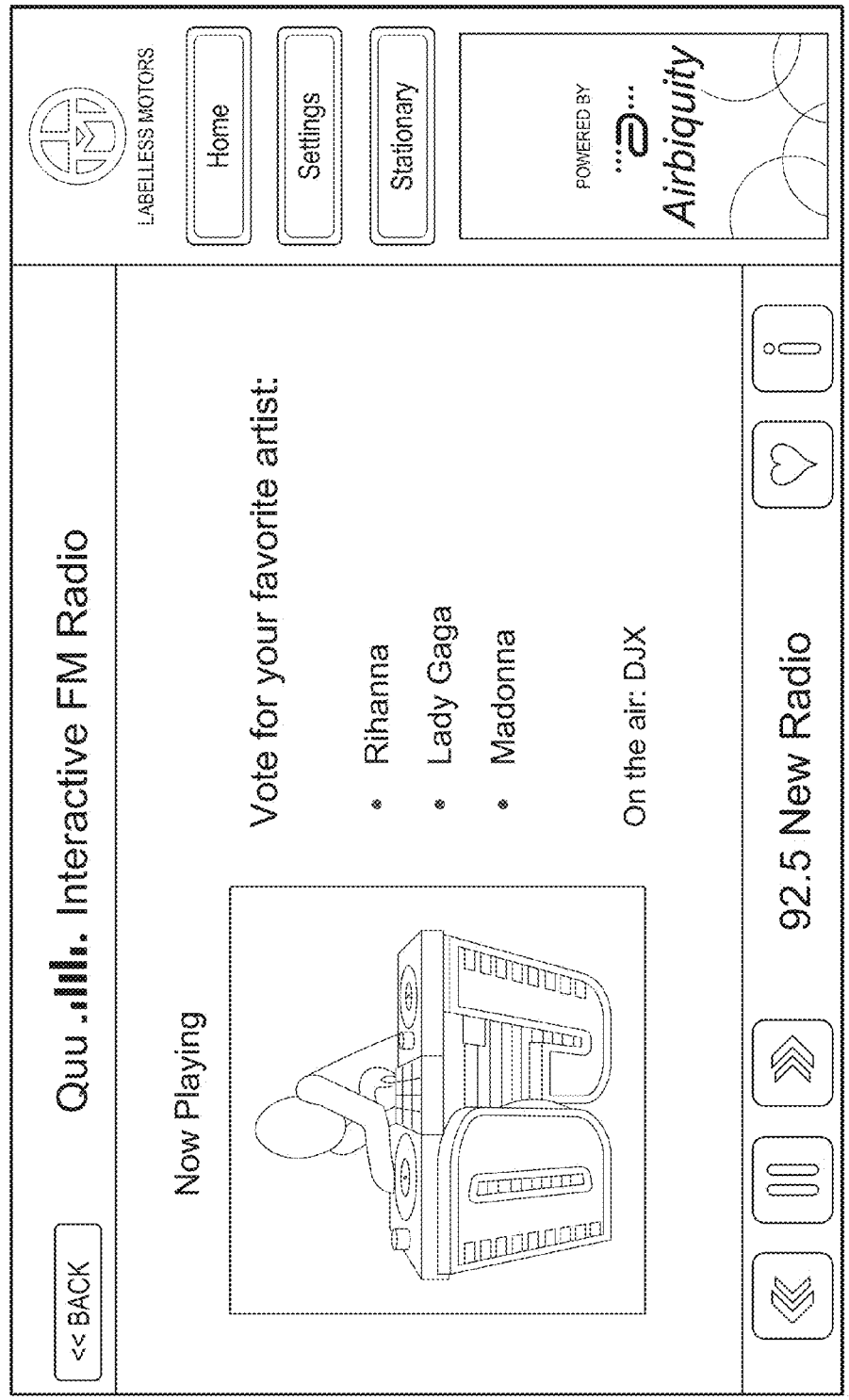
FIG. 28 is an example of a graphical user interface display including interactive radio voting features.

FIG. 28 is an example of a graphical user interface display of an interactive radio application, the display including information for interacting with the DJ on the air or the radio station, for example to cast a vote for a favorite song or artist. Other options may include entering a contest or drawing. The display may be enabled by an interactive radio system of the type described above.

Figure 29:
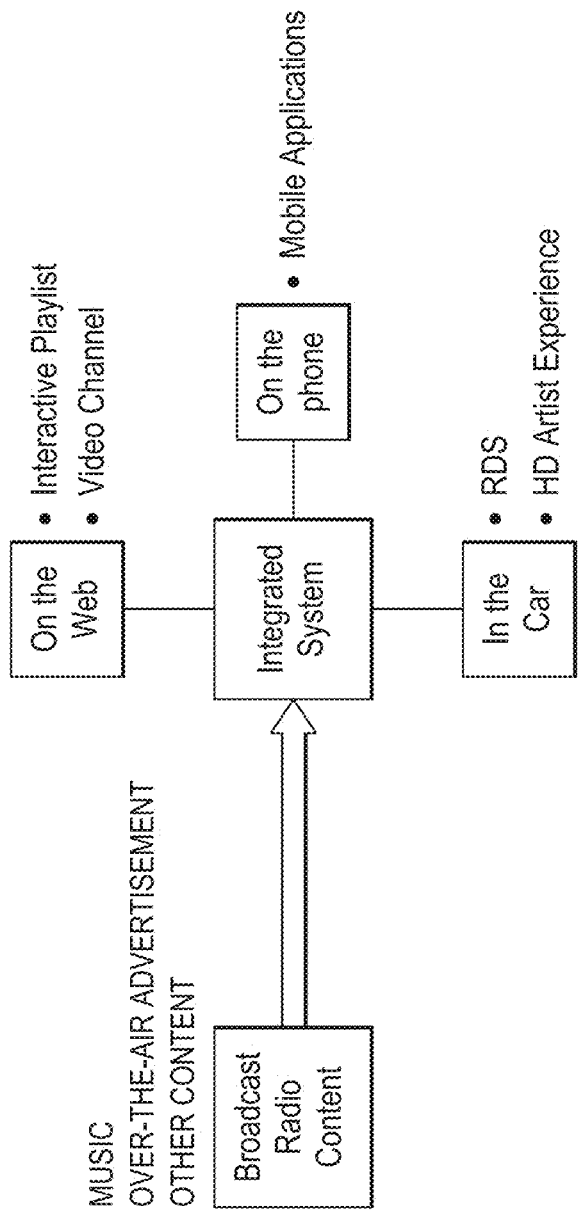
FIG. 29 is a simplified data flow diagram of an example of an interactive hybrid car stereo system.

FIG. 29 is a simplified data flow diagram of an example of an interactive radio system at a high level. In this general illustration, broadcast radio content, for example, music, advertisements and other content, are identified to an interactive radio system. The system identifies and assembles information related to the current "now playing" information, and transmits the assembled information for consumption concurrently with the now playing content, on the web, on a phone, or in a vehicle. For example, on a web site, which may be the radio station web site, the interactive radio server may provide or insert an interactive playlist and/or a video channel. The video channel may play, for example, a video of the artist now playing. For example, on a phone, various interactive features may be implemented using a mobile interactive radio application. In the car, the interactive radio system may insert information for display via RDS, or the system may provide more elaborate content via a head unit operable interactive radio application program. Some illustrative head unit displays are described above.

Figure 30:
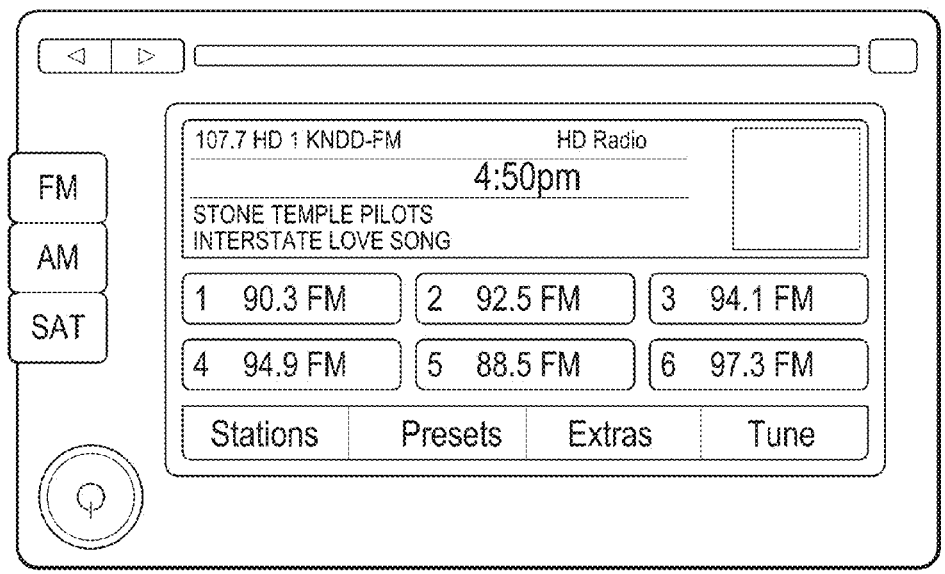
FIG. 30 is an example of a radio display screen that incorporates synchronized album art and micro-advertising.

FIG. 30 is an example of a radio or head unit display screen in a motor vehicle that incorporates synchronized album art and micro-advertising that may be implemented by an interactive radio system of the type described above.

Figure 31:
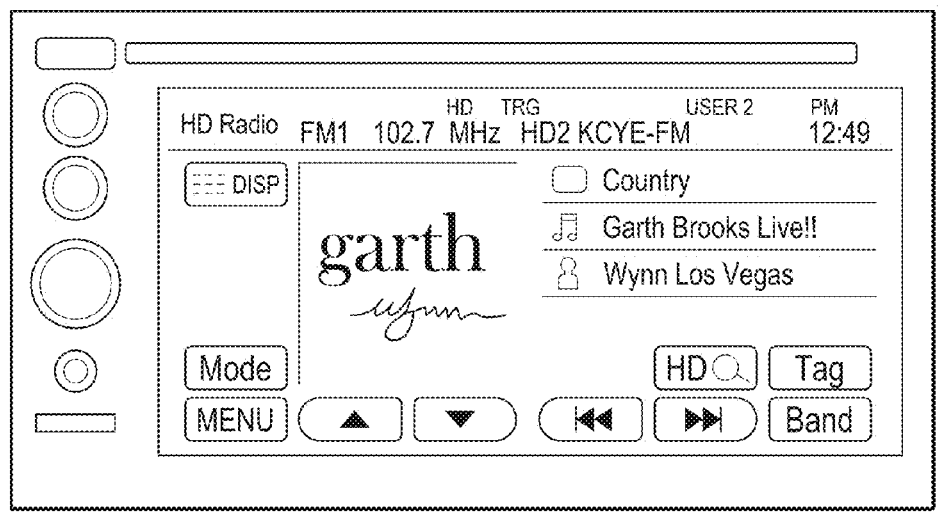
FIG. 31 is an example of a radio display screen that incorporates advertiser visual content while a corresponding ad plays over the air.

FIG. 31 is an example of a radio or head unit display screen that incorporates advertiser visual content while a corresponding ad plays over the air. This Advertiser Experience® feature may be implemented by an interactive radio system of the type described above. (Advertiser Experience® is a registered trademark of Quu, Inc.)

Figure 32A:
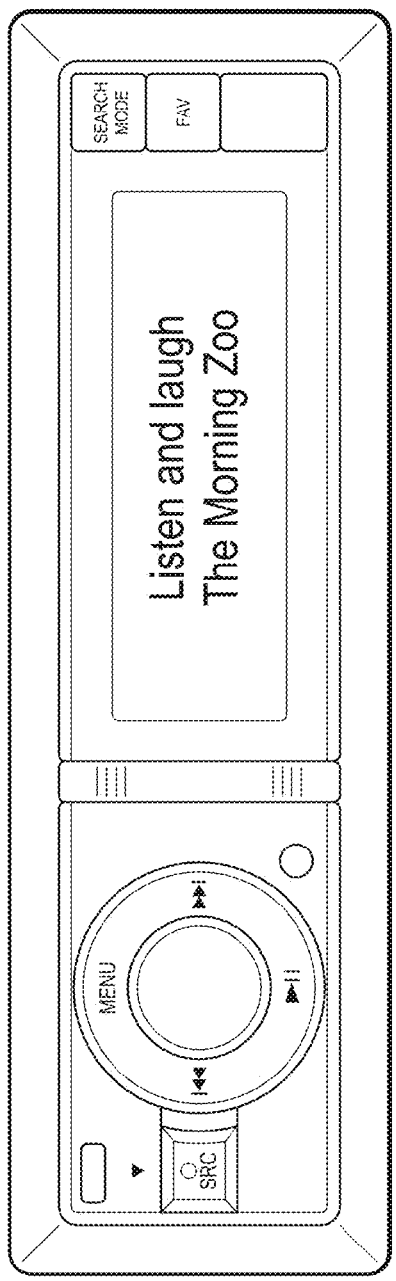
FIGS. 32A-32B illustrate an example of a radio display screen that incorporates time-sensitive advertiser visual content.
Figure 32B:
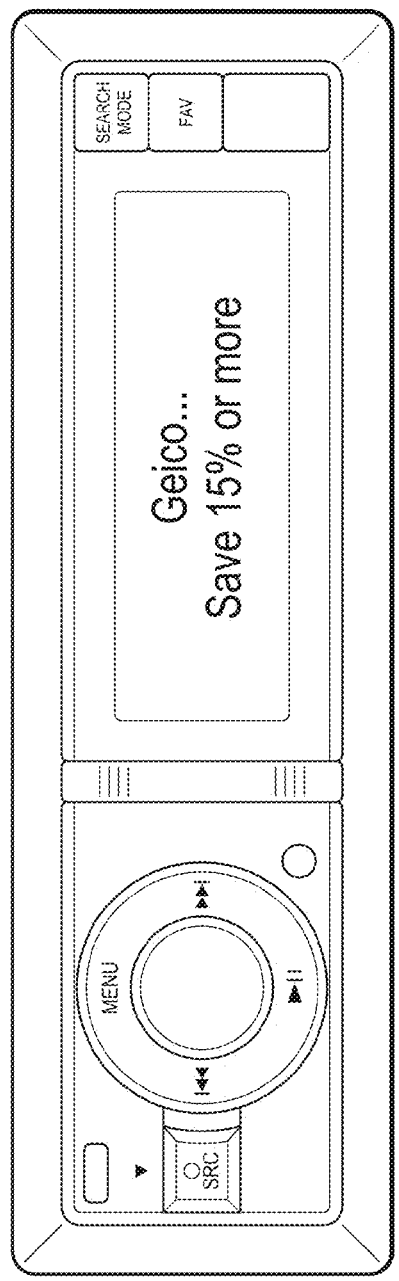

FIGS. 32A-32B illustrate an example of a radio display screen that incorporates time-sensitive advertiser visual content. In this illustration, the RDS display in figure A identifies the now playing radio program. In FIG. 32B, a system of the type described herein has inserted an advertisement into the display. The scheduling and timing of the advertisement can be programmed as described earlier. In response to the ad, the radio listener may simple say aloud, something like "more information." The voice content is captured, and may be transmitted back to the IR server, where is can be associated to the displayed ad, since the ad itself was generated by that server. The server can then pass on the request to the advertiser in near real time. The listener may be identified, for example, by an identifier of the vehicle or head unit. In an alternative, the listener may say "call back" and the user's mobile phone (or vehicle built-in phone) may be utilized to respond to the ad. A call back number may be supplied by the server with the ad, whether or not the number is displayed. Other user interface elements may be used instead of voice.

Performing Artist Centric Content Broadcast Synchronization

Figure 33:
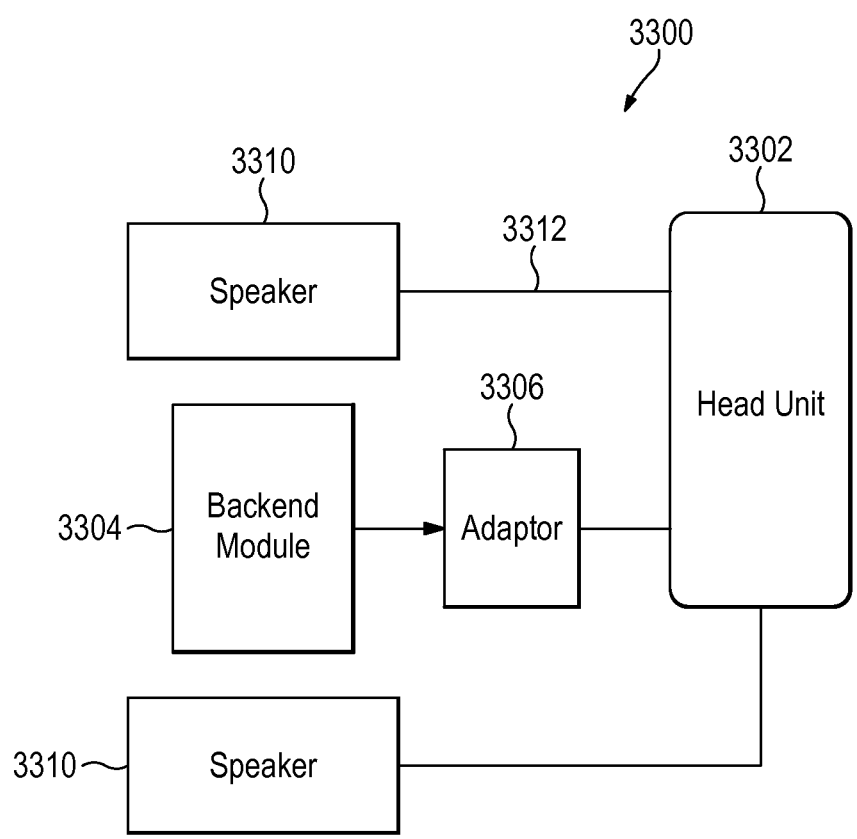
FIG. 33 is a block diagram of an example car radio system that may be used in connection with embodiments of the present system.
Figure 34:
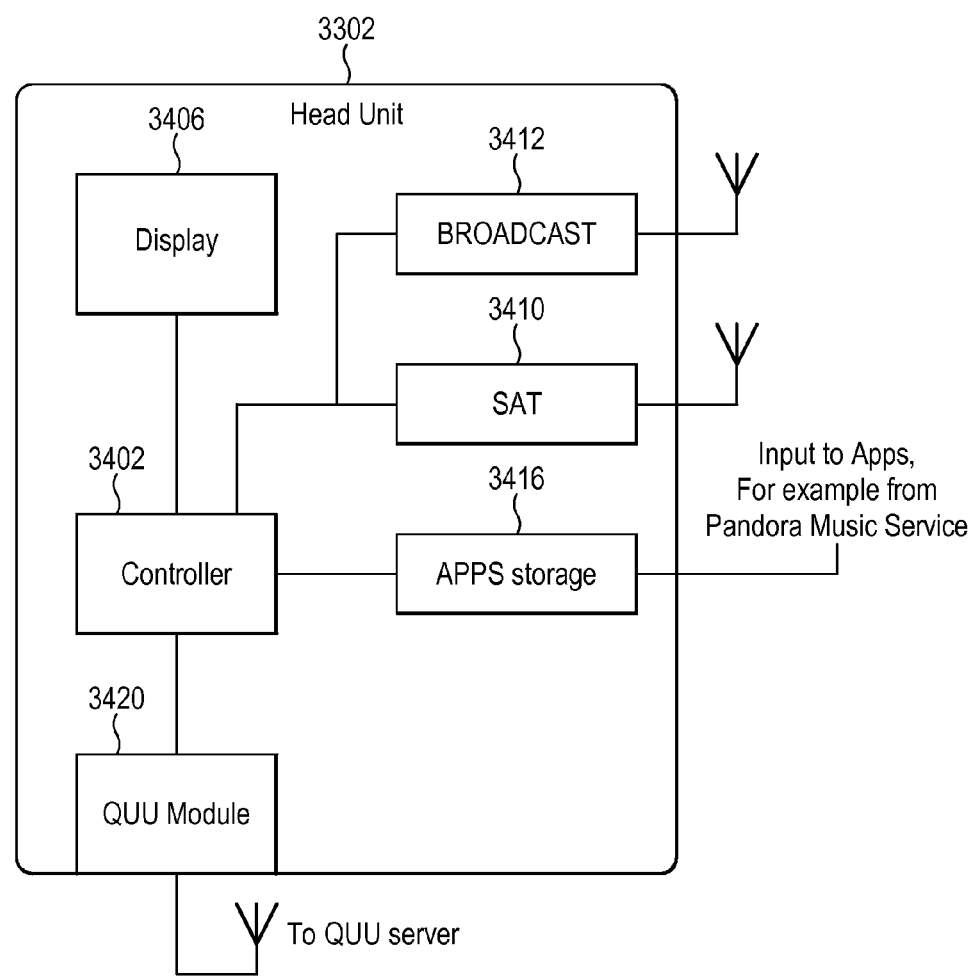
FIG. 34 is a simplified block diagram of an example head unit of a vehicle.

FIG. 33 is a simplified block diagram of an example car radio system 3300 integrated with a head unit. A head unit 3302 is coupled to a backend module 3304 via an adaptor 3306 and controls a set of speakers 3310 (to which the head unit is also coupled via 3312). FIG. 34 is a block diagram of an example head unit 3302. The head unit comprises a controller 3402 coupled to control a display 3406 and coupled via a bus to receive data and/or control a Satellite radio module (SAT) 3410 and/or a broadcast radio receiver module 3412 to receive broadcast content. In addition, the controller 3402 may be coupled to an applications (APPS) storage 3416, storing applications and/or computer programs which are executable by the controller to cause the radio system or parts thereof to operate in accordance with the executed/executing application. For example, such applications may include Pandora® or Apple Radio® or other music streaming services.

As illustrated in FIG. 34, the controller may be further coupled to a "QUU module" 3420. (QUU is a trademark of QUU INC., a Washington corporation.) This QUU module may be a part of the radio system. For example, the QUU module 3420 may be implemented as a physical device that is a self-contained module that is a part of the radio system. Or, the QUU module could be built as part of an existing radio system device, such as the head unit. Thus, in one example, the QUU module may be an after-market module that is coupled to a compatible head unit or other radio system device, by, for example, a radio installation specialist. In the alternative, the QUU module could be built into the head unit by the original equipment manufacturer (OEM). Similarly, the car manufacturer may install the QUU module at the time of radio system assembly.

The QUU module is configured to communicate with a QUU server (for example via a wireless channel), or other means (for example a mobile communication device or embedded phone module coupled to the QUU module which receives wireless data) of obtaining data, for example, real-time data. The QUU module provides a communication link to a QUU server or QUU server system, as further described herein, and this communication link may be a wireless link.

Figure 35:
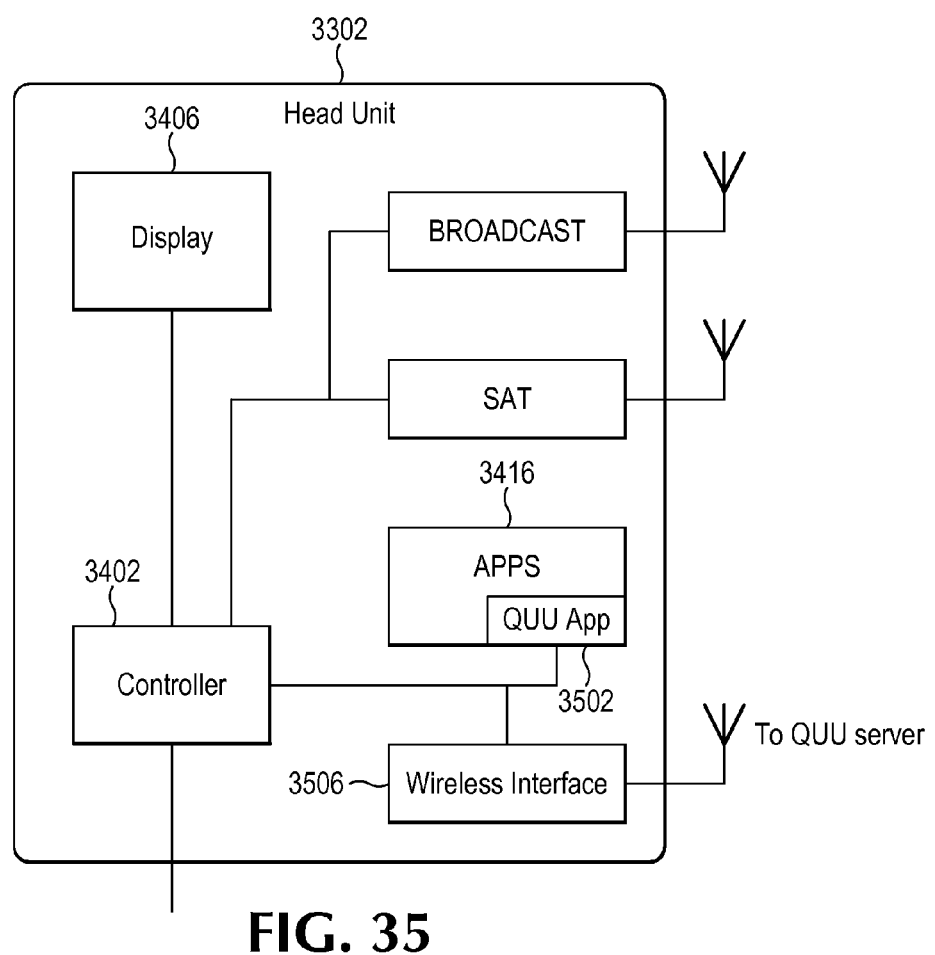
FIG. 35 is a further block diagram of the example head unit of a vehicle.

As illustrated in FIG. 35, a QUU app 3502 may be loaded into the APPS storage 3416 to provide the functionality of the QUU module described above with regard to FIG. 34. A QUU app may be executed by a controller to configure a wireless interface 3506 (shown here in the head unit by way of example) to provide a wireless communication link to a remote QUU server or system. The controller 3402 may control the wireless interface 3506 so as to provide the QUU server with an indication or identifier of a media content item being reproduced ("now playing") by the head unit. The wireless interface may in turn receive data from the QUU server pertaining to the media item playing, and all or part of the data received from the QUU server (such as, for example, artist information or tweets from the artist) may be displayed on the display 3406 substantially concurrently with the reproduction of the media item playing.

This additional or supplemental content provided by the server may include audio, graphics, video and other content. The supplemental content may be selected or adapted to optimize operation on the particular type of display 3406 in the vehicle. For example, the QUU App 3502 may identify the head unit display type or size to the server. As would be apprehended by one of skill in the art, the above-described functionality described with regard to the head unit may be implemented across the radio system, for example, at the adaptor or the backend module discussed above. Aspects and embodiments described herewith may use the systems described above, or may be implemented with web devices, mobile communication devices, or across multiple devices. As just one example, a user's smartphone may be coupled to the vehicle head unit (by cable or short-range wireless) to provide communications, or for downloading an app to the head unit storage.

In some embodiments, an artist's identity, or media content corresponding to an artist such as the artist's songs, are used as a key or trigger for accessing supplemental data and pushing customized and/or geo-targeted artist-related data such as messages to a device associated with the artist or the media content in the sense that the artist's item is "now playing." For example, using a car radio system generally as described above, when a song performed by a particular artist is being reproduced on the radio system, information related to the artist and/or the song is received at the radio system, and output on the display such that the listener hears the song and sees display information pertinent to the song or corresponding artist in some way. Preferably, the supplemental content is provided in near real time. For example, information related to the artist and/or the song may be propagated to the radio system through the QUU module/application or other QUU device.

By way of example, using the QUU system, or aspects thereof, a trucker with a QUU-enabled head unit in his rig may hear a song such as 'Running Over Yuppie Cars' by an artist such as Wild-Willy on FM radio while driving though Las Vegas (New Mexico). The QUU system will push advertisements or other content related to the artist and song to the display. For example, should Wild-Willy be holding a concert in New Mexico, a geo-targeted message stating that Wild-Willy has a concert and the dates of the concert may be pushed to the display of the FM radio based on receiving an indication that Wild-Willy is playing on the FM radio, providing the trucker with pertinent information regarding the artist Wild-Willy. The text or graphics video of the message may be created by the label having a contract with Wild-Willy and pushed under the authority of the label. Thus, the specific artist or media (such as a song) reproduced on a device may be a trigger for the specific messages/adverts/and other media pushed to the device display. This allows for customized and geo-targeted artist/media related messages and happenings to be propagated from the artist or the label to end-user devices such as car media systems, web systems and mobile devices.

For example, one method consistent with the present disclosure may comprise: Selecting a primary media item (perhaps audio) for reproduction on a media reproduction device (perhaps a radio system head unit); Receiving a secondary media item associated with (for example, perhaps corresponding to a creator of) the primary media item at the media reproduction device (based on the selection of the primary media); Reproducing the secondary media item substantially concurrently with reproducing the primary media item on the media reproduction device.

The secondary (or supplemental) media item may have a geographic correspondence to a determined location of the media reproduction device. The secondary media item may be, for example, a geo-targeted advertisement advertising a happening or event pertaining to the primary media item in geographic location corresponding to the determined location of the media reproduction device. The secondary media item may also be, for example, a link, such as an internet link to, for example, a site associated with the primary media item.

A server system for implementing aspects described herein may comprise the following elements: A server (for example a QUU server), configured to receive an indication of a primary media item (for example a song) now playing on a media reproduction device, wherein the server is further configured to, in response to receiving the indication, determine a creator (for example an artist or label associated with creating the song) corresponding to the primary media item and propagate a secondary media item corresponding to the creator to the media reproduction device. The server may further be configured to propagate the secondary media item to the media reproduction device based upon a location of the media reproduction device.

A playback system for media reproduction usable with the above may comprise a receiver or transceiver comprising a software or hardware module installed therein. This module may propagate an indication of playing media to a server or system such as those described above.

Systems for propagating specific messages/adverts/and other content (for example, media content) related to an artist to allow for customized and geo-targeted artist/media related messages and happenings to be propagated from the artist or the label to end-user devices may be implemented in numerous non-exhaustive ways, some examples of which follow below.

Figure 36:
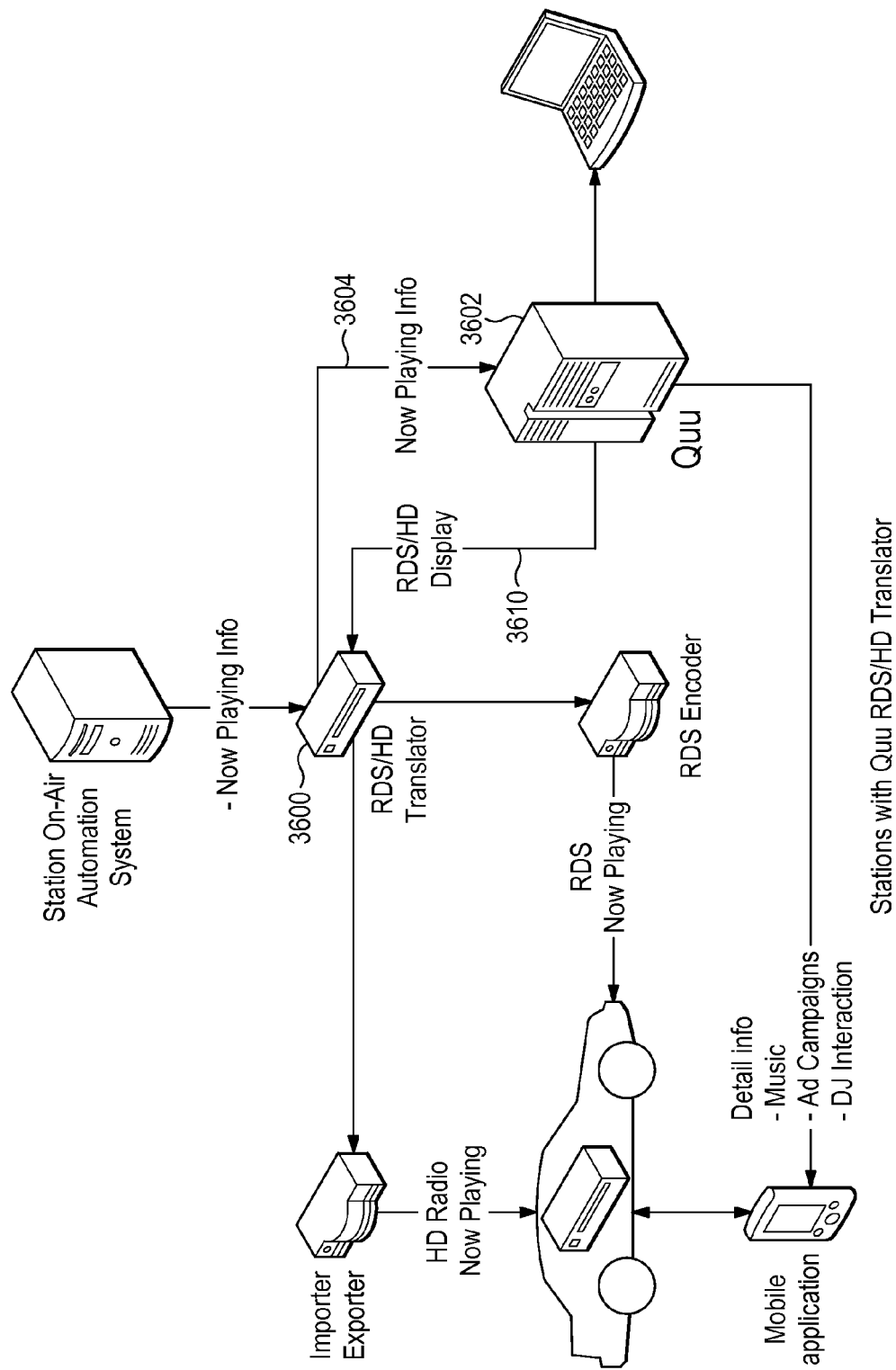
FIG. 36 is a simplified communication diagram to enable providing supplemental content to listeners of a broadcast radio station utilizing a QUU system enabled RDS/HD translator.
Figure 37:
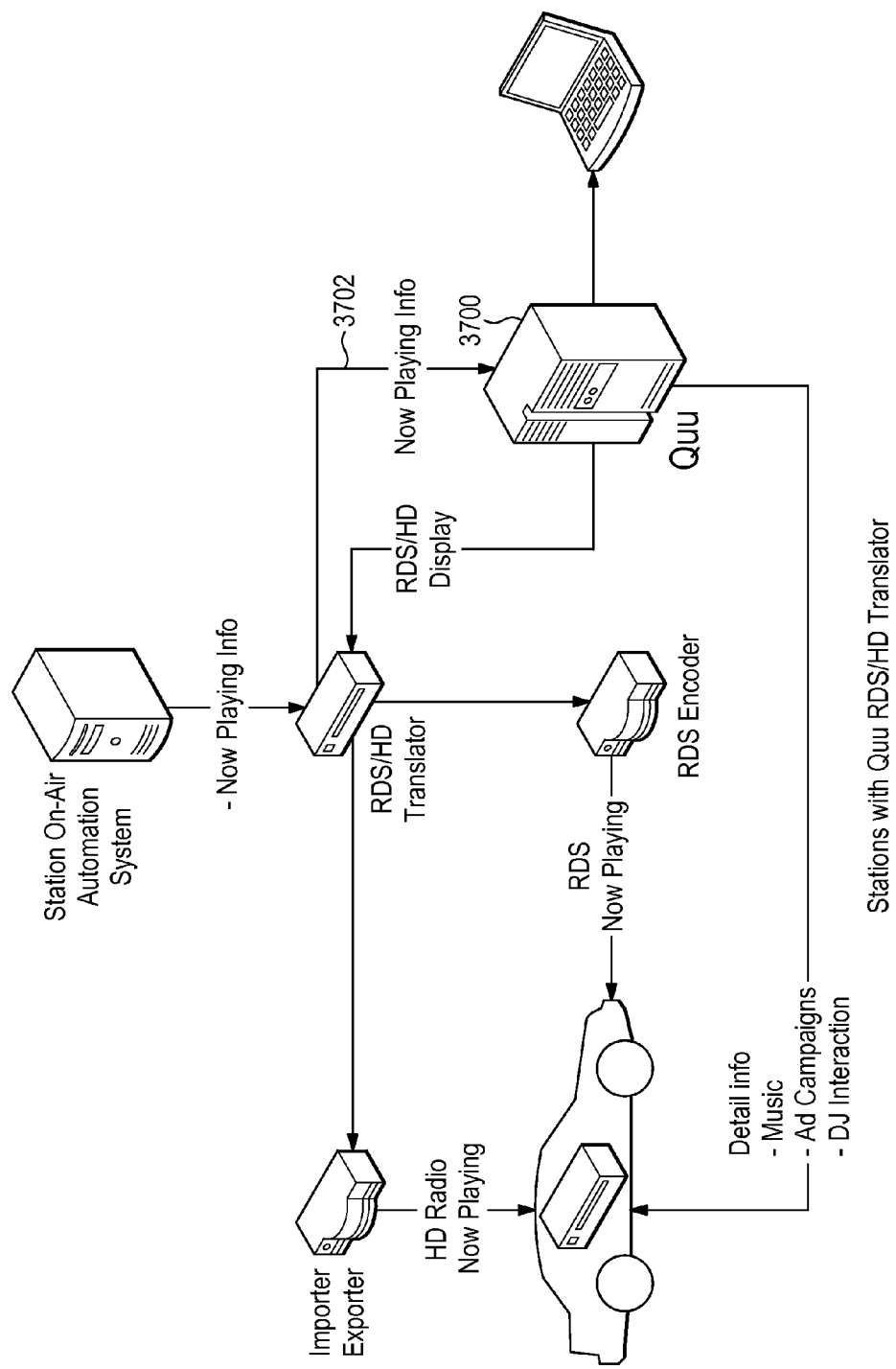
FIG. 37 is another simplified communication diagram for radio stations with QUU RDS/HD translator.

FIGS. 36 and 37: FIG. 36 is a simplified communication diagram to enable providing supplemental content to listeners of a broadcast radio station utilizing a QUU system enabled RDS/HD translator. Here, a Quu RDS/HD Translator 3600 is integrated within the radio station systems. In this case, Quu servers 3602 receive the Now Playing information 3604 to its servers directly from the RDS/HD Translator. Any of a variety of communications methods and protocols may be used. As shown in FIG. 36, Quu server 3603 may compile the information related to the Now Playing information such as song details (for example Music: lyrics, artist bio, pictures, concert schedule, etc. . . . Ads: coupons, pictures, description, directions . . . DJ Talk:

Questions, choices, contest . . . ) and sends this information to a receiver via a data connection such as the illustrated mobile application. The QUU server can push content to the RDS/HD display via path 3610.

Turning to FIG. 37, QUU servers 3700 may receive an indication of a song playing or soon to be played from a broadcast receiver such as a car radio system head unit (though as discussed above, this is by way of illustration, and non-limiting in that receiver functionality may be distributed or in a different component, such as a backend satellite radio module). Information related to the song may be determined such as the label, the artist and other information related to the song as media generally. This may be done by the QUU server, by way of querying a database system discussed below. Furthermore, the QUU server may receive an indication of a current geographic location of the receiver. For example, some vehicles are equipped with navigation systems that can provide location data. Based on the song, the label, artist, or other information, supplemental information corresponding to the song, the artist or the label, or other pertinent information may be propagated to the receiver. In one example, the supplemental information may comprise recent postings made by or for the artist through Facebook®, Twitter® and other social networks.

For example, messages from the artist may be propagated to the receiver through broadcasts from a station in the reception area of the receiver. The information may also be propagated to the receiver from a QUU system. For example, the information pertinent to the artist or song can be compiled at a QUU system and sent to a QUU module in the receiver as discussed above with regard to D1. Geographically-specific advertisements related to an artist or song can be provided to particular radio stations such that upon determining reproduction of a song or an artist's media composition at a receiver, the specific radio station may simultaneously broadcast associated media to receivers.

To the extent that the additional media related to the reproduced or to be reproduced song or artist work is propagated from a server to a QUU module in a receiver, location data associated with the location of the receiver may be used to determine or select the artist- or song-related media to be propagated to the receiver.

Building upon the Wild-Willy example, a location associated with Wild-Willy may be received at the QUU system (perhaps optionally), and the QUU system receives an indication of an artist or song. Based upon the artist or song, and location, information related to the or by the artist is sent to the receiver. For example, a tweet from Wild-Willy urging fans to get tickets to his new concert "Driving over Bad People Cars" may be propagated to receivers in the vicinity of the concert when the receiver is receiving and reproducing a work by Wild-Willy. This may be done via a radio station in the vicinity propagating the tweet to the receiver together with the song data, also, the QUU system may propagate the Wild-Willy tweet to the receiver based on received location data and this may be done via a QUU module in the receiver. The Wild-Willy tweet will be displayed on the receiver display, allowing the trucker to know there will be a concert by Wild-Willy in his immediate vicinity while he is listening to Wild-Willy.

In an alternative embodiment, no Quu translator is integrated within the radio station systems. The station may send the Now Playing info to the Quu servers directly or indirectly from its Automation system. Quu compiles the information related to the Now Playing information such as artist details, related albums by the same artist and other information pertinent to the artist or song and sends this information to the receiver via a data connection. (see FIG. 2 in Chapter 2—of course, there may be a direct data link from the QUU system to a QUU module in the receiver instead of having to go through the illustrated mobile application). The information related to the song, artist or other creator such as label, may be any manner of media and may be propagated to a receiver as discussed above, for example, as described with regard to D2.

Figure 38:
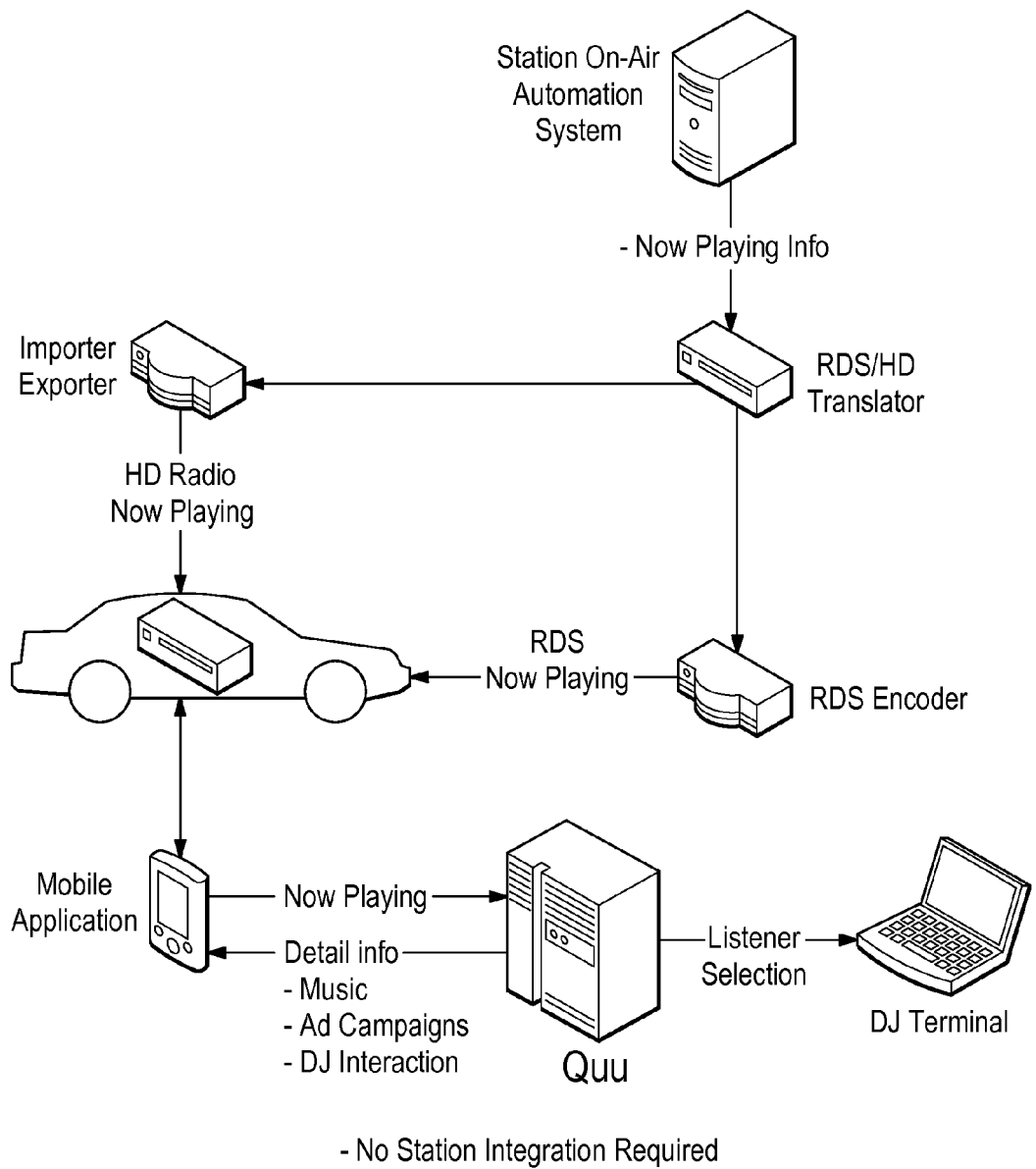
FIG. 38 is a simplified communication diagram to enable providing supplemental content to listeners of a broadcast radio station.
Figure 39:
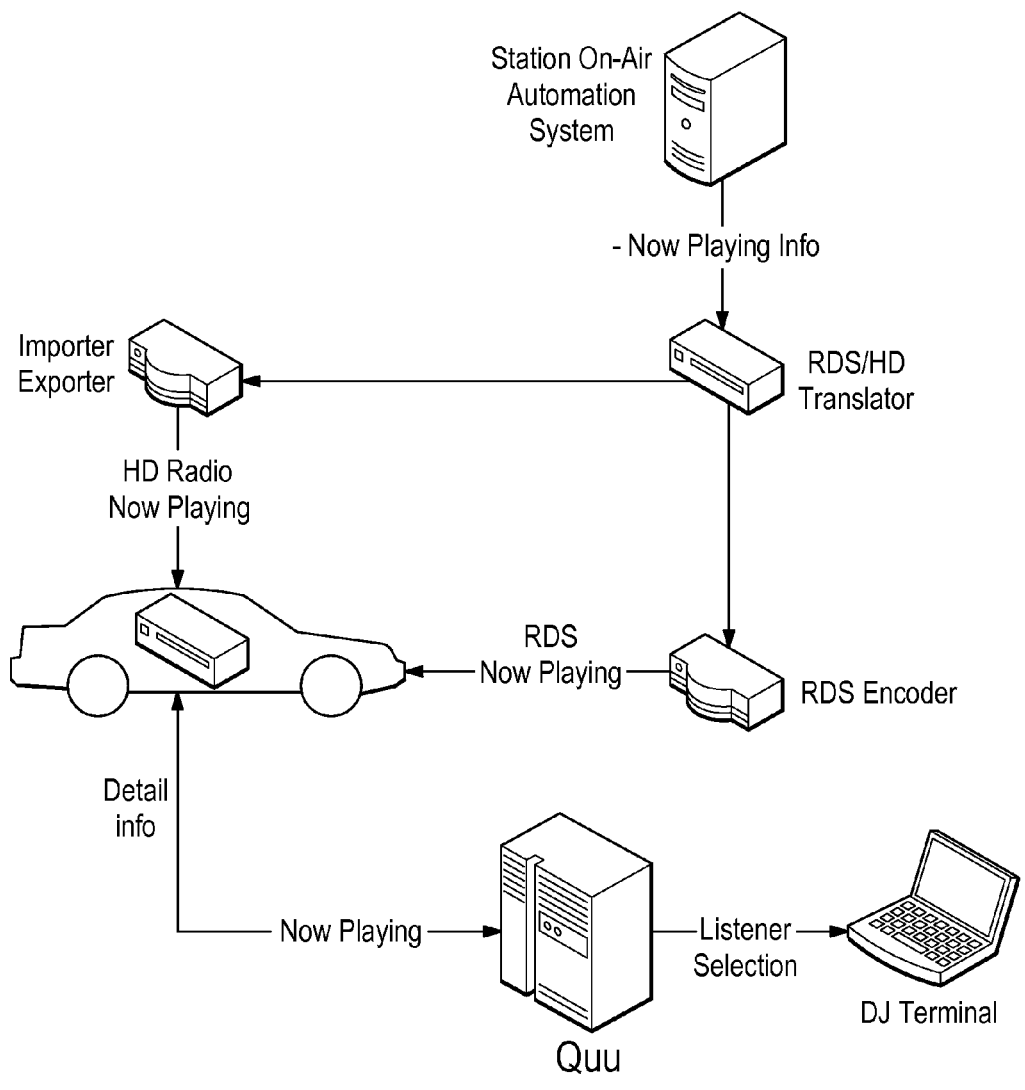
FIG. 39 is a simplified communication diagram that does not require integration of a translator.

FIGS. 38 and 39: No integration takes place with the station. In this case a QUU module such as that described above in FIG. 34 captures the Now Playing info from the RDS or HD text, sends this information to the Quu servers. This may be done using an established data connection via a mobile application (per FIG. 38). Or, there may be a connection (per FIG. 39), such as a wireless and/or network connection (or a set of connections), from the QUU module in the receiver to the QUU server or server system. The QUU module in the receiver may also send geographic location information related to the receiver and module to the QUU server.

Quu compiles the information related to the Now Playing information such as tweets from the artist, album information from the label, concert information corresponding to the location (for example, future concerts by the artist or in a similar genre which is also sponsored by the label). The information may be collected in a database system. The information may be collected by a QUU server using automated or manual methods, or a combination of the two. The database system may comprise a database such as 1423 in FIG. 14. Selected, artists, agents, labels, advertisers, and others may be given write access to contribute to the database. Then this information is sent to the receiver, for example, via the connection between the QUU server and the QUU module in the receiver. This information pertaining to the reproduced song or artist-media may be reproduced on the receiver display to a user.

While the above is described with regard to playing or reproducing songs, as would be apparent to one of skill in the art, these aspects are not limiting and aspects of the present disclosure may be implemented in connection with any digital media. Furthermore, while the radio system has been described with regard to a simple head unit based system for a car or other transport mechanism, of course this is not limiting and aspects may be extended to a multimedia car system, for example. Still further, aspects described above may be implemented on a portable communication device such as a smartphone, or may even be extended to a desktop or laptop computer, an internet connection providing access to the QUU servers, for example, through one or more networks.

Similarly, aspects can be expanded to Pandora or other music services which may be web-based or -propagated services. By way of non-limiting example, an internet music provider can connect to QUU and provide an indication of the artist now playing, then the QUU servers can provide artist- or song-related messages as described above through the internet connection, whether it be a wireless or wired channel. Geographical location information may also be provided, by for example, in the event of a wireless connection, a known geographic location of a gateway or hotspot providing the wireless connection. Because Pandora and other music streaming services provide individualized service to a particular listener, so too can the system described here provide corresponding individualized supplemental content.

Figure 40:
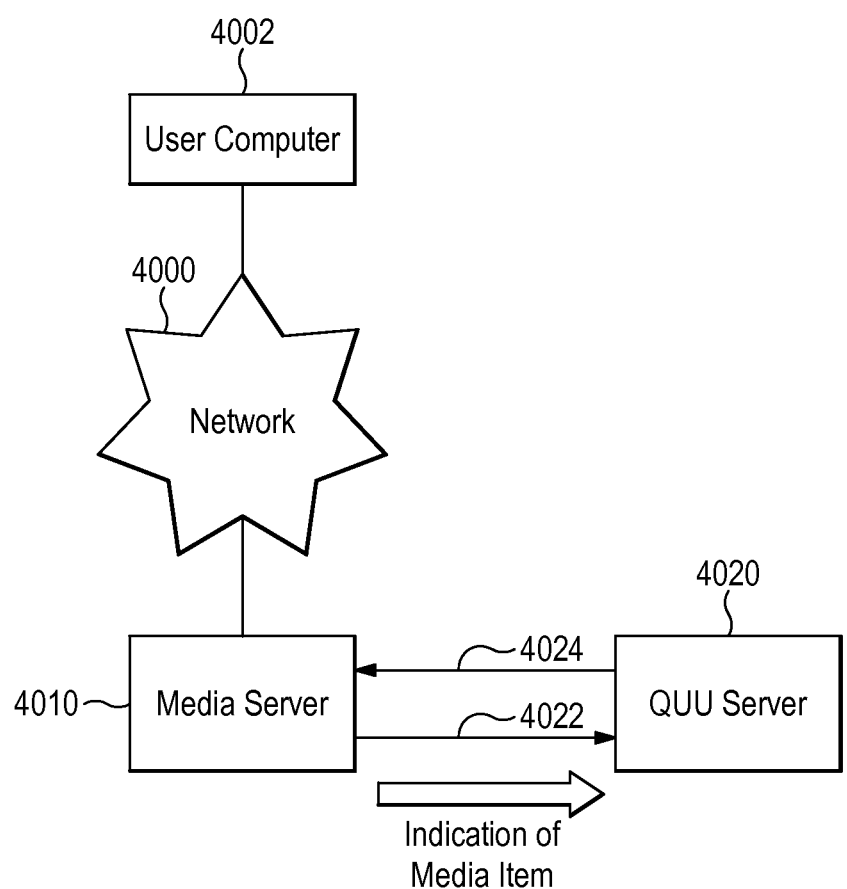
FIG. 40 is a simplified network diagram for extending aspects of the present disclosure to network applications other than broadcast radio.

Turning to FIG. 40, it illustrates one example of extending concepts and aspects detailed above to web-based services and illustrates web-based aspects. The Network 4000 may be the Internet or another network. A user computer 4002 communicates with a media server 4010 over the network 4000. The media server 4010 may be a server under the control of a media content provider such as Pandora or Facebook. Thus, the server may be a Pandora or Facebook server. The user can select a media content item for reproduction on the user computer and the media server may stream or otherwise provide the selected media content item over the network to the user computer for reproduction. The media server 4010 may also be in communication with the QUU server 4020 and provide an indication of the selected media content item via 4022 to the QUU server.

In response, the QUU server may access a database (not shown) and query for artist information related to the selected media content item. Preferably, the artist identity is used as a search key into the database. If found, the artist information may be returned to the media server by the QUU server and the media server may propagate the artist information to the user computer over the network. At the user computer, the user computer may display the artist information substantially concurrently with reproduction of the selected media content item provided by the media server, which may be, for example, a Pandora or Facebook server. As noted, the artist information may comprise a variety of messages, tweets, text, pictures, links, etc. to drive further engagement with the artist (or an advertiser) than the "now playing" item standing alone.

Aspects and embodiments allow for information related to an artist or media item to be provided to a user in real-time and dynamically, such that artist-centric information is dynamically provided to an end user in real time in response to selecting an artist or media item of the artist.

Figure 41:
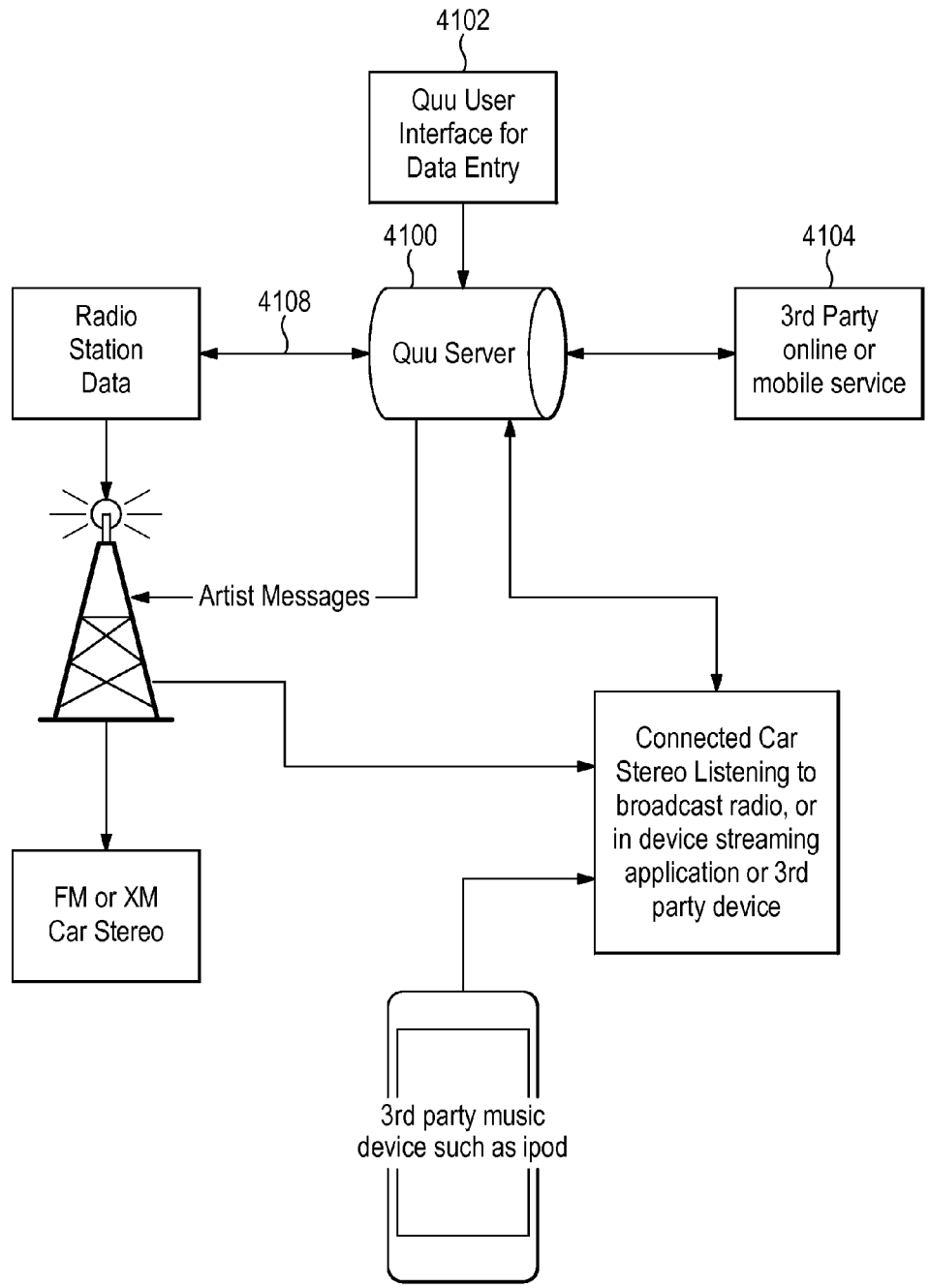
FIG. 41 is a simplified communication diagram of a preferred embodiment of some of the methods disclosed herein.

FIG. 41 is a simplified communication diagram of a preferred embodiment of some of the methods described above. In this implementation, a QUU server 4100, which may be a synchronization server, may be coupled to a database (not shown) to store and access artist messages and other supplemental content associated with a specific artist. This data may be provided via a user interface 4102 and or a 3*d* party online or mobile service 4104. A radio station or radio station server provides station data 4108 for example, "now playing" data to the server 4100. In near real-time, the server accesses stored supplemental content keyed to the artist, and transmits the data to a connected car stereo, or any other device or streaming application. In another embodiment, where no vehicle may be involved, a music device or streaming service may query the server 4100, again providing "now playing" data, and receive the corresponding supplemental content data. Preferably, the supplemental content data may be integrated with the corresponding user interface or display, as illustrated in some examples above.

It will be obvious to those having skill in the art that many changes may be made to the details of the above-described embodiments without departing from the underlying principles of the invention. The scope of the present invention should, therefore, be determined only by the following claims.

The invention claimed is:

1. A system for real-time broadcast content synchronization comprising:
  a synchronization server, the synchronization server having a first interface for communication with a radio station server to receive real-time radio broadcast information including metadata that identifies, in real time, a specific radio content item now playing on a broadcast radio station;
  the synchronization server including a second interface for communication with a user device;
  the synchronization server further including an application software program for download to the user device for installation and execution on the user device, the application software program enabling the user device to request and access synchronization content from the synchronization server;
  the synchronization server further having a third interface for communication with an external content database, the external content database containing first content associated with corresponding artists;
  the synchronization server further including or coupled to a local synchronization server database;
  wherein the synchronization server is configured to:
  (a) receive a request from the user device for synchronized content, wherein the request is received directly from the user device or forwarded from a radio station server;
  (b) responsive to the received request, provide download of the application software program to the requesting user device;
  (c) based on the received request, identify a radio station from which the user device is currently receiving over-the-air audio programming;
  (d) receive station identified content (SIC) data from the identified radio station, including metadata that identifies, in real time, a specific radio content item now playing on the identified radio station;
  (e) identify an artist based on the content item now playing,
  (f) query the external content database based on the identified artist;
  (g) download video content associated with the identified artist from the external database;
  (h) store the video content in the synchronization server database;
  (i) based on the received SIC data, download radio station-generated content from the identified radio station, the station-generated content distinct from the radio content item now playing;
  (j) generate synchronized content by combining at least one element of the radio station-generated content together with one or more elements of the video content stored in the synchronization server database; and
  (k) communicate with the downloaded application software program on the user device to transmit the synchronized content to the user device while the content item now playing is playing;
    wherein the application software program is configured to provide the synchronized content to the user device for display in a video player or web page rendering so that the video is synchronized to the radio content item now playing on the broadcast radio station.

2. The system of claim 1 and further comprising an RDS/HD translator that generates the metadata that identifies, in real time, the specific radio content item now playing on the broadcast radio station.

3. The system of claim 1 wherein the synchronization server is configured to select the synchronized content based on the content item now playing and push the selected synchronized content to an RDS/HD display on the user device.

4. The system of claim 1 and further comprising a module arranged for use in a motor vehicle head unit, wherein the head unit module generates the metadata that identifies the content item now playing to send to the synchronization server.

5. The system of claim 4 wherein the head unit module is further arranged to receive the synchronized content from the synchronization server and display the supplemental content on the head unit while the radio content item is playing in the motor vehicle.

6. The system of claim 1 wherein the user device comprises one of a computer, a tablet, a billboard, electronic sign, in-car radio equipped with RDS, interactive hybrid stereo or HD, and a mobile telecommunication device.

7. The system of claim 1 wherein the synchronization server is configured to select or filter the synchronized content based on geographic location of the broadcast radio station.

8. The system of claim 1 wherein the synchronization server is configured to utilize an API to embed the synchronized content into the radio station web site.

9. The system of claim 1 wherein the synchronized content includes at least one of a music video, advertisement, lyrics, interview audio, biography, URLs, and social media message associated with the identified artist.

10. The system of claim 1 wherein the radio station server comprises one or more of a terrestrial radio station, a satellite radio station, a web site streaming via the Internet, a network streaming source, and a Wi-Fi streaming media source.

11. The system of claim 1 wherein the radio station server comprises an individual channel serving an individual customer or subscriber in the case of a personalized streaming service.

12. The system of claim 1 wherein the synchronization server is configured to select or filter the synchronized content based on geographic location of the broadcast radio station to select geo-targeted content, including at least one of local tour dates and locations associated with the identified artist.

13. The method of claim 1 wherein the synchronized content includes at least one of a media appearance, breaking news, album release, point-of-sale information associated by the synchronization server with the now playing media item while it is playing on the radio station broadcast.

14. The method of claim 1 wherein the client device utilizes an RDS or HD car stereo display to display textual content of the synchronization content provided by the synchronization server.

15. The method of claim 1 wherein the user device is running a mobile device app and the content mobile background is provided by the synchronization server in the synchronized content so as to skin the background with content associated with the identified artist comprising recent postings made by or for the artist through Facebook®, Twitter® and other social networks.

16. The method of claim 1 and further comprising, in the synchronization server, selecting or adapting the synchronized content to the user device.

\* \* \* \* \*